United States Patent
Edgington et al.

(10) Patent No.: US 10,408,380 B2
(45) Date of Patent: Sep. 10, 2019

(54) APPARATUS AND METHODS FOR ATTACHING OBJECTS TO TREES

(71) Applicants: Thomas J. Edgington, Cowansville, PA (US); Bradley T. Edgington, Cowansville, PA (US)

(72) Inventors: Thomas J. Edgington, Cowansville, PA (US); Bradley T. Edgington, Cowansville, PA (US)

( * ) Notice: Subject to any disclaimer, the term of this patent is extended or adjusted under 35 U.S.C. 154(b) by 260 days.

(21) Appl. No.: 15/398,870

(22) Filed: Jan. 5, 2017

(65) Prior Publication Data
US 2017/0114953 A1    Apr. 27, 2017

Related U.S. Application Data

(63) Continuation of application No. 14/801,115, filed on Jul. 16, 2015, now abandoned, which is a
(Continued)

(51) Int. Cl.
*B42F 5/00* (2006.01)
*F16B 2/02* (2006.01)
(Continued)

(52) U.S. Cl.
CPC .......... *F16M 13/022* (2013.01); *A01G 13/00* (2013.01); *A01G 17/12* (2013.01); *B42F 5/00* (2013.01);
(Continued)

(58) Field of Classification Search
CPC ...... F16M 13/022; F16M 13/02; A01G 13/00; A01G 17/12; B42F 5/00; F16B 2/08; F16B 11/006; G09F 7/18; G01B 5/0035
(Continued)

(56) References Cited

U.S. PATENT DOCUMENTS

| 947,879 | A | * | 2/1910 | Worstall | G01B 3/34 |
| | | | | | 33/514.1 |
| 2,191,808 | A | * | 2/1940 | Schramm | G09F 3/14 |
| | | | | | 248/230.8 |

(Continued)

FOREIGN PATENT DOCUMENTS

FR    1105561 A    5/1955

OTHER PUBLICATIONS

Official Action for U.S. Appl. No. 13/712,083, dated Jun. 2, 2014.
(Continued)

*Primary Examiner* — Joshua D Huson

(57) ABSTRACT

Devices and methods for attaching objects to living trees. Various forms of the devices employ a flexible member and mounting member that are configured to be looped and secured around a tree portion at a beginning of a predetermined time period. The mounting member and flexible member are configured to slide relative to each other to accommodate growth of the tree portion such that the device remains secured to the tree portion for at least the duration of the predetermined period of time without the need for human intervention. In other embodiments, the mounting member is integrally formed with the object or no mounting member is employed.

21 Claims, 37 Drawing Sheets

Related U.S. Application Data continuation of application No. 13/712,083, filed on Dec. 12, 2012, now Pat. No. 9,149,009.

(60) Provisional application No. 61/578,597, filed on Dec. 21, 2011.

(51) Int. Cl.

| | | |
|---|---|---|
| *F16B 2/08* | (2006.01) | |
| *G01B 5/00* | (2006.01) | |
| *G09F 7/18* | (2006.01) | |
| *A01G 13/00* | (2006.01) | |
| *A01G 17/12* | (2006.01) | |
| *F16B 11/00* | (2006.01) | |
| *F16M 13/02* | (2006.01) | |

(52) U.S. Cl.
CPC .................. *F16B 2/02* (2013.01); *F16B 2/08* (2013.01); *F16B 11/006* (2013.01); *G09F 7/18* (2013.01); *G01B 5/0035* (2013.01)

(58) Field of Classification Search
USPC .............................. 248/230.8, 230.2; 47/32.5
See application file for complete search history.

(56) References Cited

U.S. PATENT DOCUMENTS

| | | | | | |
|---|---|---|---|---|---|
| 2,443,155 | A | * | 6/1948 | Zahutnik | F16G 11/048 24/136 L |
| 2,554,105 | A | * | 5/1951 | Heinle | G09F 3/04 24/16 PB |
| 2,703,216 | A | * | 3/1955 | Petersen | E04H 12/04 248/230.9 |
| 2,900,696 | A | * | 8/1959 | Bacon | A01K 27/005 119/856 |
| 3,952,377 | A | * | 4/1976 | Morell | E04C 5/122 24/136 R |
| 4,073,090 | A | * | 2/1978 | Lucia | A01G 17/12 24/543 |
| 4,441,258 | A | * | 4/1984 | McDaniel | G01B 5/025 33/203.11 |
| 4,455,717 | A | * | 6/1984 | Gray | F16G 11/14 24/115 M |
| 4,529,240 | A | * | 7/1985 | Engel | A22B 5/161 24/129 R |
| 4,896,454 | A | * | 1/1990 | Cronenwett | A01G 7/06 248/219.4 |
| 4,991,339 | A | * | 2/1991 | Gibson | A01K 91/04 24/115 H |
| 5,137,086 | A | * | 8/1992 | Stokley | E21B 49/082 166/191 |
| 5,167,086 | A | * | 12/1992 | Fast | G09F 3/16 24/16 PB |
| 5,290,019 | A | * | 3/1994 | Beyers | B65H 75/4476 269/102 |
| 5,315,774 | A | * | 5/1994 | Chompff | G09F 3/205 40/316 |
| 5,379,928 | A | * | 1/1995 | Mikkelsen | A45C 13/30 224/191 |
| 5,537,719 | A | * | 7/1996 | Freed | B65D 63/1072 24/16 PB |
| 5,551,452 | A | * | 9/1996 | Barlow | A41G 5/00 132/201 |
| 5,692,272 | A | * | 12/1997 | Woods | A44B 99/00 24/115 M |
| 5,774,999 | A | * | 7/1998 | Smith | G01B 5/0035 24/DIG. 43 |
| 6,021,984 | A | * | 2/2000 | Mills | F16M 11/14 248/219.4 |
| 6,065,722 | A | * | 5/2000 | Levasseur | F21V 21/08 248/218.4 |
| 7,032,276 | B1 | * | 4/2006 | Olson | A44B 11/10 24/115 G |
| 7,523,910 | B2 | * | 4/2009 | Moran | F16G 11/048 24/298 |
| 7,883,062 | B2 | * | 2/2011 | Zima | B65F 1/1415 248/230.8 |
| 8,087,195 | B2 | * | 1/2012 | Minges | A01M 31/02 248/230.8 |
| 8,112,924 | B2 | * | 2/2012 | Longobardo | G09F 7/20 248/298.1 |
| 8,813,407 | B1 | * | 8/2014 | Sargent | F41A 23/16 42/94 |
| 9,149,009 | B2 | | 10/2015 | Edgington et al. | |
| 2005/0183245 | A1 | * | 8/2005 | Whipple | B65D 63/14 24/129 R |
| 2006/0231707 | A1 | * | 10/2006 | Schrot | A01M 31/02 248/218.4 |
| 2007/0095870 | A1 | * | 5/2007 | Griffith | A45C 13/30 224/219 |
| 2010/0018102 | A1 | * | 1/2010 | Minges | A01M 31/02 42/94 |
| 2010/0275757 | A1 | * | 11/2010 | Hallet | A63C 11/025 84/318 |
| 2011/0271571 | A1 | * | 11/2011 | Lennard | G09F 7/18 40/606.01 |
| 2013/0160358 | A1 | * | 6/2013 | Edgington | A01G 13/00 47/32.5 |
| 2015/0323126 | A1 | | 11/2015 | Edgington et al. | |

OTHER PUBLICATIONS

Response for U.S. Appl. No. 13/712,083, dated Jun. 10, 2014.
Official Action for U.S. Appl. No. 13/712,083, dated Sep. 25, 2014.
Amendment for U.S. Appl. No. 13/712,083, dated Dec. 24, 2014.
Notice of Allowability for U.S. Appl. No. 13/712,083, dated Apr. 16, 2015.
Dr. Kim Coder, Tree Growth Rate Table: Annual Percentage growth, University of Georgia, Dec. 1996.
Four Page Print-out from http://www.therainshed.com/toggles.htm.
Official Action for U.S. Appl. No. 14/801,115, dated Feb. 9, 2016.
Response for U.S. Appl. No. 14/801,115, dated Apr. 5, 2016.
Official Action for U.S. Appl. No. 14/801,115, dated Apr. 19, 2016.
Response for U.S. Appl. No. 14/801,115, dated Jul. 19, 2016.
Official Action for U.S. Appl. No. 14/801,115, dated Oct. 7, 2016.

\* cited by examiner

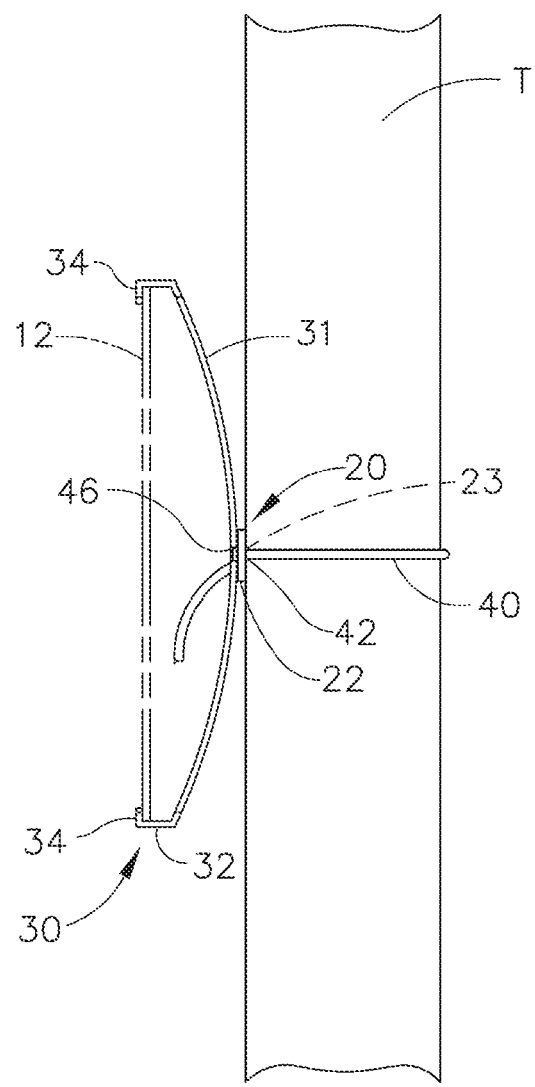
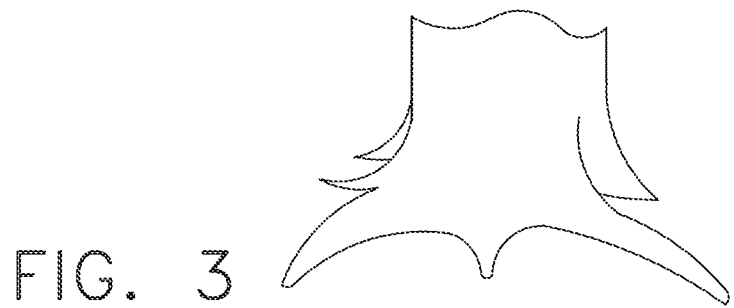
FIG. 3

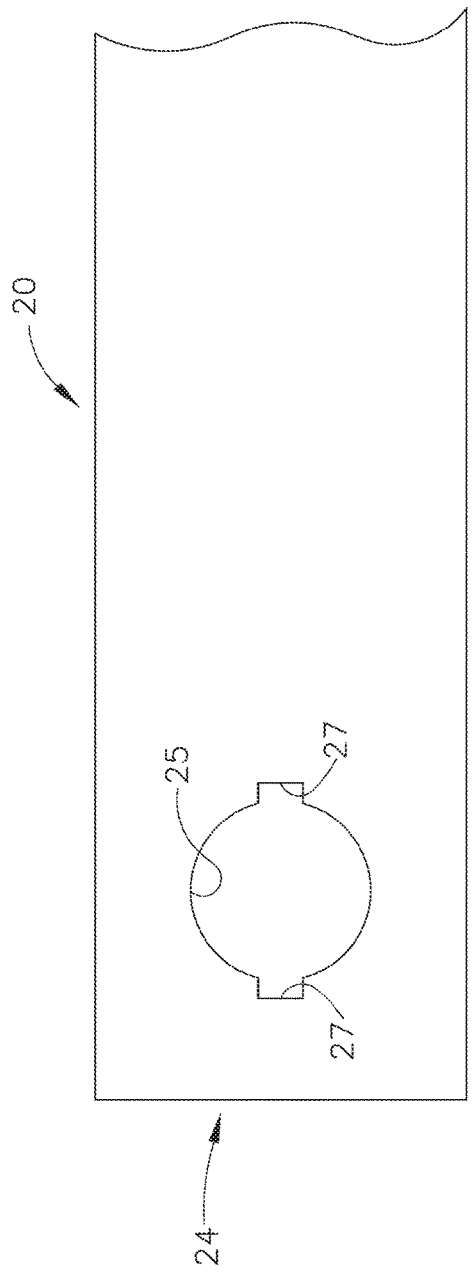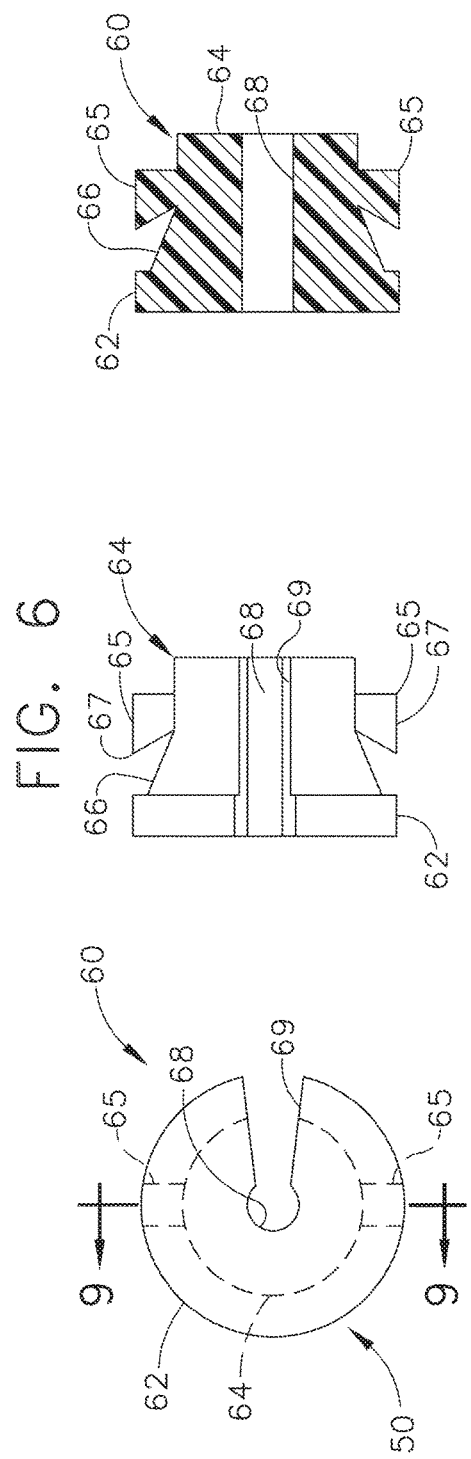

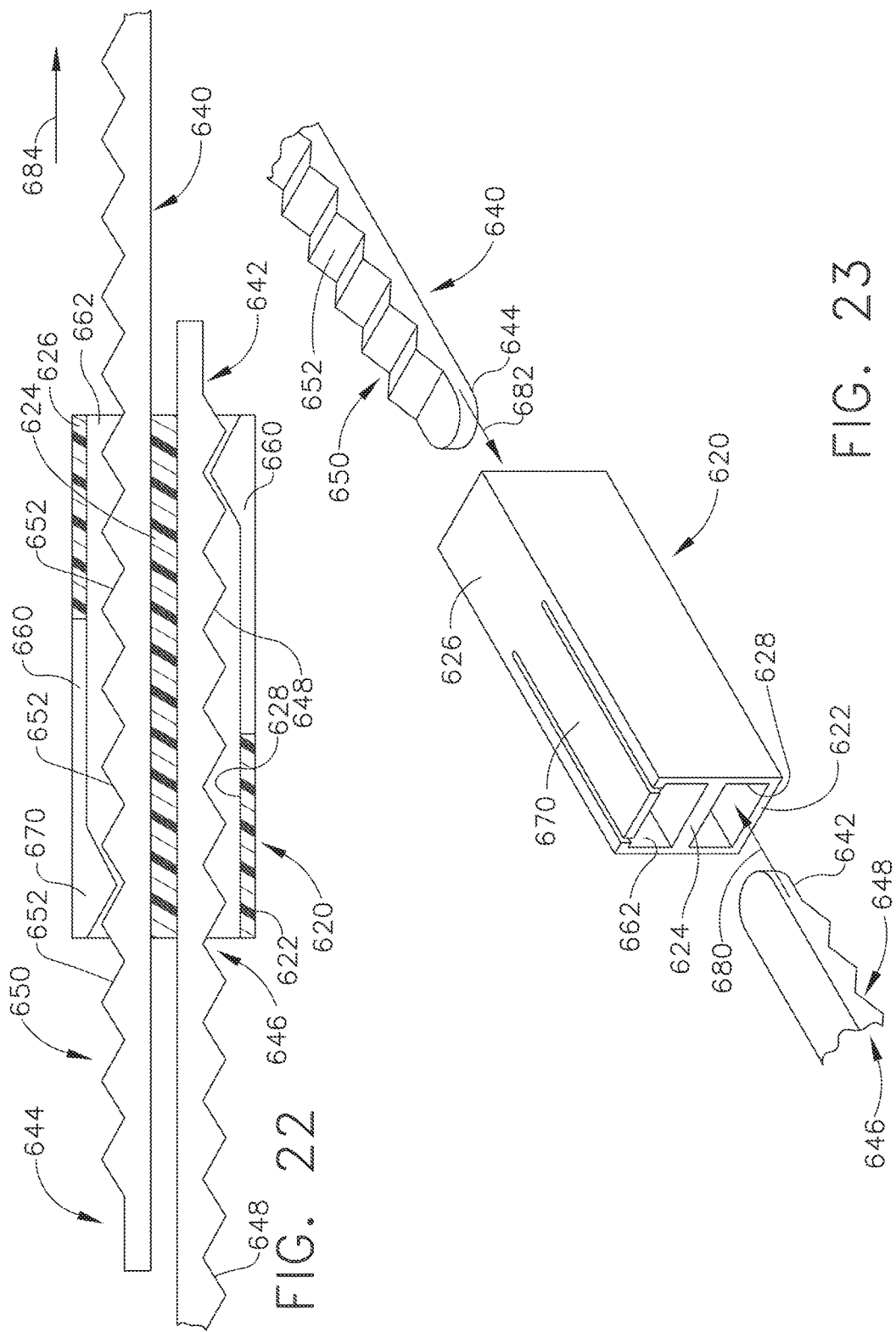

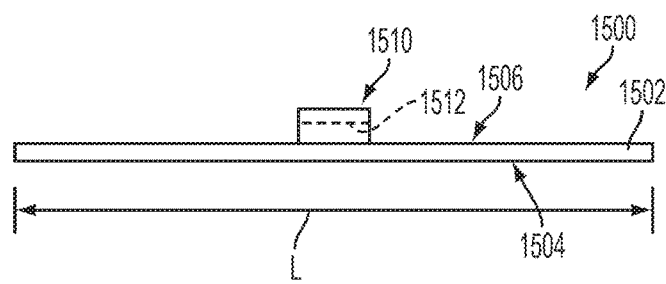
FIG. 47
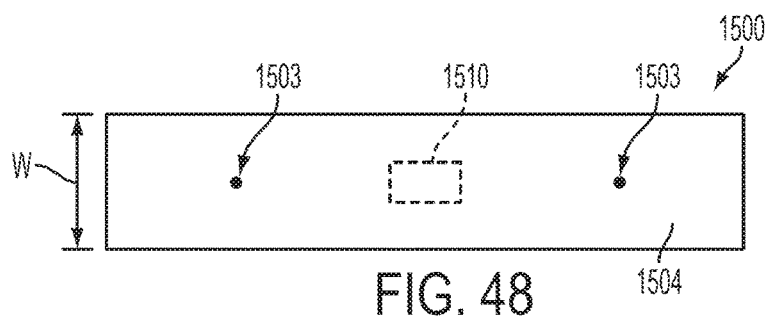 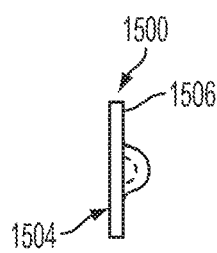
FIG. 48  FIG. 49
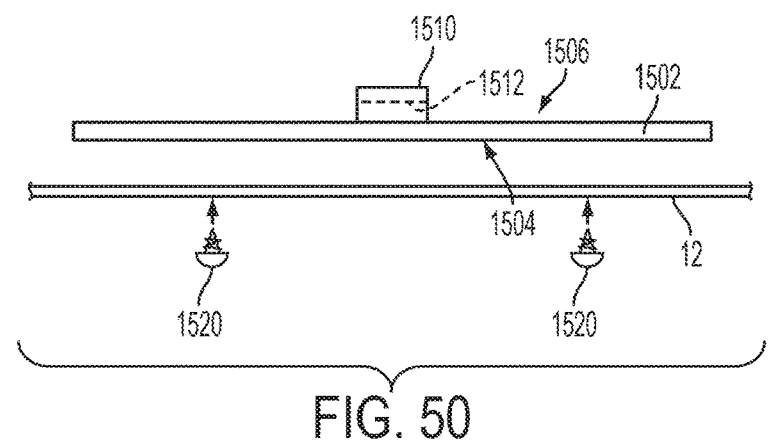
FIG. 50
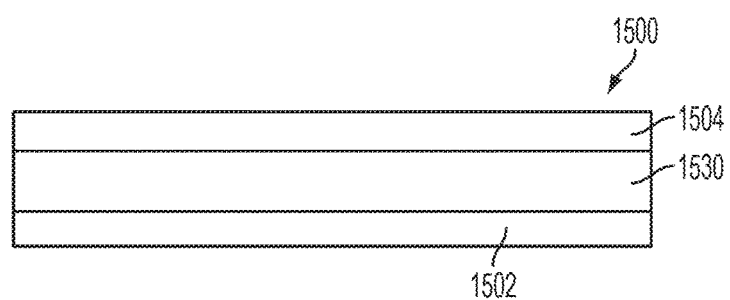
FIG. 51

APPARATUS AND METHODS FOR ATTACHING OBJECTS TO TREES

CROSS REFERENCE TO RELATED APPLICATIONS

This non-provisional patent application is a continuation application under 35 U.S.C. § 120 of U.S. patent application Ser. No. 14/801,115, now U.S. Patent Application Publication No. US-2015/0323126, which is a continuation of U.S. patent application Ser. No. 13/712,083, now U.S. Pat. No. 9,149,009, which claims the benefit of and priority under 35 U.S.C. § 119(e) from U.S. Provisional Patent Application Ser. No. 61/578,597, filed Dec. 21, 2011, the entire disclosures of which are herein incorporated by reference.

FIELD OF THE INVENTION

The present application relates to devices and methods for attaching objects to trees and, more particularly, to devices for suspending an object such as a sign, a feeder, etc. from a growing tree without damaging the tree.

BACKGROUND

Signs, for example, are commonly used to mark or delineate the boundary lines of forested properties. Depending upon the particular application, the signs may be used to prevent unauthorized trespass or they may be used to mark boundary lines for forestry or other various forms of land use activities. Signs are also often used on publicly owned tracts of forest to inform the public of various rules and restrictions governing the use of that particular piece of property or forestland.

Over the years, a variety of types of signs have been developed for attachment to trees. Such signs may be provided in different sizes, shapes and color schemes and are commonly fabricated from a variety of different materials ranging from metal, plastic, paper, fiber-reinforced paper, etc. Regardless of the size and type of sign employed, the time-worn method typically used to attach such signs to trees generally involves the use of nails. For example, when attaching a relatively flexible paper or fiber-reinforced paper sign to a tree, a nail is commonly placed in each corner of the sign to fasten it to the tree. Such approach effectively attaches the sign to the tree while preventing it from "flapping" in the wind. However, as the tree grows, the sign is forced away from the nails and often results in the tearing of the sign from around the nails. Thus, it is not uncommon to find such signs simply hanging from one or two nails located on one side of the sign in a few short years after the sign has been attached to the tree.

Other sign attachment methods that have been employed in the past frequently involve the attachment of the flexible sign to a so-called backing board. Such backing boards are commonly made from plywood or similar material and are also attached to the tree with nails. The sign is usually attached to the backing board by staples or tacks. While such approach avoids the problem of the sign tearing away from the tree as the tree grows, it is still undesirable for several reasons. For example, after even just a few years in the elements, the wooden backing boards tend to deteriorate. In addition, squirrels, porcupines and other tree climbing rodents often chew on the boards which leave the signs with little support.

Some signs are fabricated from metal or a polymer material and are sufficiently rigid and may not require a backing board for attachment to the tree. Again, however, such signs are usually attached to the tree by two or more nails hammered through the center of the sign into the tree.

All of the above-mentioned approaches employ the use of nails or screws to attach the sign to the tree. This use of such fasteners, however, is undesirable for several reasons. First, trees, like humans, are susceptible to infection and disease when wounded. Nails that are commonly used for sign attachment purposes can pierce the cambium or inner bark of the tree. The cambium is like the sub-dermis in a human. If that inner skin opens, infection and disease can get in and cause sickness. Additionally, hammering nails into a tree causes stress to the tree as it tries to repair the injury. Stress makes trees more likely to attract infections and insects.

Another problem commonly associated with the use of nails for attaching signs to trees is the potential catastrophic damage to loggers and their saw blades when the blades inadvertently contact a portion of a nail that is embedded in the tree. As such, many loggers avoid harvesting trees located on boundary lines. Such practice may result considerable economic loss to the property owner. Furthermore, nails made from steel or other corrosive metals will deteriorate from exposure to the elements. Over time, the head of the nail tends to deteriorate and fall off and thereby permits the sign to fall from the tree. If the sign is not replaced or reattached, the nail shaft will remain in the tree portion To present an often undetectable hazard to the unwitting logger. Also, nail damage to trees negatively affects their value for subsequent uses such as furniture and other visually important applications.

In an effort to address the problem of nail corrosion and saw blade damage caused by the use of nails in trees, some sign manufacturers recommend the use of aluminum nails. Certainly aluminum nails may not be as susceptible to the corrosion problems encountered when using fasteners fabricated from steel or other corrosive materials. In addition, aluminum nails are softer and are less-likely to damage a saw blade. However, aluminum nails are more susceptible to bending when being driven into hardwood trees. Thus, the installer may often need to drive several aluminum nails into a tree portion To get one or more nails in a sufficient distance into the tree portion To retain the sign or other object. Such approach results in the creation of multiple undesirable wounds to the tree which may damage the tree and harm its ultimate value.

In addition to the use of aluminum nails for attaching signs to trees for boundary-marking purposes, some states and municipalities permit the landowner to simply mark the boundary trees with paint. While this approach avoids the problems mentioned above associated with the attachment of signs to the trees, this approach is also less desirable. First, the most obvious reason is that such approach lacks the ability to provide any information concerning the property, its owner, and/or any land use restrictions. In addition, the paint may become faded, or the portion of tree bark containing the paint may eventually peel and fall off making the markings difficult to observe. Furthermore, depending upon the type and amount of paint used, the paint may undesirably stress the tree leading to the intrusion of disease and insects.

The aforementioned problems are not limited to the hanging of signs on trees or other vertical objects. These problems may also be encountered when hanging various other forms of objects from trees such as bird feeders, ornaments, lights, etc.

Thus, the need exists for devices and methods for attaching objects such as signs, feeders, etc. to growing trees without the disadvantages and problems encountered when employing various attachment approaches commonly used in the past.

The foregoing discussion is intended only to illustrate various aspects of the related art in the field of the invention at the time, and should not be taken as a disavowal of claim scope.

SUMMARY

In accordance with at least one general form, there is provided apparatus for securing an object to a portion of a living tree. In at least one form, the apparatus may comprise a cable that includes a first end and a second end and has a length that is greater than an expected circumference of the tree portion at an end of a predetermined period of time. The apparatus may further include a mounting member that has a first portion that is secured to the first end of the cable. The mounting member may further have an opening therethrough that is dimensioned to receive the second end of the cable therethrough after the cable has been wrapped around a portion of the tree portion. The apparatus may further include at least one friction generating member that is configured to be secured in a sliding frictional engagement onto a portion of the cable that extends beyond the opening in the mounting member to cinch the cable around the tree portion. The at least one friction generating member may be dimensioned so as to interact with the mounting member as the tree portion expands to thereby permit the cable portion to frictionally slip relative to the friction generating member.

In accordance with at least one other general form, there is provided apparatus for securing an object to a portion of a living tree at a fixed elevation. In at least one form, the apparatus may comprise a cable that includes a first end and a second end and has a length that is greater than an expected circumference of the tree portion at an end of a predetermined period of time. The apparatus may further include a mounting member that is secured to the first end of the cable and has a friction generating hole therethrough that is sized to receive therein a portion of the cable therethrough in sliding frictional engagement. The friction generating hole defines a hole axis. In addition, the apparatus may further comprise an access slot that extends from an outer perimeter of the mounting member to the friction generating hole along a slot axis that is substantially transverse to the hole axis to enable the cable portion to be inserted into the friction-generating hole in frictional sliding engagement therewith to cinch the cable to the tree portion such that as the tree portion expands, the cable is configured to frictionally slide through the friction generating hole while remaining cinched to the tree portion.

In accordance with still other general forms, there is provided apparatus for securing an object to a portion of a growing tree for at least an expected period of time. In at least one form, the apparatus may comprise a flexible member that has a length that is greater than an expected circumference of the tree portion at an end of the expected period of time. The apparatus may further comprise a mounting member that is configured to movably engage first and second portions of the flexible member such that when the first and second portions of the flexible member are extended around the tree portion in opposite directions and brought into sliding frictional engagement with the mounting member, the apparatus is secured to the tree portion. In addition, the first and second portions of the flexible member can move relative to the mounting member without human intervention as the tree portion expands to enable the flexible member and mounting member to continue to be secured to the tree portion for at least the expected period of time.

In accordance with at least one general form, there is provided a method for securing an object to a portion of a growing tree at a desired height. In at least one form, the method comprises wrapping a flexible member that has a mounting assembly attached to a first end thereof around the portion of the growing tree. The method may further include movably engaging a portion of the flexible member with the mounting assembly so as to cinch the flexible member to the tree portion at the desired height such that the portion of the flexible member may move without human intervention relative to the mounting assembly to remain cinched to the tree portion as the diameter of the tree portion increases. The method may further include supporting the object on at least one of one of the flexible member and the mounting assembly.

In accordance with at least one other general form, there is provided a method for securing an object to portion of a growing tree. In at least one form, the method comprises wrapping a flexible member that has a first end and a second end around a portion of the growing tree and attaching the first end of the flexible member to the object. The method may further comprise frictionally engaging a portion of the flexible member with a portion of the object such that the flexible member and object are cinched to the tree portion and, as the tree portion expands, the flexible member frictionally slips relative to the portion of the object to accommodate tree growth while remaining cinched to the tree portion.

In accordance with still another general form, there is provided a method for attaching an object from a portion of a growing tree. In at least one form, the method comprises wrapping a flexible member that has a first end and a second end around a portion of the growing tree and slidably engaging a first portion of the flexible member with a first portion on a mounting member. The method may further comprise slidably engaging a second portion of the flexible member with a second portion on the mounting member such that the flexible member and mounting member circumferentially grip the tree portion to be suspended therefrom and wherein, as the tree portion expands, the first and second portions of the flexible member frictionally slip relative to the first and second portions, respectively. The method may further comprise supporting the object on at least one of the flexible member and mounting member.

In accordance with at least one general form of the present invention, there is provided an apparatus for securing an object to a portion of living tree at a fixed elevation. In various forms, the apparatus comprises a cable that has a first end and a second end. The invention further comprises a mounting member that has a first portion that is secured to the first end of the cable. The mounting member further has an opening in a second portion thereof that is dimensioned to receive the second end of the cable therethrough. A ferrule is configured to be secured in a sliding frictional engagement onto a portion of the second end of the cable that extends beyond the opening in the mounting member. The ferrule is dimensioned so as to be stopped by the mounting member from passing through the opening.

In accordance with another general form of the present invention, there is provided an apparatus for securing an object to a portion of a growing tree at a fixed elevation for at least a predetermined period of time. In various forms, the apparatus comprises a flexible member that has a length that is greater than or equal to an expected circumference of the tree portion at an end of the predetermined period of time.

A mounting member is configured to retainingly engage a first end of the flexible member and movably engage another portion of the flexible member such that, when the another portion of said flexible member is extended around the tree portion and brought into moving engagement with the mounting member, the apparatus is secured to the tree portion. Such configuration further permits the flexible member to move relative to the mounting member without human intervention as the tree portion expands to enable the flexible member and mounting member to continue to be secured to the tree portion for at least the predetermined time period.

In accordance with other general forms of the present invention, there is provided a method for securing an object to a portion of a growing tree at a desired elevation above the ground. In at least one form, the method comprises wrapping a flexible member that has a first end and a second end around the portion of the growing tree and securing the first end of the flexible member to a mounting member. The method also comprises movably engaging the second end of the flexible member with the mounting member such that the second end may move relative thereto without human intervention as a diameter of the tree portion increases. The method may further include supporting the object on the flexible member.

In accordance with still other general forms of the present invention, there is provided an apparatus for securing an object to a portion of a growing tree for at least an expected period of time at a desired elevation above the ground. In at least one form, the apparatus comprises a flexible member that has a length that is greater than or equal to an expected circumference of the tree portion at an end of the expected period of time. The apparatus further comprises a mounting member that is configured to movably engage first and second portions of the flexible member such that when the first and second portions of the flexible member are extended around the tree portion in opposite directions and brought into sliding frictional engagement with the mounting member, the apparatus is secured to the tree portion. The first and second portions of the flexible member can move relative to the mounting member without human intervention as the tree portion expands to enable the flexible member and mounting member to continue to be secured to the tree portion for at least the expected time period.

In accordance with other general forms of the invention, there is provided an apparatus for securing an object to a portion of a growing tree for at least a predetermined period of time. In at least one form, the apparatus comprises a flexible member that has a length that is greater than or equal to an expected circumference of the tree portion at an end of the predetermined period of time. The apparatus further includes a mounting member that comprises a retainer body that is configured for attachment to a first end of the flexible member. A latch member is attachable to the retainer body. The latch member is configured to movably receive a portion of the flexible member therethrough. When the latch member is attached to the retainer body, the latch member is configured to apply frictional sliding resistance to the portion of the flexible member that extends therethrough.

In connection with another general form of the present invention, there is provided an object that is configured for attachment to a portion of a growing tree at a desired elevation above the ground. In at least one form, the object comprises a body that has a first portion and a second portion. The invention further comprises a cable that has a first end that is attachable to the first portion of the body and a second end portion that slidably extends through an opening in a second portion of the body. A ferrule is configured to be secured in a sliding frictional engagement onto the second end portion of the cable that extends beyond the opening in the body. The ferrule is dimensioned so as to be stopped by the body from passing through the opening.

In connection with other general forms, there is provided a method for securing an object to a portion of a growing tree. In various forms, the method comprises wrapping a flexible member that has a first end and a second end around the portion of the growing tree. In addition, the method comprises securing the first end of the flexible member to a first portion of the object and movably engaging the second end of the flexible member with a second portion of the object such that the second end may move relative thereto without human intervention as a diameter of the tree portion increases.

In accordance with another general form, there is provided a process for manufacturing an object to be secured to a portion of a growing tree. In at least one form, the process comprises determining a period of time during which the object is to be secured to the tree and estimating a circumference of the portion of the tree at the end of the period of time. The method further comprises providing a flexible member having length such that when a first end thereof is secured to the object, the length of the flexible member in combination with the object is substantially greater than the estimated circumference. A second portion of the flexible member is configured to extend around the tree portion and movably engage the object in slidable frictional engagement such that the second portion may frictionally slide relative thereto without human intervention as a diameter of the tree portion increases.

In connection with another general form, there is provided a method for securing an object to portion of a growing tree. In at least one form, the method comprises wrapping a flexible member having a first end and a second end around a portion of the growing tree and attaching the first end of the flexible member to the object. The method further comprises frictionally engaging a portion of the flexible member with a portion of the object such that the flexible member and object combine to circumferentially grip the tree portion to be suspended therefrom and, as the tree portion expands, the flexible member frictionally slips relative to the portion of the object.

In accordance with still other general forms of the invention, there is provided a process for manufacturing a device for securing an object to a portion of a growing tree. In at least one form, the process comprises providing a mounting member that is configured to support the object. The process further comprises determining a period of time during which the object is to be secured to the tree and estimating a circumference of the portion of the tree at the end of the period of time. The process also includes providing a flexible member that has a length such that when a first end thereof is secured to the mounting member, an overall length of the flexible member and mounting member exceeds the estimated circumference and wherein a second portion of the flexible member is configured to extend around the tree portion and movably engage the mounting member in slidable frictional engagement such that the second portion may frictionally slide relative thereto without human intervention as a diameter of the tree portion increases.

In accordance with yet another general feature, there is provided a method for securing an object to portion of a growing tree. In at least one form, the method comprises wrapping a flexible member that has a first end and a second end around a portion of the growing tree. The method further comprises attaching the first end of the flexible member to a mounting member and frictionally engaging a portion of the flexible member with a portion of the mounting member such that the flexible member and mounting member combine to circumferentially grip the tree portion to be suspended therefrom. As the tree portion expands, the flexible member frictionally slips relative to the portion of the mounting member. The method further comprises supporting the object on the flexible member.

In accordance with another general form, there is provided a method for securing an object to a portion of a growing tree at a desired elevation above the ground. In at least one form, the method comprises wrapping a flexible member that has a first end and a second end around the portion of the growing tree and movably attaching the first end of the flexible member to the object such that the first end may move relative thereto without human intervention as a diameter of the tree portion increases. The method further includes movably attaching the second end of the flexible member to the object such that the object is cinched to the tree portion at the desired elevation and such that the second end may move relative to the flexible member without human intervention as the diameter of the tree portion increases.

In accordance with still another form, there is provided a method for attaching an object from a portion of a growing tree. In at least one form, the method comprises wrapping a flexible member that has a first end and a second end around a portion of the growing tree and slidably engaging a first portion of the flexible member with a first portion on a mounting member. The method further comprises slidably engaging a second portion of the flexible member with a second portion of the mounting member such that the flexible member and mounting member circumferentially grip the tree portion to be suspended therefrom and wherein, as the tree portion expands, the first and second portions of the flexible member slip relative to the first and second portions of the mounting member. The method may further include supporting the object on the flexible member.

In connection with another general form, there is provided an object that is configured for attachment to a portion of living tree at a fixed elevation. In at least one form, the object comprises a body that has a first portion and a second portion. A flexible member has a first end that is secured to the first portion of the body for extending around a circumference of the tree portion. Automatic adjustment means is configured to operably engage a second portion of the flexible member for automatically maintaining an amount of tension within flexible member as the tree portion expands.

In accordance with another form of the present invention, there is provided an apparatus for securing an object to a portion of living tree at a fixed elevation. In at least one form, there is provided a flexible member for extending around a circumference of the tree portion. The invention further comprises automatic adjustment means that are operably attached to the flexible member for automatically maintaining an amount of tension within the means for extending as the tree portion expands. The invention further comprises means for supporting the object thereon and interacting with at least one of the flexible member and the automatic adjustment means.

In connection with another general form, there is provided a kit for attaching objects having at least two preformed holes therethrough to portions of growing trees for durations of expected installation periods. In at least one form, the kit comprises a chart that contains recommended cable lengths for a plurality of different tree species for a plurality of different installation periods. The kit further contains a bulk amount of cable that is sized to pass through at least two of the holes in each of the objects. The kit further comprises a plurality of stop members that are configured to be non-movably attached to the cable. Each of the stop members are sized and shaped to prevent the stop member from passing through one of the preformed holes in each of the objects. The kit also includes a plurality of ferrules that are each configured to be secured in a sliding frictional engagement onto portions of the cable. Each of the ferrules are sized and shaped to prevent the ferrule from passing through another one of the preformed holes in each of the objects.

In accordance with other general aspects, there is provided a kit for attaching objects having at least two preformed holes therethrough to portions of growing trees for expected installation periods. In at least one form, the kit comprises a chart that contains recommended cable lengths for a plurality of different tree species for a plurality of different installation periods. The kit further includes a plurality of precut cables wherein each of the cables is sized to pass through at least two of the holes in each of the objects. Each of the precut cables has a first end and a second end. The kit further comprises a plurality of stop members that are each configured to be attached to a corresponding one of the precut cables. Each stop member is sized and shaped to prevent the stop member from passing through one of the preformed holes in each of the objects. The kit further comprises a plurality of ferrules that are configured to be secured in sliding frictional engagement onto a portion of a corresponding one of the precut cables. Each of the ferrules is sized and shaped to prevent the ferrule from passing through another one of the preformed holes in each of the objects.

In accordance with still other general aspects, there is provided a kit for attaching objects that have at least two preformed holes therethrough to portions of growing trees for expected installation periods. In at least one form, the kit comprises a chart containing recommended cable lengths for a plurality of different tree species for a plurality of different installation periods. The kit further includes a plurality of precut cables wherein each of the precut cable is sized to pass through at least two of the holes in each of the objects. Each of the precut cables has a first end with a stop member non-movably attached thereto. Each stop member is sized and shaped to prevent the stop member from passing through one of the preformed holes in each of the objects. The kit further comprises a plurality of ferrules that are each configured to be secured in a sliding frictional engagement onto portions of the cable. Each of the ferrules are sized and shaped to prevent the ferrule from passing through another one of the preformed holes in each of the objects.

In accordance with other general aspects, there is provided a kit for attaching objects to portions of growing trees for expected installation periods. In at least one form, the kit comprises a chart that contains recommended cable lengths for a plurality of different tree species for a plurality of different installation periods. The kit further includes a plurality of mounting members that each have at least two preformed holes therethrough. Each mounting member is configured to support an object. The kit further includes a bulk amount of cable that is sized to pass through at least two of the holes in each of the hanger members. The kit also includes a plurality of stop members that are configured to be attached to the cable. Each stop member is sized and shaped to prevent the stop member from passing through one of the preformed holes in each of the mounting members. The kit further comprises a plurality of ferrules that are each configured to be secured in a sliding frictional engagement onto portions of the cable. Each of the ferrules are sized and shaped to prevent the ferrule from passing through another one of the preformed holes in each of the mounting members.

In connection with another general form, there is provided a kit for attaching objects to portions of growing trees for expected installation periods. In at least one form, the kit comprises a chart that contains recommended cable lengths for a plurality of different tree species for a plurality of different installation periods. The kit further includes a plurality of mounting members that are each configured to support an object. Each of the mounting members has at least two preformed holes extending therethrough. The kit also includes a plurality of precut cables that are each sized to pass through at least two of the holes in each of the objects. Each of the precut cables has a first end with a stop member non-movably attached thereto. Each stop member is sized and shaped to prevent the stop member from passing through one of the preformed holes in each of the objects. The kit further includes a plurality of ferrules that are configured to be secured in a sliding frictional engagement onto corresponding portions of the cable. Each of the ferrules is sized and shaped to prevent the ferrule from passing through another one of the preformed holes in each of the objects.

FIGURES

Various features of the embodiments described herein are set forth with particularity in the appended claims. The various embodiments, however, both as to organization and methods of operation, together with advantages thereof, may be understood in accordance with the following description taken in conjunction with the accompanying drawings as follows.

FIG. 3 is a left side view of the tree and embodiment depicted in FIGS. 1 and 2;

FIG. 6 is a front view of a portion of a mounting member of an embodiment of the present invention;

FIG. 7 is a front view of a bushing member of an embodiment of the present invention;

FIG. 8 is a side view of the bushing member of FIG. 7;

FIG. 9 is a cross-sectional view of the bushing member of FIGS. 7 and 8 taken along line 9-9 in FIG. 7;

FIG. 22 is a partial cross-sectional view of another mounting member embodiment and portions of another flexible member embodiment of the present invention;

FIG. 23 is a perspective assembly view of the mounting member of FIG. 22 and portions of the flexible member of FIG. 22;

FIG. 47 is a top view of another hanger member embodiment of the present invention;

FIG. 48 is a front view of the hanger member embodiment of FIG. 47;

FIG. 49 is a side elevational view of the hanger member embodiment of FIGS. 47 and 48;

FIG. 50 is a top exploded assembly view illustrating attachment of an object to the hanger member embodiment of FIGS. 47-49;

FIG. 51 is a front view of another hanger member embodiment of the present invention;

Corresponding reference characters indicate corresponding parts throughout the several views. The exemplifications set out herein illustrate various embodiments of the invention, in one form, and such exemplifications are not to be construed as limiting the scope of the invention in any manner.

DESCRIPTION

Figure 1:
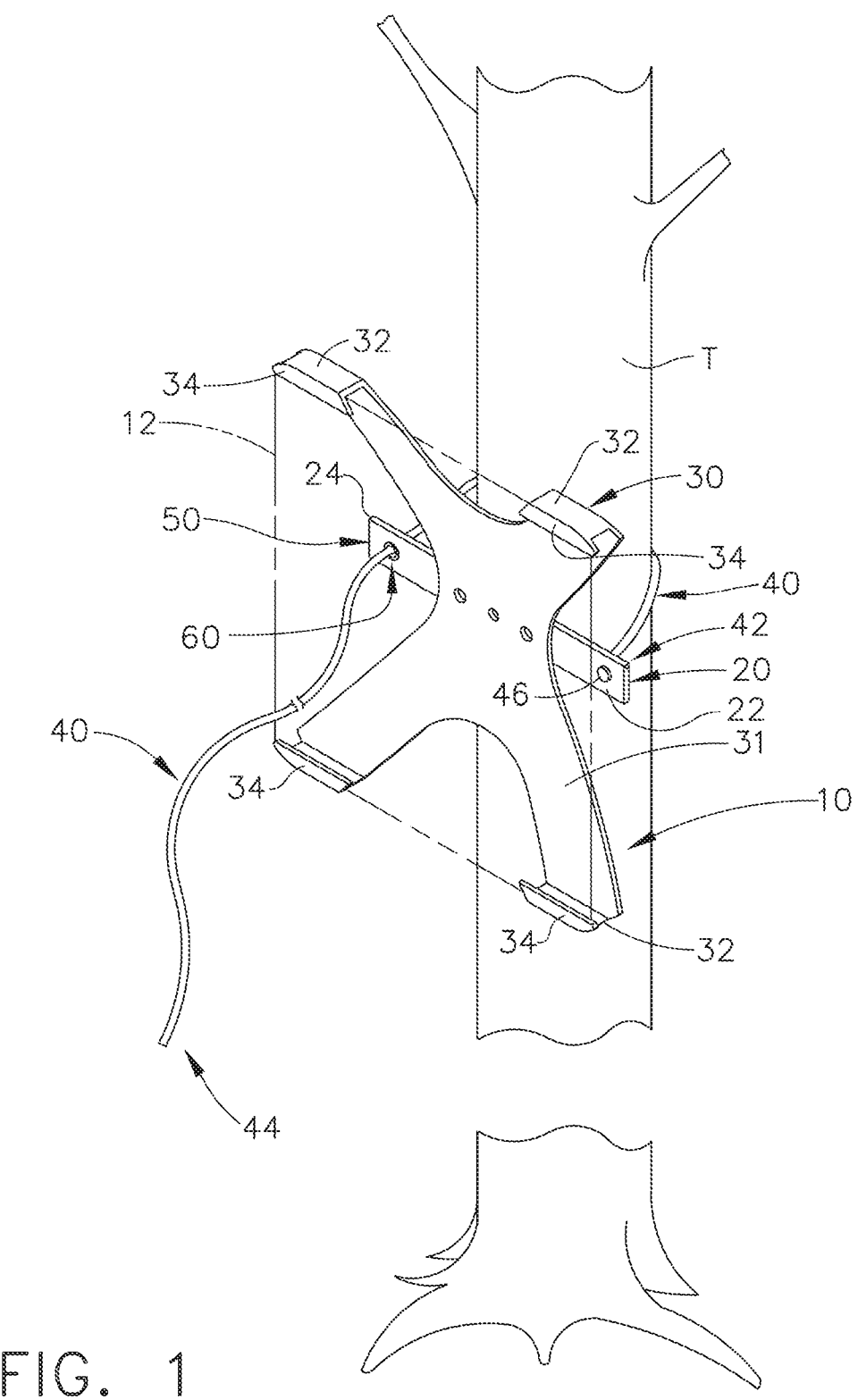
FIG. 1 is a perspective view of an embodiment of the present invention coupled to a tree.

Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments, the scope of which is defined solely by the appended claims. The particular features, structures, or characteristics illustrated or described in connection with one embodiment may be combined, in whole or in part, with the features structures, or characteristics of one or more other embodiments without limitation.

It is estimated that there are 100,000 tree species throughout the world. Trees can be identified to genus or species by a combination of the tree's shape and the characteristics of its bark, leaves, flowers and fruit. Bark is a tree's natural armor and generally protects the tree from external threats. However, the bark is also the tree's most vulnerable part. The bark is continually renewed from within; it insulates against the heat and cold and wards off insects. The inner bark is called the "phloem". The phloem is a living tissue and carries manufactured food (sugars) from the leaves to the roots. The "cambium" layer, which is commonly only a few cells thick, is the regenerative layer that gives birth to "xylem" to its inside and phloem to its outside. Thus, it annually produces new bark and new wood in response to hormones that pass down through the phloem with food from the leaves.

If the food-transporting phloem is severed all the way around the tree, food cannot be carried to the roots and they will eventually die. Indeed, one process employed to remove competition from unwanted trees without actually harvesting the tree is known as "girdling". Girdling involves severing the phloem layer completely around the tree so no nutrients can pass to the tree's roots. The tree slowly dies in place, opening up the forest canopy to permit more light to pass to adjacent desirable trees. If the phloem layer is not completely severed around the tree, nutrients can still flow through the un-severed portion and the tree's adjacent cambial material may eventually overgrow the girdle.

Trees grow in diameter every year. The rate at which a tree grows in diameter is largely related to the species of tree, its environment and the annual weather that it experiences. For example, the amount of sunlight and rain available to it can effect the tree's growth rate. Other factors such as the quality and type of soil can also effect how fast a tree grows. Over the years, various methods and tables have been developed for estimating how much a tree can be expected to grow annually. See, e.g., *Tree Growth Rate Table: Annual Per-*

*centage Growth* by Dr. Kim D. Coder, University of Georgia, December 1996, the entire disclosure of which is herein incorporated by reference.

FIGS. 1-5 illustrate one embodiment of an apparatus 10 for hanging or suspending an object 12 from a portion of a tree or other vertical object, generally designated as T. In FIGS. 1-5, the object 12 is depicted in phantom lines and may comprise a sign, for example. A variety of different sign constructions and compositions are known. For example, the sign 12 may be fabricated from a metal material such as aluminum. Signs may also be fabricated from various types and thicknesses of polymer materials (flexible or rigid) or from various forms of paper or fiber-reinforced paper.

In this embodiment, the apparatus 10 includes a mounting member 20 and a hanger member 30 that is configured to support the sign 12. Although the Figures depict the mounting member 20 and hanger member 30 as separate components, it will be appreciated that the mounting member 20 and hanger member 30 may be integrally formed out of the same material. It will be further appreciated that the mounting member 20 and hanger member 30 may be provided in different shapes that are better suited to support a particular type of sign or other object.

In the illustrated embodiment, the hanger member 30 has a back portion 31 that has support ledges 32 and support lips 34 formed thereon that enable the sign 12 to be slid into or otherwise inserted therein. In at least one embodiment, the hanger member 30 is fabricated from a non-corrosive metal material such as aluminum. The aluminum may have a thickness that enables the user to bend the lips 34 inward into retaining engagement with the sign 12 once it has been installed therein to assist in retaining the sign 12 within the hanger member 30. In other embodiments, the hanger member 30 may be fabricated from thicker metal, polymer material or other suitable material that is not sufficiently malleable to facilitate such bending. In those cases, the support lips 34 may be spaced from a back portion 31 of the hanger member 30 such that a sliding frictional fit is established between the sign 12, the lips 34 and the back portion 31. In still other embodiments, one or more set screws (not shown) may be provided through one or more of the lips 34 to retain the sign 12 in place once it has been installed in the hanger member 30. In still other embodiments, the hanger member 30 may be substantially planar. In such embodiments, the sign 12 may be affixed to the hanger member 30 by a variety of different fastener arrangements such as, for example, clamps, screws, bolts, rivets, adhesive, double-sided tape, paper fastener brads, etc.

In at least one embodiment, the mounting member 20 comprises an elongated bar. For example, the mounting member 20 may comprise a piece of aluminum material and be riveted, screwed, bolted, welded, glued, etc. to the hanger member 30. In other embodiments, the mounting member 20 may be fabricated from steel (e.g., stainless or other forms of painted or galvanized steel) or other metal or polymer material, wood or other suitable material that may be similarly attached to the hanger member 30.

In various embodiments, the apparatus 10 further includes a flexible member 40 that has a first end 42 and a second end 44. In at least one embodiment, the flexible member 40 comprises braided metal cable or wire rope. It is conceivable, however, that the flexible member 40 may comprise other forms of cable or wire fabricated from a variety of materials. It is further anticipated that, for at least some embodiments, the flexible member 40 may comprise a strap fabricated from cloth, fiber, metal, polymer, rubber or various combinations of such materials. The flexible member 40 may also comprise a solid wire or similar arrangement fabricated from metal or polymer. As will become further apparent as the Detailed Description proceeds, the flexible member 40 should be sufficiently flexible to enable it to extend around at least a portion of the tree portion T as described below, yet have sufficient tensile strength when in use to avoid failure as the tree's girth continues to expand.

In the illustrated embodiment, the first end 42 of the flexible member 40 is attached or affixed to a first end or portion 22 of the mounting member 20. In at least one embodiment, wherein the flexible member 40 comprises braided cable, the first end of the flexible member 40 extends through a hole 23 in the first end 22 of the mounting member 20 and has a lug or stop 46 attached thereto to prevent the flexible member 40 from pulling through the hole 23. The lug 46 may be fabricated from, for example, aluminum or other metal or polymer material and be configured to be non-movably crimped onto or otherwise affixed to the first end of the cable 40. It will be understood that other methods of fastening the first end 42 of the flexible member 40 to the first end 22 of the mounting member 20 may be employed. For example, the first end 42 of the flexible member 40 may be permanently attached to the first end 22 of the mounting member 20 by welding or other suitable fastener arrangements. In still other embodiments, the flexible member 40 may be clamped or glued to the first end 22 of the mounting member 20.

Figure 1A:
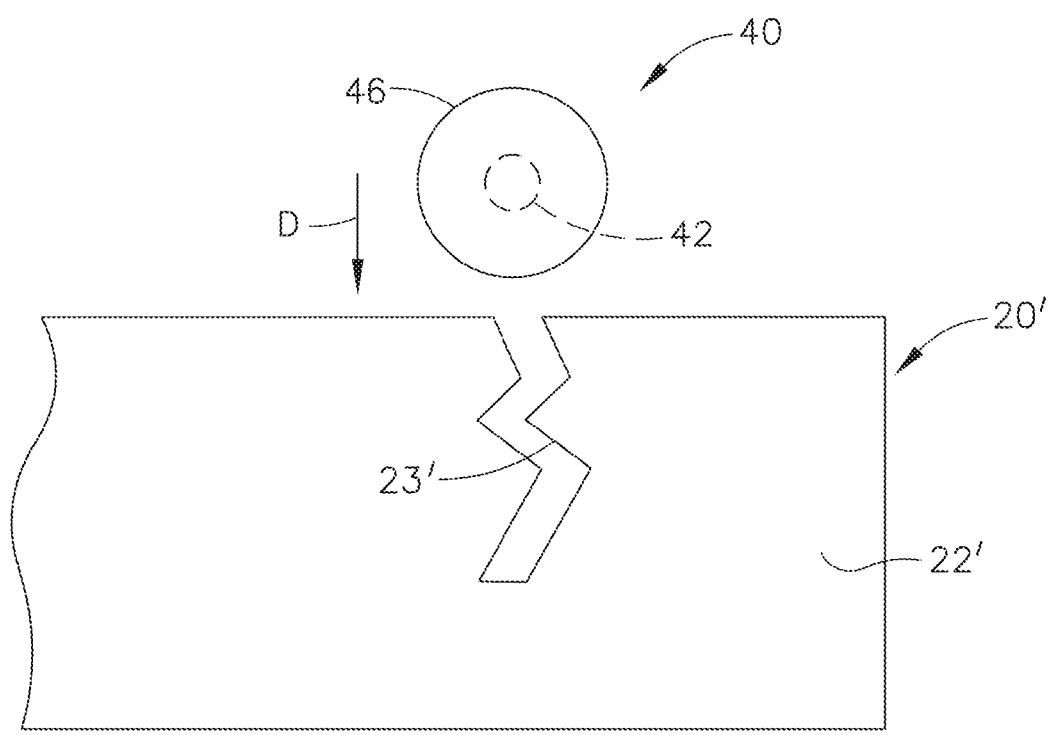
FIG. 1A is a front view of a portion of a mounting member of one embodiment of the present invention.
Figure 1B:
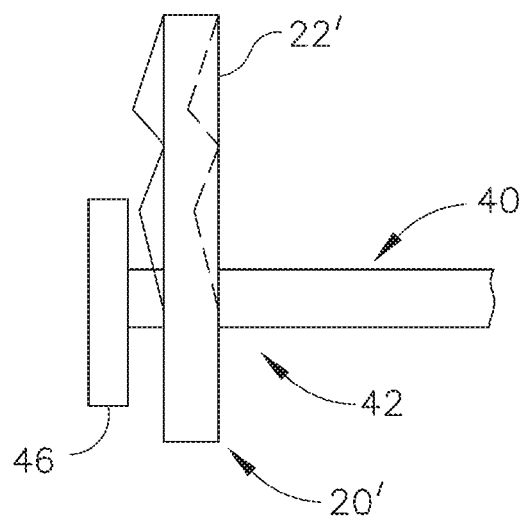
FIG. 1B is a left side view of the mounting member of FIG. 1A supporting a first end of a flexible member therein.
Figure 2:
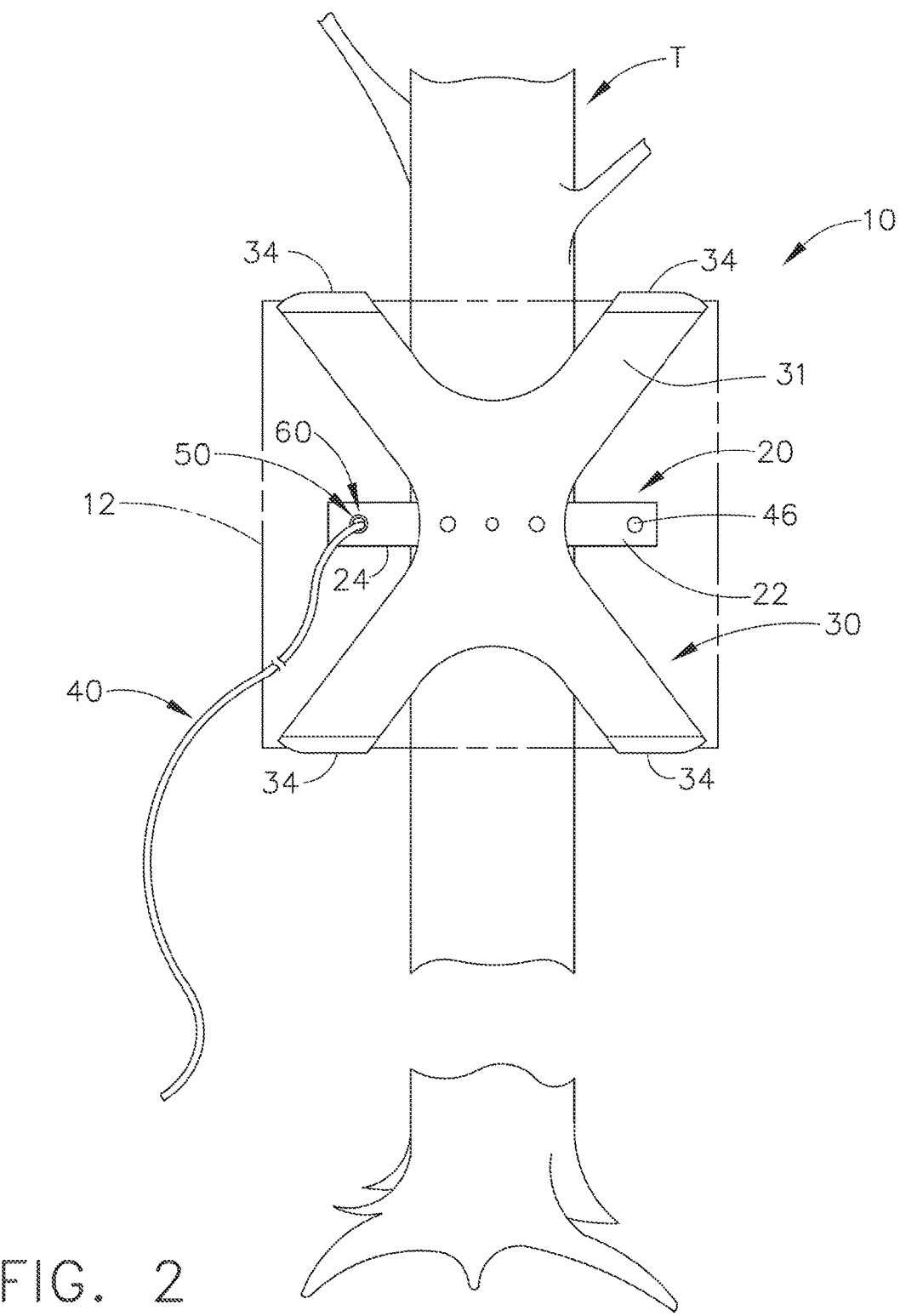
FIG. 2 is a front view of the tree and embodiment depicted in FIG. 1.

FIGS. 1A and 1B illustrate a portion of an alternative mounting member 20' wherein the first end 22' has an irregular slot 23' therein that has somewhat sharp edges. The slot 23' is formed by cutting the irregular shape in the first end 22' of the mounting member 20' and the one side of the slot 23' is bent slightly out of plane with the remaining portion of the mounting member 20' to form a space therebetween that is sized relative to the first end 42 of the flexible member 40. Such arrangement enables the user to jam the first end 42 of the flexible member 40 down through the slot 23' (arrow "D" in FIG. 1A) and be frictionally retained therein. That is, once the flexible member 40 has been seated into the slot 23', the sharp edges dig into the flexible member 40 to prevent it from being inadvertently dislodged from the slot 23'.

In various embodiments, the flexible member 40 is configured to movably engage a second end or portion 24 of the mounting member 20. More specifically, in the depicted embodiment, the flexible member 40 is looped around the backside of the tree portion T and engages a latch or tension relief mechanism 50 that is attached to or otherwise formed in the second end 24 of the mounting member 20.

In at least one embodiment, the latch or tension relief mechanism 50 comprises a bushing or insert 60 that is attached to the second end or portion 24 of the mounting member 20. For example, as shown in FIGS. 6-9, the bushing 60 may have a flanged end 62 and a body portion 64 that is sized to be inserted through a hole 25 in the mounting member 20. In one embodiment, for example, a bayonet-type connection may be employed. For example, a pair of opposed retention tabs 65 are provided on the body portion 64 of the bushing 60 that are spaced from the flanged end 62 a distance that is substantially equal to the thickness of the mounting member 20. The outer surface 66 of the portion of the body 64 extending between the retention tabs 65 may be formed with a taper as shown in FIGS. 8 and 9. The bushing 60 further has an axial hole 68 extending therethrough for receiving the flexible member 40 therein. A slot 69 is provided through the body portion 64 and flanged end 62 to enable the user to insert a portion of the flexible member 40 into the axial hole 68 during installation. Once the flexible member 40 has been inserted into the hole 68 in the bushing 60, the bushing 60 may then be inserted into the hole 25 in the first end 22 of the mounting member 20. To do so, the retention tabs 65 are aligned with corresponding tab openings 27 in the hole 25 and the bushing 60 is inserted therein. Thereafter, the bushing 60 is rotated to a position wherein the tabs 65 are no longer aligned with the tab openings 27. In at least one embodiment, each tab 65 has a cam surface 67 formed thereon such that as the bushing 60 is rotated within the hole 25, the cam surfaces 67, interacting with corresponding portions of the mounting member 20, urge the bushing 60 into the hole 25. As the tapered outer surface portion 66 on the body portion 64 is drawn into the hole 25, the body portion 64 is forced into sliding frictional engagement with the portion of the flexible member 40 passing through the axial hole 68 to establish a frictional sliding fit therebetween.

The bushing 60 may be installed in the above-described manner by the manufacturer or by the end user in the field. For example, when using the embodiment wherein the first end 42 of the flexible member 40 has been attached to the first end 22 of the mounting member 20, once the user passes the second end 44 of the flexible member 40 around the backside of the tree portion T, it is passed through the hole 25 in the second end 24 of the mounting member 20 and is inserted through the slot 69 into the hole 68 in the bushing 60. The user may then attach the bushing 60 to the mounting member 20 in the manner described above. Once the bushing 60 has been attached to the mounting member 20, the user can locate the apparatus 10 at a desired height on the growing tree portion T and then cinch or secure the flexible member 40 around the tree sufficiently tightly so as to retain it in position, yet not so tight as to cut through the outer layer of bark and into the inner bark and cambium layer. The flexible member 40 may be cinched or secured around the tree portion T by pulling the second end 44 of the flexible member 40 away from the mounting member 20. The remaining portion of the flexible member 40 is permitted to hang there to eventually be taken up as the tree continues to grow. Thereafter, and/or at any other suitable time, the user may install the sign 12 in the hanger member 30 using any of the various fastener arrangements described above. As the tree continues to grow, the flexible member 40 will frictionally slide through the bushing 60 to accommodate such growth without any need for human intervention. When the circumference of the tree exceeds the length of the flexible member 40 and retainer 20, the apparatus 10 may fall from the tree portion To prevent any inadvertent damage to the tree as the tree portion T continues to grow. The apparatus may be reused on a smaller tree or the user may replace the original flexible member with a longer flexible member and reattach it to the tree portion.

In an alternative method wherein a mounting member 20' is employed and the bushing 60 has been installed therein by the manufacturer, the user wraps the flexible member 40 protruding from the bushing 60 around the back side of the tree "T" to bring the first end 42 of the flexible member adjacent to the slot 23'. The user then seats the first end 42 of the flexible member 40 down into the slot 23'. If necessary, the user may pull enough of the flexible member 40 back through the bushing 60 to enable the first end 42 to cinch or secure the apparatus 10 to the tree portion T. Again, as the tree portion T continues to grow, the flexible member 40 will slide through the bushing 60 to accommodate such growth without any need for human intervention. When the circumference of the tree exceeds the length of the flexible member 40 and retainer 20 member, the flexible member may completely pull through the bushing permitting the apparatus to release from the tree portion T to avoid damage thereto as the tree continues to grow. The apparatus may be reused on a smaller tree or the user may replace the original flexible member with a longer flexible member and reattach it to the tree portion.

Once installed in the manners described above, the flexible member 40 retains the sign 12 in desired position on the tree portion T at a desired elevation above the ground. As the tree grows, the flexible member 40 is permitted, by virtue of the sliding frictional fit with the latch assembly 50, to slip relative thereto to accommodate the tree growth. A range of sliding fits are contemplated. Preferably, the sliding frictional fit comprises the minimum amount of sliding frictional fit required to enable the apparatus to be cinched in position around the tree portion with sufficient retention force so as to retain the object to be hung thereon at a desired elevation above the ground, yet not so tight as to cut through the outer layer of bark and into the inner bark and cambium layer of the tree portion. Such fit further facilitates the remaining portion of the flexible member protruding out through the latch arrangement to slide relative thereto without any subsequent human intervention so as to automatically accommodate the growth of the tree portion without significantly damaging the inner bark and cambium layer. The sliding frictional fit may also enable the user to pull the flexible member out through the bushing 60 without the use of tools to detach the apparatus 10 from the tree portion T. The latch or tension relief mechanism 50 serves to automatically relieve the tension that may build in the flexible member to accommodate the expansion of the tree portion without human intervention.

Such arrangements are distinguishable from the use of cloth or fabric straps and locking buckles that are commonly used to attach devices such as treestands to trees. These fabric strap and buckle arrangements are designed to lock the treestand to the tree and not slip. Such straps are generally fabricated from materials that are selected because they stretch very little when placed under tension. Thus, as the tree continues to grow, the amount of tension builds in the strap. If left unchecked, the strap may ultimately break or grow into the tree sufficiently to damage the inner bark and cambial layer. To prevent this from happening, the user must periodically inspect the strap and manually release the buckle to relieve an amount of tension in the strap.

Also, the use of various flexible member embodiments and tension relief mechanisms disclosed herein is distinguishable from those applications wherein a relatively elastic member such as a bungee cord, elastic strap or the like is simply wrapped around the tree and otherwise hooked or attached to the object. The ability of such arrangement to accommodate tree growth for the installation period is dependent upon the modulus of elasticity of the strap that is employed. As the tree grows, the elastic strap stretches under tension. Such tension, however, will continue to build as the tree grows to a point wherein the strap may, in extreme cases, damage the tree or break. The flexible members and tension relief mechanism(s) of various embodiments of the present invention serve to automatically accommodate the estimated tree growth during a specific time period without permitting tension to build within the flexible member to a magnitude that might damage the tree or cause the flexible member to fail before the end of the installation period.

Alternative latch/tension relief mechanisms are contemplated and are intended to be encompassed by at least some of the appended claims. For example, another latch or tension relief arrangement of the present invention comprises a hole provided through the second end or second portion of the mounting member 20 that is sized to establish a sliding frictional fit with the flexible member. The flexible member 40 may be installed through the hole by the manufacturer. In still other embodiments, a slot may be provided through a portion of the mounting member to enable the end user to introduce the flexible member into the hole in the field. A screw or other fastener arrangement may be employed to close the slot to retain the flexible member within the hole while establishing a desired amount of sliding frictional fit therebetween. It will be further appreciated that the holes in the various embodiments through which the flexible member passes may be knurled if desired to establish a desired amount of sliding frictional fit between the mounting member and the flexible member.

The bushings and inserts disclosed herein may be fabricated from a variety of different metal, polymer, rubber or other suitable materials. The bushings may be attached to their respective mounting members by a variety of alternative methods. For example, the bushings may be press-fit into their respective holes. They may be retained with the holes or openings in the mounting members by tabs, threads, welds, solder, adhesive, etc. In at least some embodiments, the amount of sliding frictional fit attained between the bushing and the flexible member may be dependent upon the duration or amount of contact achieved between the bushing and the flexible member. That is, those bushings with longer body portions may provide additional frictional contact with the flexible member as it slides therethrough. Those bushings with shorter body portions may offer less frictional contact with the flexible member and therefore the magnitude of the sliding frictional fit established between the flexible member and the bushing may be smaller. It will be further appreciated that the first end of the flexible member may be attached to the mounting member at various first portions other than the first end thereof.

Alternative embodiments employ two latch or tension relief mechanisms 50, 50'. In such embodiments, for example, the first end 42 of the flexible cable 40 is passed through the second latch 50' supported in the first end or portion 22 of the mounting member 20. Thus, as the tree grows, the first and second latches or tension relief mechanisms 50, 50' will automatically relieve tension in the flexible member 40 to accommodate additional tree growth. See FIG. 5B.

In still other embodiments, no separate support member or hanger is employed. In such embodiments, for example, the latch(es) 50 are attached to or otherwise supported in the object itself. Thus, the flexible member 40 operably interfaces with the object (instead of the support member) and the latch(es) therein in the above-described manner(s).

Regardless of the number and type of latch or tension relief mechanism(s) employed, the flexible member 40 may be sized such that, after being cinched or otherwise secured to the tree portion, the flexible member is permitted to protrude out of the latch(es) a sufficient distance so as to accommodate the growth of the tree portion for a desired period of time. As the tree portion continues to grow, the flexible member 40 continues to frictionally slip through the latch(es) 50 to accommodate such growth without any human intervention while retaining the object at the desired height above the ground until eventually all of the flexible member 40 pulls through the latch(es) 50, at which point the apparatus may fall from the tree or the original flexible member may be replaced with a longer flexible member to accommodate further tree growth.

The length of the flexible member employed may depend upon the amount of tree growth that is expected to occur over the duration of time that the sign or other object is expected to be suspended from the tree. In one alternative, for example, the desired installation period may be related to the amount of time that the sign is expected to last. For example, paper signs may be expected to last only a few years. Polymer signs and aluminum signs generally last for longer periods until the lettering thereon fades and portions or all of the lettering become illegible. Once the "installation period", the "expected period", or the "predetermined period" (the desired period during which the sign or other object is to remain suspended on the tree) has been determined, the amount of tree growth that is expected to occur during that installation period is then estimated. That is, the circumference of the tree portion at the end of the installation period is estimated. When attached together in the various manners described above, the flexible member 40 and mounting member 20 must be sufficiently long enough in the aggregate to extend around the circumference of the tree portion at the end of the installation period and remain secured thereto at least through the duration of the installation period.

By way of example only, assume the user desires to hang a sign for a period of ten years (installation period) on an oak tree portion That has an initial diameter of four inches. It is known that the particular species of oak is estimated to grow approximately one inch in diameter each year. Thus, at the end of the ten year period, it is estimated that the tree will now have a diameter of approximately fourteen inches (4"+10"). The circumference of the tree portion at the end of the ten year period may then be calculated using the formula: $\pi d$, where:

$\pi = 3.14\ldots$ and d=the ending diameter of the tree

Figure 4:
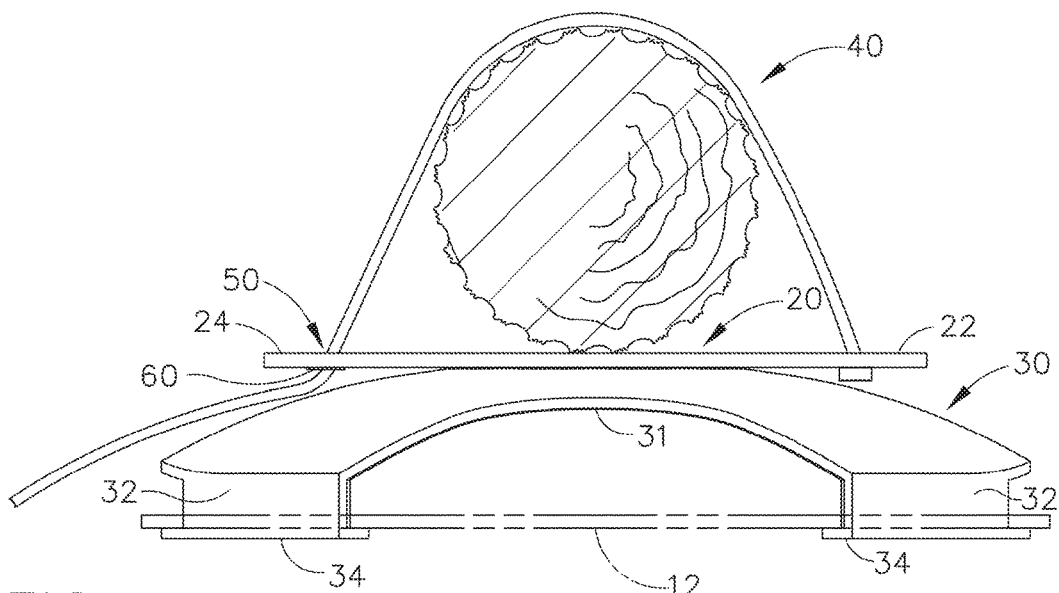
FIG. 4 is a top view of the embodiment of FIGS. 1-3 showing the tree in cross-section.
Figure 5:
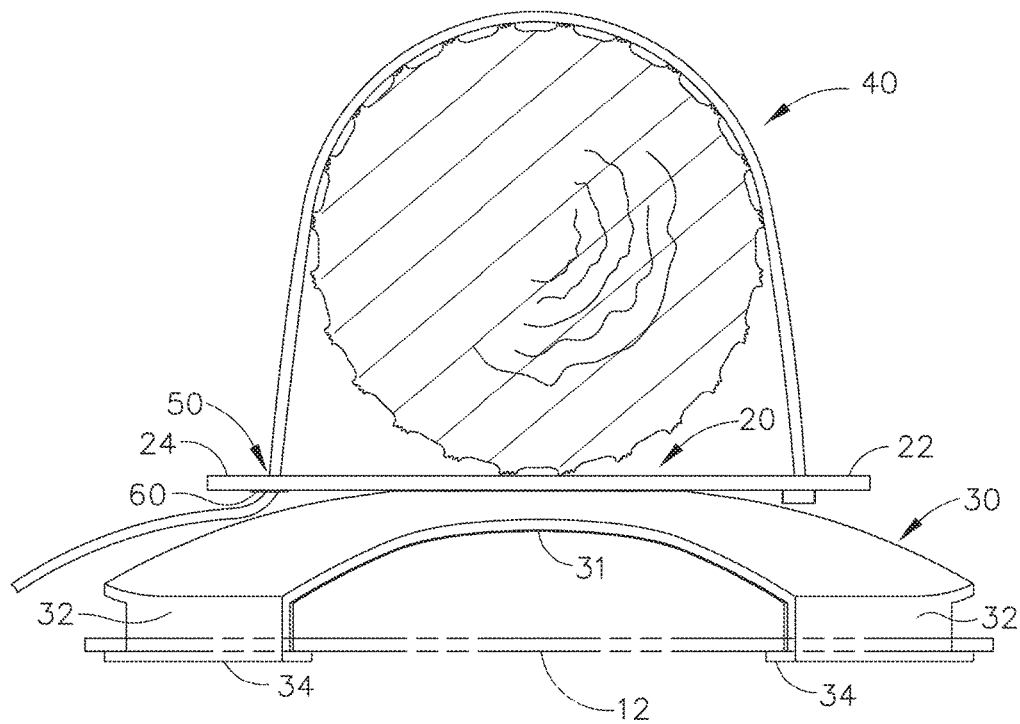
FIG. 5 is another top view of the embodiment of FIG. 4 after the diameter of the tree has increased.

Thus, in the present example, the tree portion is expected to have a circumference of approximately forty-four inches at the end of the ten year installation period. In this example, assume that the distance between the first end 22 and the second end 24 of the mounting member 20 is approximately six inches. As such, at a minimum, the flexible member 40 should have a length of at least approximately thirty-eight inches (44"−6"=38") to enable the mounting member 20 and flexible member 40 to accommodate that amount of tree growth. However, because the growth rate of a tree has been estimated and can vary depending upon various characteristics of the environment in which it is growing and the weather conditions it experienced over the ten year period, the user may wish to add a few more inches to the flexible member 40 to be reasonably assured that the sign will remain attached to the tree portion at least through the duration of the ten year period. For example, the user may wish to add a few inches to the flexible member to be relatively sure that the flexible member is long enough to accommodate the actual amount of tree growth to occur during the desired installation period. FIG. 4 illustrates the apparatus attached to a tree portion having a starting cross-sectional diameter. FIG. 5 illustrates the apparatus 10 and the same cross-sectional tree portion after the tree portion has expanded to a larger diameter. The latch 50 served to automatically relieve the tension in the flexible member without the need for human intervention.

As indicated above, in various embodiments, it may be desirable for the "sliding frictional fit" generated between the latch or tension relief mechanism(s) 50 and the flexible member 40 to be of a sufficient magnitude to cinch or otherwise secure the apparatus to the growing tree portion, yet permit the flexible member 40 to frictionally slip relative to the latch 50 to accommodate the tree portion as it grows without cutting through and damaging the inner bark and cambium layer and without the need for human intervention or manipulation of the apparatus for at least the duration of the installation period. As can be seen in FIGS. 4 and 5, there are considerable portions of the tree's circumference that remain untouched by the mounting member 20 and the flexible member 40 which reduce any likelihood of completely severing the phloem layer which could kill the tree.

Figure 4A:
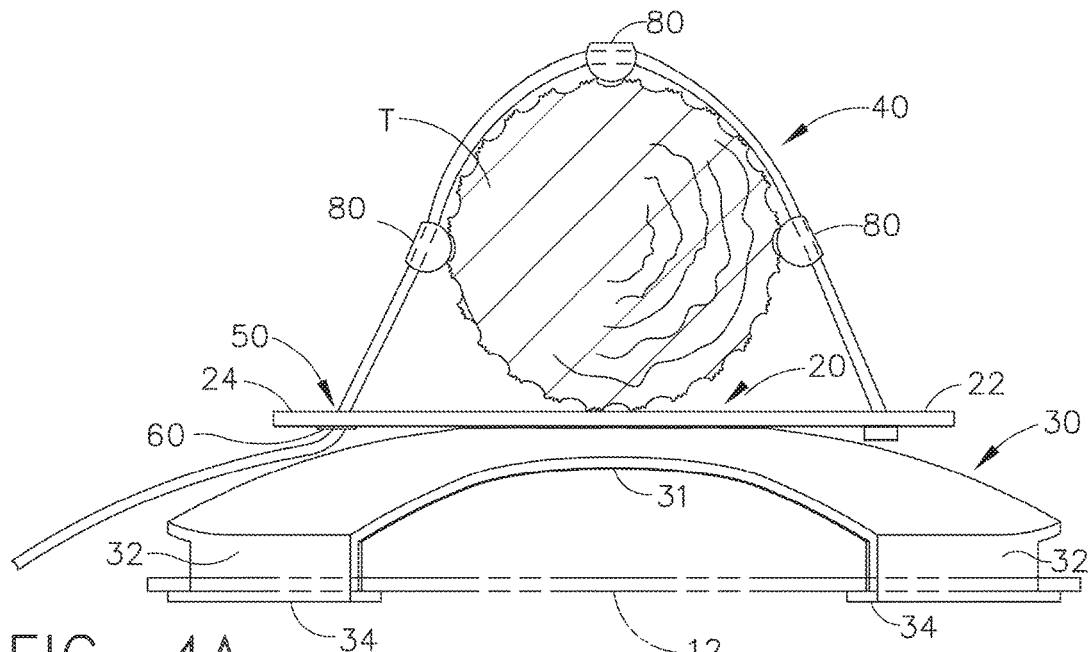
FIG. 4A is another top view of the embodiment of FIGS. 1-3 with a plurality of bumper members attached to the flexible member.
Figure 5A:
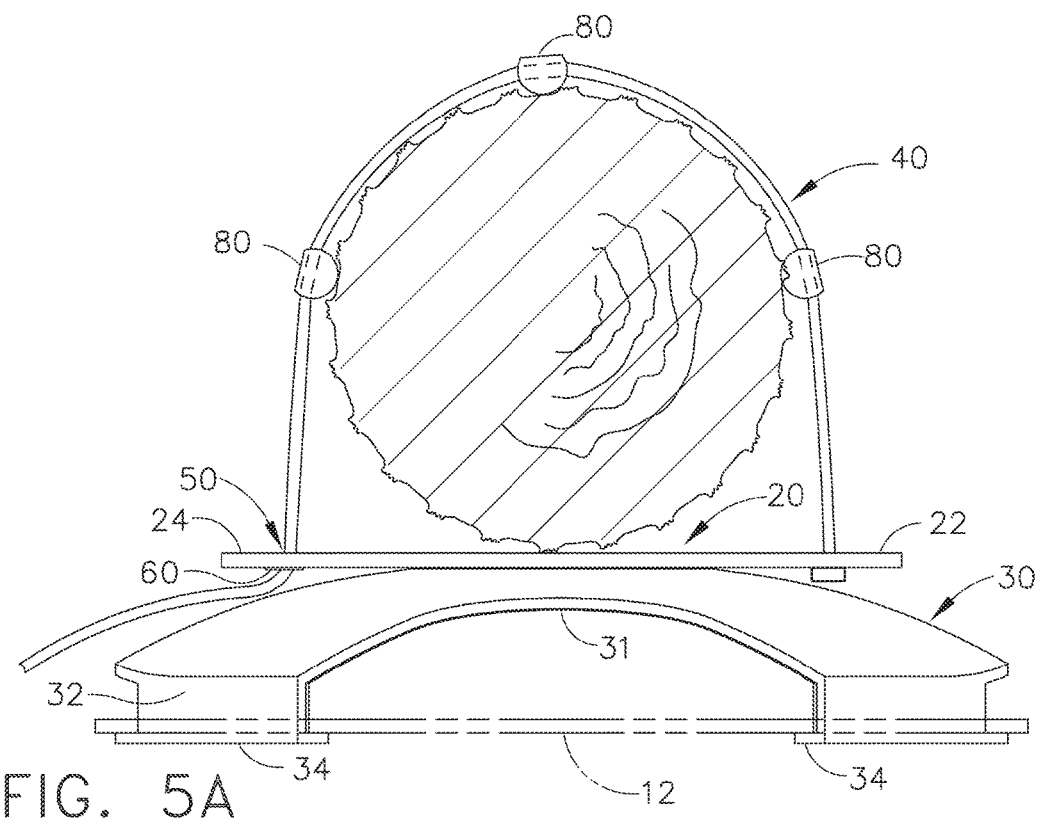
FIG. 5A is another top view of the embodiment of FIG. 5 with a plurality of bumper members attached to the flexible member.
Figure 5B:
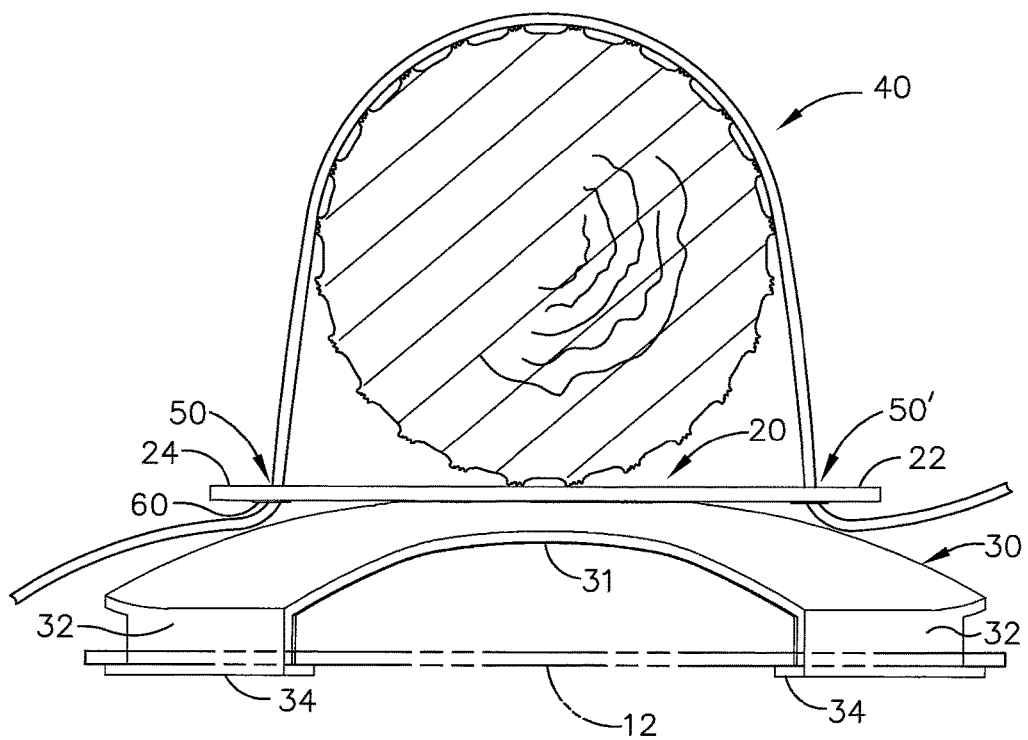
FIG. 5B is a top view of another mounting member embodiment attached to a tree and employing two latch or tension relief mechanisms.
Figure 10:
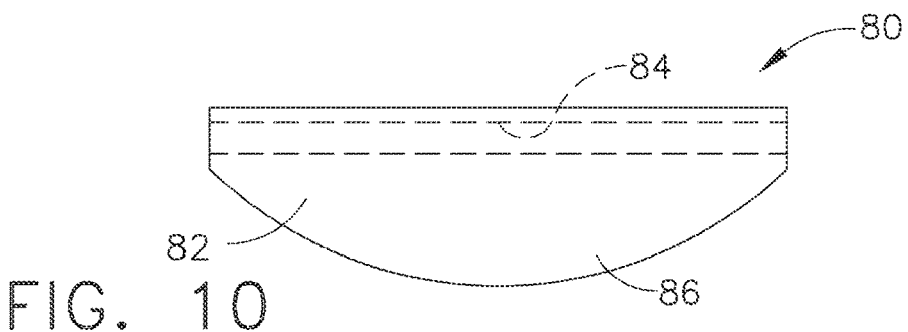
FIG. 10 is a top view of a bumper member of an embodiment of the present invention.
Figure 11:
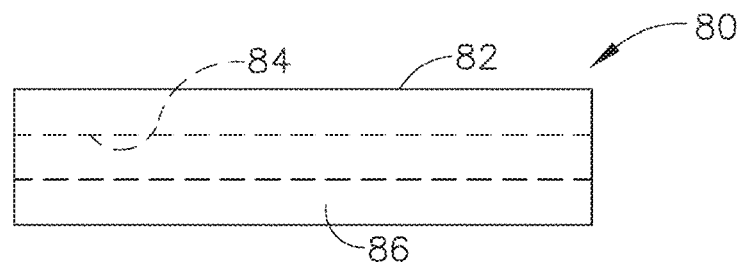
FIG. 11 is a front view of the bumper member of FIG. 10.
Figure 12:
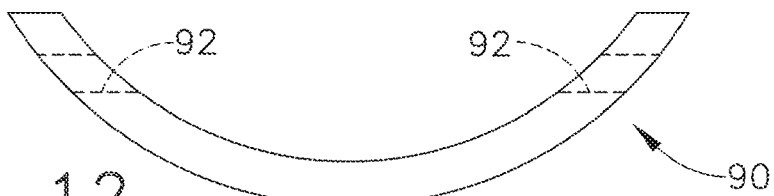
FIG. 12 is a top view of a bumper member of another embodiment of the present invention.
Figure 13:
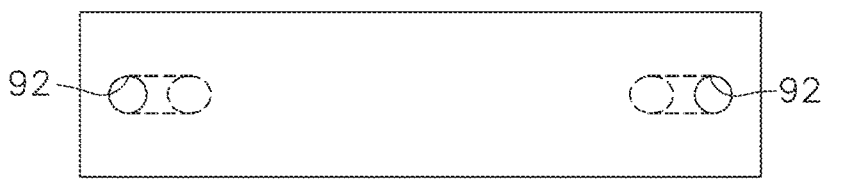
FIG. 13 is a front view of the bumper member of FIG. 12.

FIGS. 4A and 5A illustrate use of a plurality of bumper members 80 on the flexible member 40 to space the flexible member 40 away from the tree portion at locations around the tree which serve to further reduce any likelihood of inner bark damage. As can be seen in FIG. 10, for example, in at least one embodiment, the bumper 80 has body portion 82 that has a passage 84 therethrough that enables the flexible member 40 to freely pass therethrough. The bumper 80 may be formed from a polymer, rubber, wood, metal, etc. that has an arcuate bumper surface 86 formed thereon that is intended to contact the tree portion without harming or gouging into the outer bark. FIG. 12 illustrates an alternative bumper embodiment 90 that is fabricated from a piece of arcuate metal strapping that has holes 92 therethrough that are configured to permit the flexible member to freely pass therethrough. It will be understood that the various mounting members and hanger members disclosed herein may be formed with radiused contact portions designed to contact the tree portion and space most of the mounting member and/or hanger member away from the tree bark.

Figure 14:
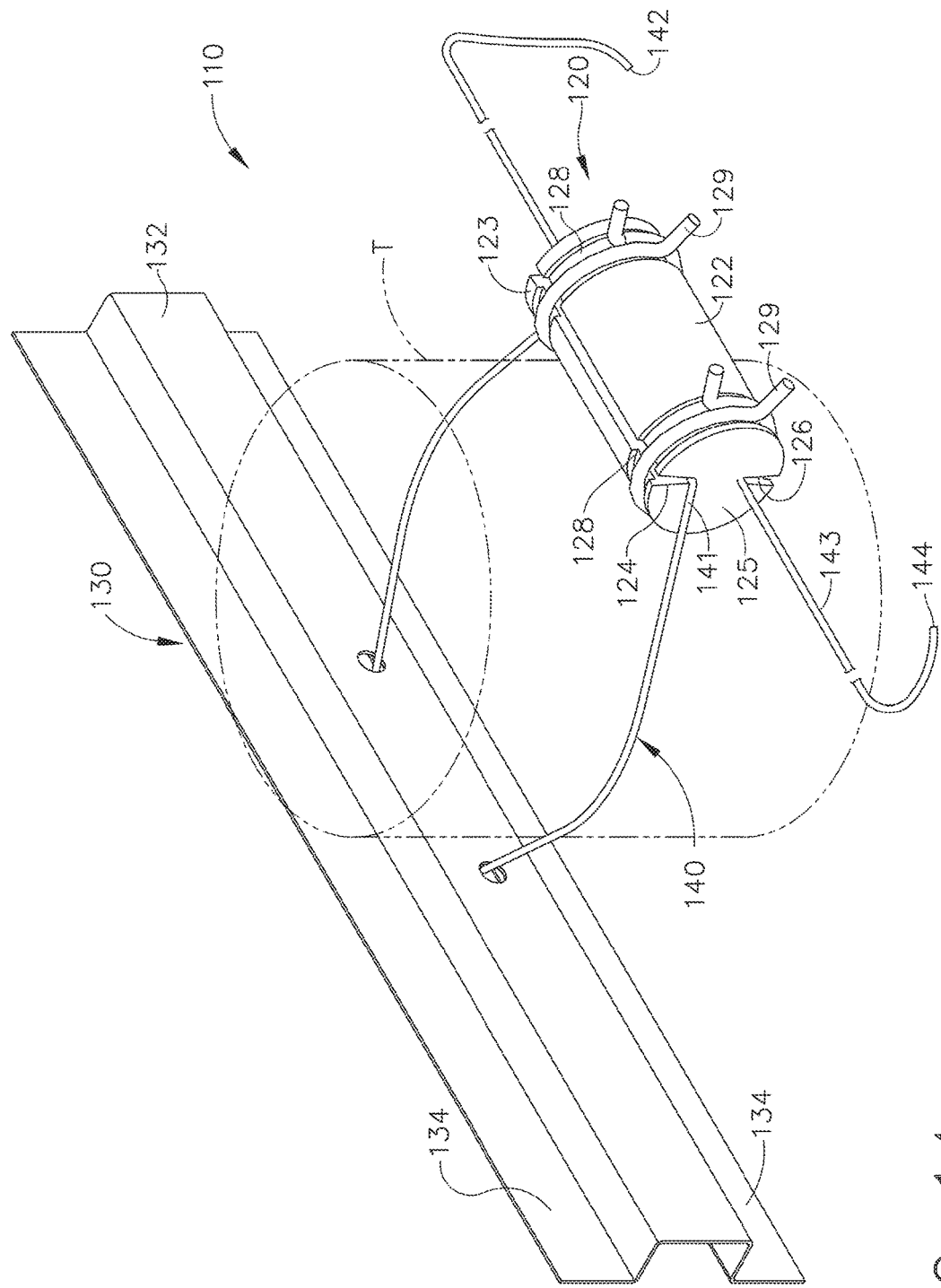
FIG. 14 is a perspective view of another embodiment of the present invention attached to a tree.

FIG. 14 illustrates another apparatus 110 for hanging or suspending an object such as a sign (not shown) from a portion of a tree portion T. This embodiment includes a mounting member 120 and a hanger member 130. As can be most particularly seen in FIGS. 14 and 15, the hanger member 130 may comprise an extruded member (fabricated from for example, metal or polymer material) that has a centrally disposed channel 132 and two raised planar attachment faces 134. For example, the hanger member 130 may comprise a portion of a "hat channel furring strip" that is fabricated from galvanized steel, aluminum or other metal. Such component may, for example, be formed using conventional roll forming or extrusion techniques and processes. Other hanger members 130 may be formed from polymer materials. Double-sided tape 136 may be applied to each attachment face 134 to facilitate easy attachment of a sign 12 or other object thereto. In other embodiments, the sign may be attached to the hanger member 130 by clamps, rivets, screws, bolts, clips, adhesive, paper fastener brads, etc. The flexible member 140 may be attached to the hanger member 130 by passing the flexible member 140 through holes provided through the channel 132.

Turning to FIG. 14, it can be seen that in at least one embodiment, the mounting member 120 has two opposing longitudinal slots 124, 126 therein for receiving portions of the flexible member 140 therein as shown. In the illustrated embodiment, the mounting member 120 has a cylindrical-shaped body 122 and may be fabricated from, for example, flexible rubber or polymer material or a combination of such materials. The slots 124,126 may have a tapered shape as shown. The body 122 may have two opposing circumferentially extending grooves 128 therein that accommodate corresponding spring clamps 129. Other forms of adjustable clamps (e.g., worm gear adjustable clamps, wire ties, etc.) could be used.

The flexible member 140 may comprise a relatively braided metal cable or the like that is sized to extend into the slots 124,126. In this embodiment, the length of the flexible member 140 may be determined in the manner described above. The apparatus 110 may be secured to the tree portion T as follows. The hanger member 130 is placed on a front side of the tree and the first and second ends 142, 144 of the flexible member 140 are brought around the backside of the tree portion T as shown. With the spring clamps 129 removed or loosened from the mounting member 120, one portion 141 of the flexible member 140 is inserted through one of the spring clamps 129 and into the first elongated slot 124 such that the first end 142 protrudes out of the right end 123 of the body portion 122. The other portion 143 of the flexible member 140 is inserted through the other spring clamp 129 and into the second slot 124 such that the second end 124 thereof extends out of the left end 125 of the body portion 122. Thereafter the clamps 129 are installed on the mounting member 120 as shown in FIG. 14. The spring clamps 129 serve to clamp the body portion 122 into sliding frictional engagement with the portions 141, 143 of the flexible member 140 extending therethrough. In one embodiment, it is desirable for equal amounts of flexible member 140 to protrude out from each end 123,125 of the mounting member 120. In another embodiment, a slug or stop is attached to one end of the flexible member 140 and that end may be pulled tight to the body portion of the mounting member such that only one portion of the flexible member 140 slides through the mounting member. In other embodiments, only one slot is provided in the mounting member 120. In this embodiment, one end of the flexible member 140 is non-movably attached to one end or portion of the mounting member 120. The flexible member 140 is looped around the tree in the above described manner and inserted into the slot in the mounting member 120. After the flexible member 140 has been inserted into the slot such that the second end protrudes out from one side of the mounting member 120, the user secures the spring clamps 129 in the above-described manner. In at least one embodiment, the spring clamps 129 are substantially identical. In other embodiments, the spring clamps 129 may be of different strengths such that the user may obtain a desired amount of frictional resistance between the flexible member 140 and the support member 120.

Figure 16:
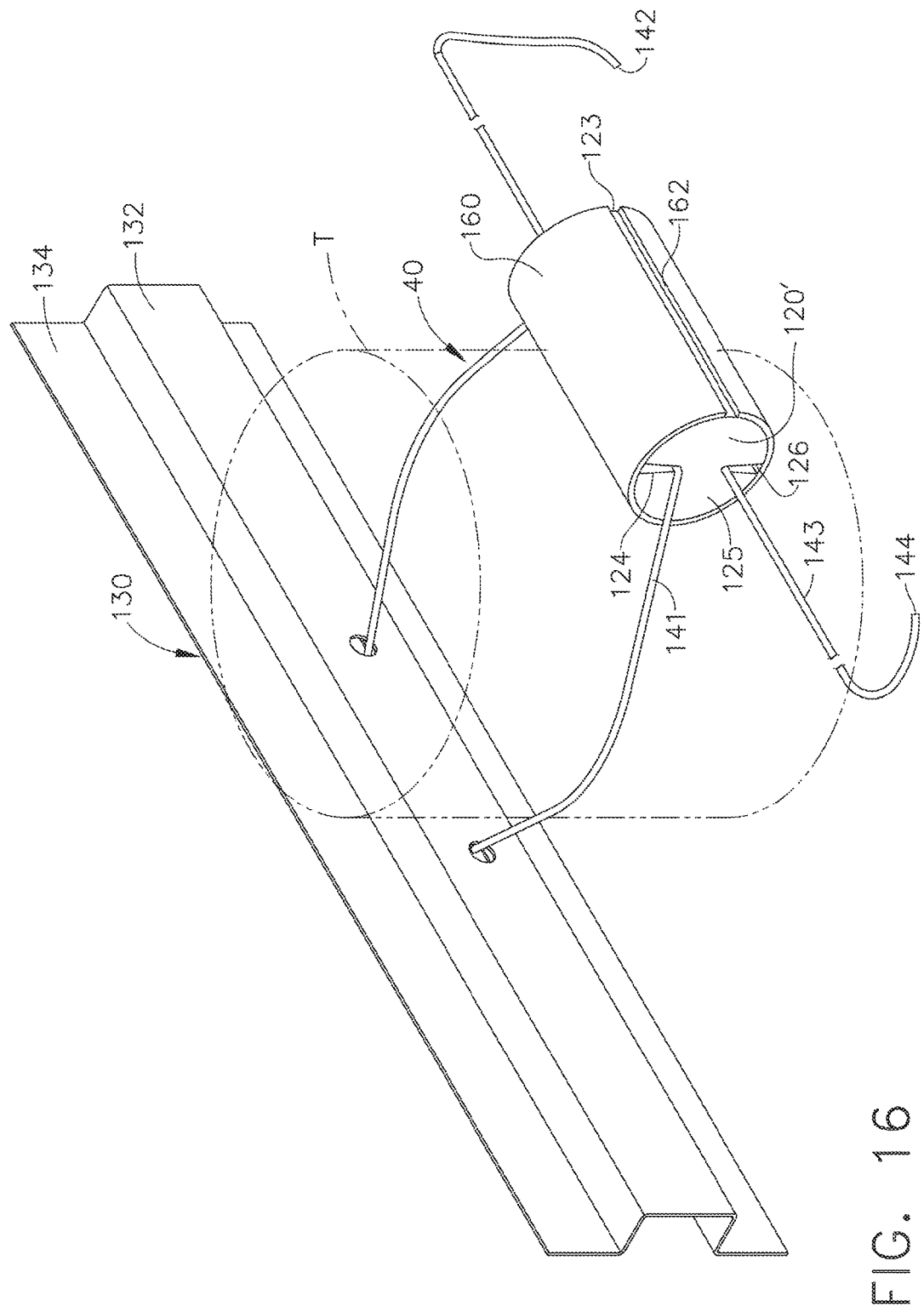
FIG. 16 is a perspective view of another embodiment of the present invention attached to a tree.

FIG. 16 illustrates an alternative embodiment 110' that employs a rotatable compression sleeve 160 instead of the spring clamps 129 to compress the retainer body 120' into sliding frictional engagement with the flexible member 140. As can be seen in FIG. 16, the user aligns the slot 162 in the compression sleeve 160 with the first slot 124 in the mounting member 120' and inserts the portion 141 of the flexible member 140 therein. Thereafter, the user rotates the compression sleeve 160 to bring the slot 162 into alignment with the slot 126 in the mounting member 120' and inserts the portion 143 of the flexible member 140 therein. The user again rotates the compression sleeve 160 so that the slot 162 therein is not aligned with either slot 124, 126 in the mounting member 120'. The embodiments described above may be installed on trees without the use of hand tools. In alternative embodiments, however, screws or bolts may be employed in place of, or in addition to, the spring clamps and compression sleeve to close the slots onto the flexible member portions a sufficient amount so as to attain a desired amount of sliding frictional fit between the mounting member 120 and the flexible member 140.

In alternative embodiments, the hanger 130 may be omitted. In those embodiments, the object 12 may be attached directly to the mounting member 120. For example, the mounting member 120 may be formed with a flat surface thereon to facilitate easy attachment of a sign thereto with, for example, double-sided tape or adhesive. In still other implementations, the sign may be attached directly to the mounting member 120 with self tapping screws or similar fastener arrangements. In yet other arrangements, the sign or other object may be suspended from the flexible member with clamps, hooks, etc. In alternative implementations, for example, the mounting member may have a hanger member 30 or 130 attached directly thereto or formed therewith. In still other embodiments, the mounting member 120, 120' may be integrally formed with the object itself. In such embodiments, no separate mounting member or hanger member is employed.

In still another alternative embodiment, for example, the mounting member may comprise a piece of flexible tube, conduit or hose that may be made from, for example, a polymer material. The first and second ends of the flexible member may be inserted through the mounting member so that they protrude in opposite directions out of each end of the mounting member. For example, if the mounting member comprises a piece of rubber tube or hose, after the flexible member has been wrapped around a portion of the tree, the user feeds the first end of the flexible member through the rubber tube until it protrudes out through the other end of the tube. The user then feeds the second end through the tube in the opposite direction. Once the user has fed the second end out through the tube, the first and second ends of the flexible member are pulled in opposing directions to cinch the apparatus to the tree portion. Any of the various objects described herein may be attached to or suspended from the mounting member using any of the various hanger member embodiments and fastener arrangements disclosed herein. The mounting member is sized relative to the flexible member such that when the flexible member is wrapped around a portion of the growing tree as described above, a sufficient amount of friction is generated between the flexible member and the mounting member so as to enable the flexible member to be cinched to the tree portion at a desired height. As the tree portion expands from tree growth, the portions of the flexible member contained within the mounting member will frictionally slide in opposite directions to accommodate the expansion while remaining cinched to the tree portion. This process will continue until the first and second ends of the flexible member pull out of the mounting member resulting from expansion of the tree portion at which point the apparatus and object will simply fall from the tree.

Figure 17:
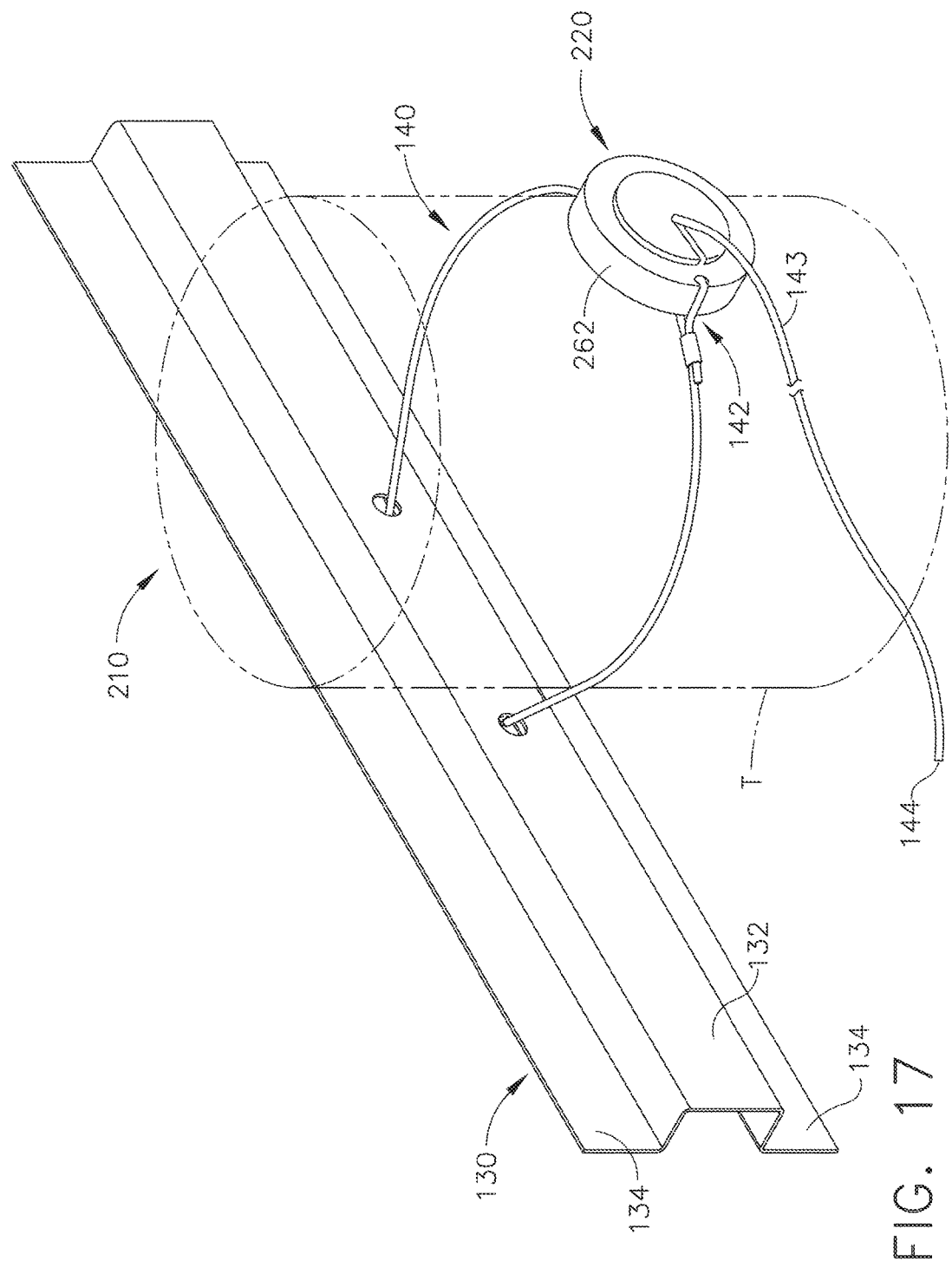
FIG. 17 is a perspective view of another embodiment of the present invention attached to a tree.
Figure 18:
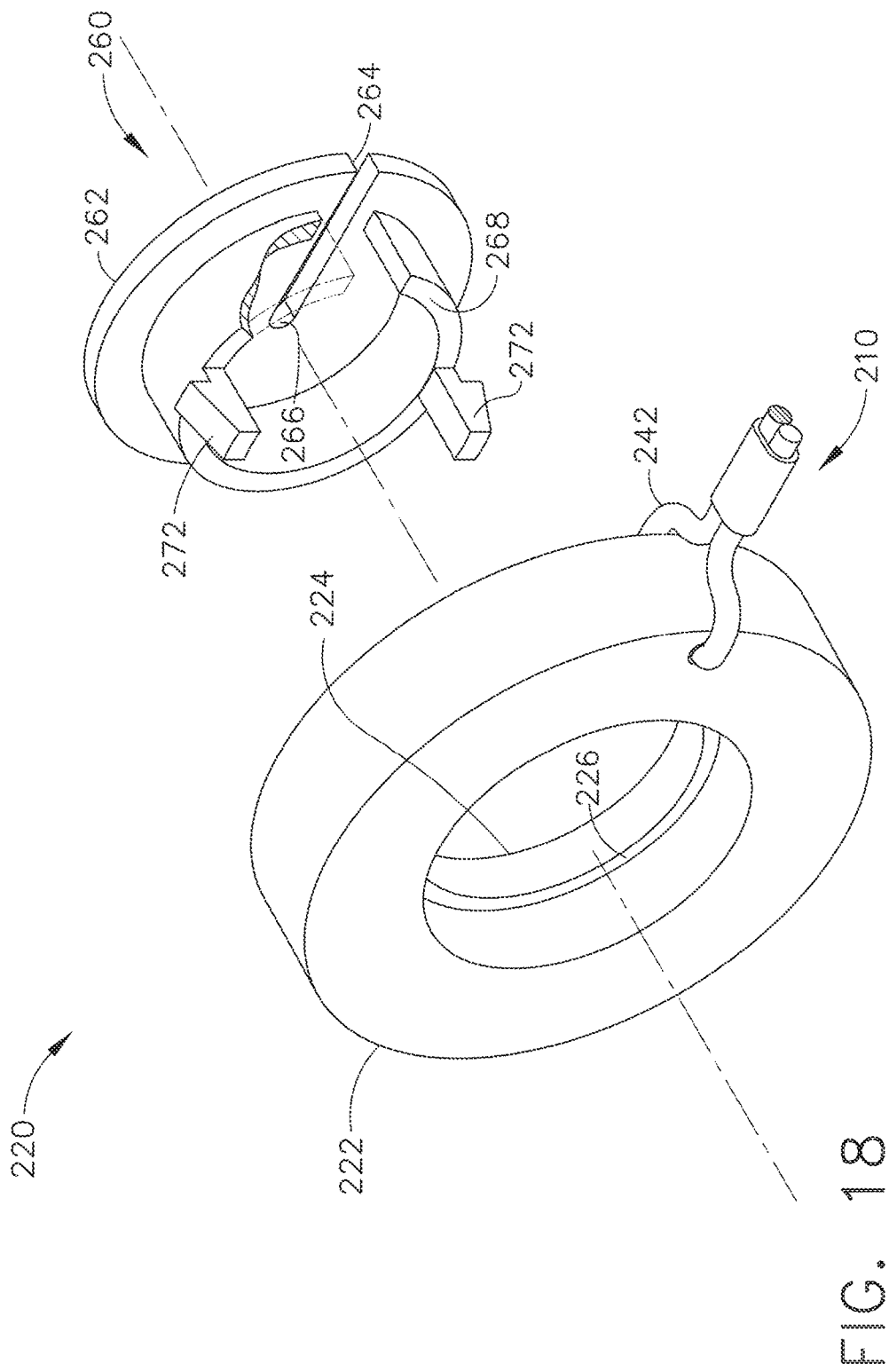
FIG. 18 is a partial exploded assembly view of the embodiment of FIG. 17.

FIGS. 17 and 18 illustrate another apparatus 210 for supporting an object such as a sign from a tree portion T. This embodiment employs a mounting member 220, a hanger member 130 and a flexible member 240. As can be seen in FIG. 18, the mounting member 220 comprises a body portion 222 and an attachment portion 260. In at least one form, the attachment portion 260 has a planar flange 262 that has a slot 264 extending inwardly from one edge thereof. The slot 264 may terminate in a centrally-disposed hole 266 in the flange 264. In alternative embodiments, the hole 266 could conceivably be omitted. Formed or otherwise attached to the underside of the flange 264 is a C-shaped collar portion 268 that is sized to extend into a tapered hole portion 224 in the body portion 222. In addition, at least one, and preferably at least two, retainer lugs 272 are formed on the collar portion 268 that are oriented to retainingly engage an annular ledge 226 formed in the body portion 222.

In various embodiments, the body portion 222 and the attachment portion 260 may be fabricated from similar polymer or rubber materials. In alternative embodiments, the body portion 222 may be fabricated from metal and the attachment portion fabricated from polymer, rubber or metal. Also in various embodiments, the flexible member 240 may comprise a braided metal cable or similar member and have a first end 242 attached to a body portion 222 of the mounting member 220. The flexible member 140 may be affixed to the hanger member 130 by inserting it through holes 133 in the channel portion 132 thereof as illustrated in FIG. 17. The sign may be attached to the attachment face portions 134 in any of the various manners described herein. In an alternative embodiment, the body portion 222 is integrally formed with the object, but may otherwise operate in the manner described herein.

The apparatus 210 may be attached to the tree portion T as follows. The user locates the apparatus 210 at a desired height on the tree and locates the mounting member 220 on the backside of the tree portion. As used herein, the term "backside of the tree" generally refers to the side of the tree portion T that is opposite to the side of the tree from which the hanger member and object will be suspended from (i.e., the "front side"). The user then inserts the second end 144 of the flexible member 140 through the hole 224 in the body portion 222 of the mounting member 220. While supporting the body portion 222 adjacent the backside of the tree, the user inserts the portion 143 of the flexible member 140 into the slot 264 in the attachment portion 260. Thereafter, the C-shaped collar portion 268 is inserted into the tapered hole 224 in the body portion 222 of the mounting member 220. As the C-shaped collar portion 268 is pushed into the tapered hole 224, the C-shaped collar 268 urges the slot 264 to close around the portion 143 of the flexible member 140. The collar 268 is pressed into the body portion until the lugs 272 retainingly engage the ledge 226 in the body portion 222 to affix the attachment portion 260 thereto. The slot 264 is sized relative to the flexible member 240 such that when the attachment portion 260 is attached to the body portion 220 as described above, a desired amount of sliding frictional fit is established between the flexible member 240 and the attachment portion 220. The user may then grasp the mounting member 220 while pulling on the second end 144 of the flexible member 240 to cinch or otherwise secure the flexible member 240 tight to the tree. As the tree continues to grow, the flexible member 240 continues to frictionally slip through the slot 264 to accommodate such growth until eventually all of the flexible member 240 pulls through the slot 264 (without any human intervention), at which point the apparatus may fall from the tree.

Figure 19:
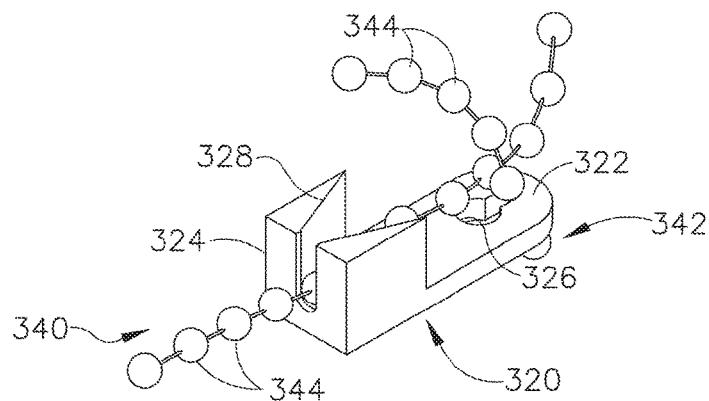
FIG. 19 is a perspective view of another mounting member embodiment and portion of a flexible member embodiment of the present invention.

FIG. 19 illustrates an alternative mounting member 320 and flexible member 340. In this embodiment, the flexible member 340 comprises a ball chain that may be fabricated from metal. It is conceivable, however, that the flexible member 340 could also be molded from a polymer material. Both configurations have a series of spaced retainer balls 344. The flexible member 340 may be used in connection with a hanger member 130 in the manner described above or the mounting member 320 may be integrally formed with a hanger member. In still other embodiments, the mounting member 320 is integrally formed in the object itself. Thus, for those embodiments, no hanger member or separate support member is otherwise required.

Figure 15:
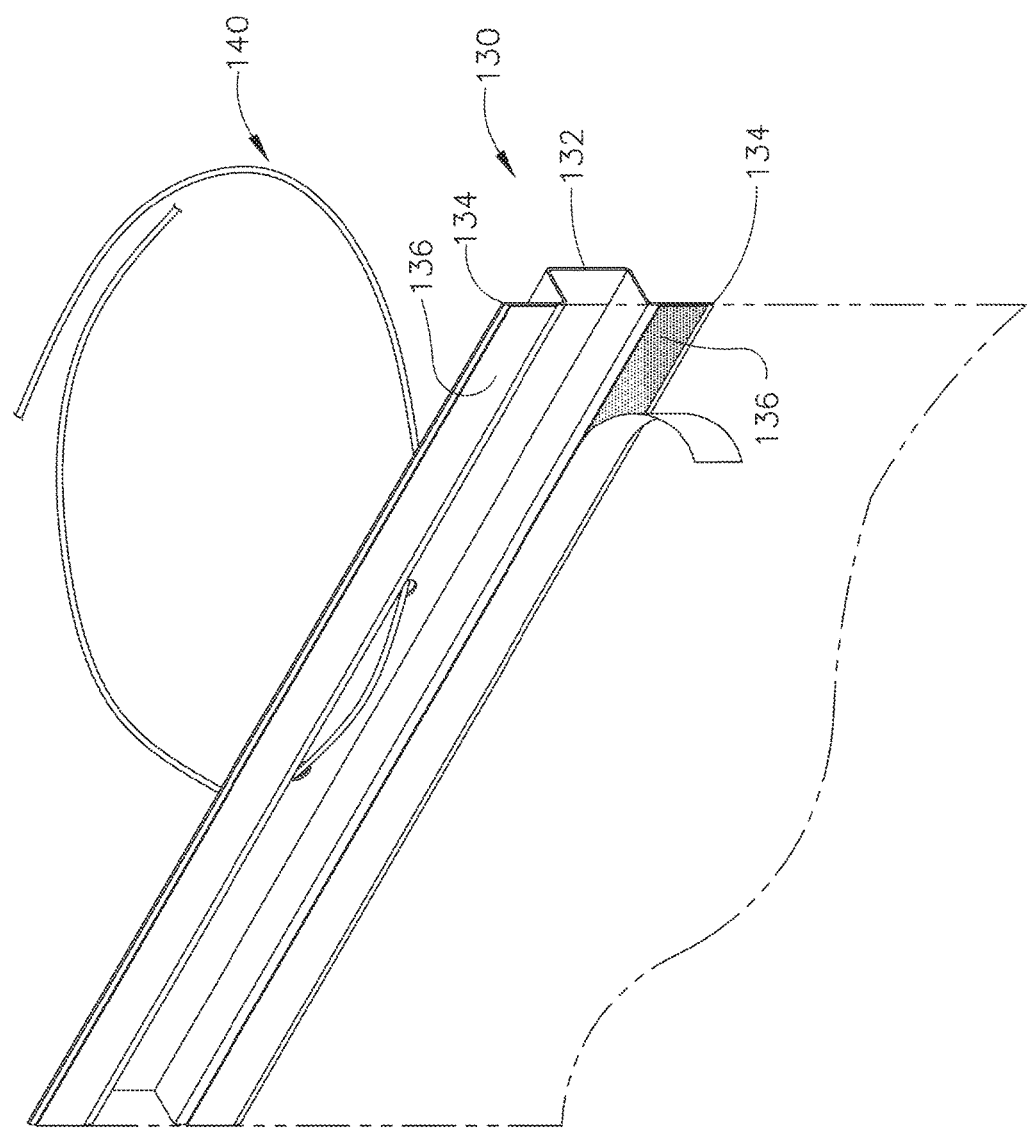
FIG. 15 is a front perspective view of a hanger member and flexible member of an embodiment of the present invention.

After being attached to the hanger member 130, the user loops the ends of the flexible member 340 around the tree. In at least one embodiment, a first end 342 of the flexible member 340 is engaged with a first end or portion 322 of a mounting member 320. As shown in FIG. 15, a keyhole slot 326 is provided in the first end 322 to enable to the user to lock the first end 342 of the flexible member 340 therein.

The remaining portion 343 of the flexible member 340 is inserted through a tapered slot 328 in a second end or portion 324 of the mounting member 320. The tapered slot 328 is sized relative to the balls 344 to enable the balls 344 to slip therethrough when a sufficient tensile force is applied thereto to accommodate growth of the tree. As the tree portion T continues to grow, the flexible member 340 can continue to slip through the mounting member 320 to accommodate such growth until eventually all of the flexible member 340 pulls through the tapered slot 328. As such, the apparatus may fall from the tree or the original flexible member be replaced with a longer flexible member to accommodate further tree growth.

Figure 20:
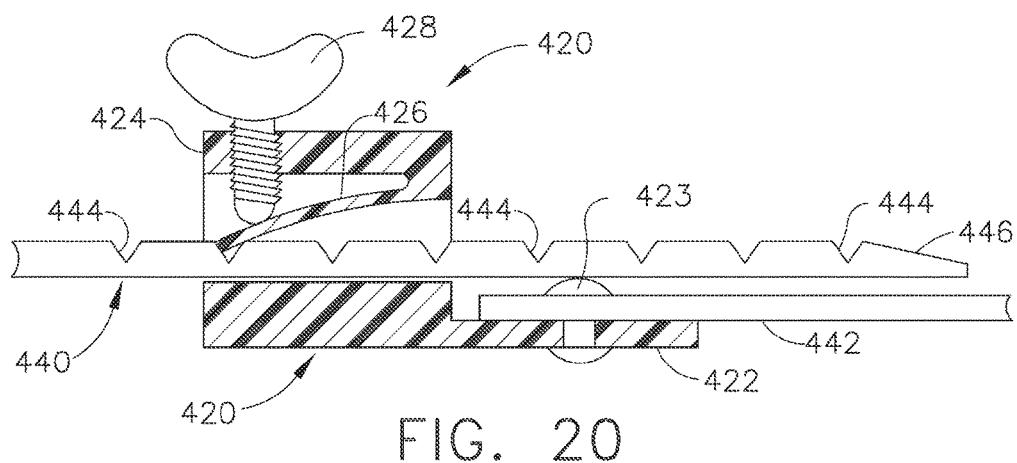
FIG. 20 is a partial cross-sectional view of another mounting member embodiment and portions of another flexible member embodiment of the present invention.

FIG. 20 illustrates an alternative mounting member 420 and flexible member 440. In this embodiment, the flexible member 440 comprises a flexible strap member that has serrations 444 formed in one side thereof. The flexible member 440 may be fabricated from metal, polymer, rubber, etc. The mounting member 420 may be used in connection with a hanger member 130 in the manner described above. In still other embodiments, the mounting member 420 is integrally formed in the object itself. Thus, for those embodiments, no hanger member or separate support member is otherwise required.

A first end 442 of the flexible member 440 is attached to a mounting member 420. For example, the first end 442 of the flexible member 440 may be attached to a first end 422 of the mounting member 420 by a rivet 423 or other fastener. The mounting member 420 further includes a second end 424 that has an adjustable frictional tab 426 that is configured to frictionally engage the serrations 444 on the flexible member 440. An adjustment screw 428 is mounted to the mounting member 420 to initially adjust the amount of frictional contact between the frictional tab 426 and the serrations 444. After the first end is attached to the hanger member 130, the user loops the free end 446 of the flexible member 440 around the tree and inserts it through the mounting member 420 as shown. The user then locates the hanger member at a desired position around the tree portion and cinches the flexible member 440 tight therearound by pulling the end 446 therethrough and adjusting the screw 428 to achieve a desired amount of frictional engagement between the frictional tab 426 and the serrations 444 on the flexible member 440. As the diameter of the tree portion increases, the flexible member 440 is permitted to slip relative to the mounting member 420 while the frictional tab 426 continues to apply friction to the flexible member 440 to maintain it cinched around the tree. This process will automatically continue until the tree portion has expanded to a point wherein the flexible member 440 disengages the frictional tab 426 and the apparatus is permitted to fall from the tree.

Figure 21:
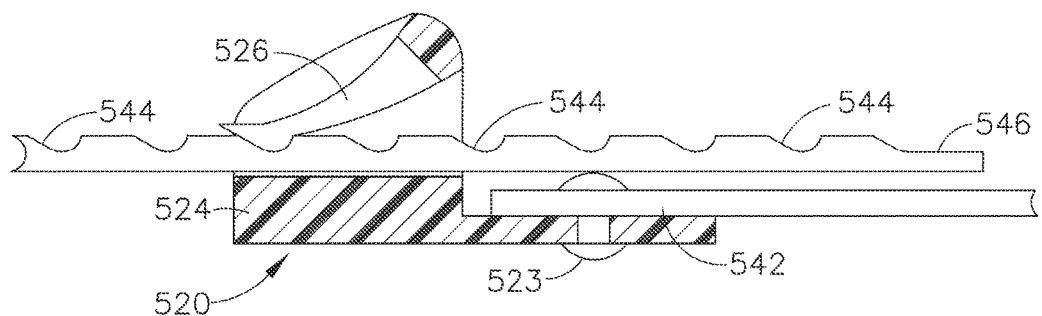
FIG. 21 is a partial cross-sectional view of another mounting member embodiment and portions of another flexible member embodiment of the present invention.

FIG. 21 illustrates another mounting member 520 and flexible member 540. In this embodiment, the flexible member 540 comprises a flexible strap member that has serrations 544 formed in one side thereof. The flexible member 540 may be fabricated from metal, polymer, rubber, etc. material. The mounting member 520 may be used in connection with a hanger member 130 in the manner described above. In still other embodiments, the mounting member 520 is integrally formed in the object itself. Thus, for those embodiments, no hanger member or separate support member is otherwise required.

A first end or portion 542 of the flexible member 540 is attached to a mounting member 520. For example, the first end 542 of the flexible member 540 may be attached to a first end 522 of the mounting member 520 by a rivet 523 or other fastener. The mounting member 520 further includes a second end or portion 524 that has a molded spring arm 526 that is configured to frictionally engage the serrations 544 on the flexible member 540. After the first end is attached to the hanger member 130, the user loops the free end 546 of the flexible member 540 around the tree and inserts it through the mounting member 520 as shown. The user then locates the hanger member 130 at a desired position around the tree and cinches the flexible member 540 tight therearound by pulling the end 546. As the diameter of the tree portion increases, the flexible member 540 is permitted to frictionally slip relative to the mounting member 520. This process will automatically (i.e., without further human intervention or adjustment) continue until the tree portion has expanded to a point wherein the flexible member 540 disengages the spring arm 526 and the apparatus is permitted to fall from the tree.

FIGS. 22 and 23 illustrate another mounting member 620 and flexible member 640. In this embodiment, the flexible member 640 comprises a flexible strap member that has a first end 642 and a second end 644. In one embodiment a portion of the flexible member 640 has a first segment 646 of first serrations 648 formed on one side thereof and a second segment 650 of second serrations 652 formed on the other side thereof. In one embodiment, the first and second segments 646, 650 may extend from a central portion of the flexible member 640 or the first segment 646 may, for example, be considerably shorter than the second segment 650 which may extend from the first segment 646 to the second end 644 of the flexible member (on the opposite side thereof).

As can be further seen in FIGS. 22 and 23, the mounting member 620 is formed with a first wall 622, a central wall 624 and a second wall 626. The first wall 622 and central wall 624 serve to define a first passage 628 therethrough that is configured to receive the portion of the flexible strap member 640 that has the first segment 646 of first serrations 648 thereon. In addition, the first wall 622 has a first frictional tab 660 formed therein that is shaped to frictionally engage the first serrations 648. Similarly, the second wall 626 and the central wall 624 serve to define a second passage 662 therethrough that is configured to receive the portion of the flexible strap member 640 that has the second segment 650 of second serrations 652 thereon. The second wall 626 has a second frictional tab 670 formed therein that is shaped to frictionally engage the second serrations 652.

The mounting member 620 and flexible member 640 may be used as follows. In the embodiment wherein the first segment 646 of serrations is shorter than the second segment 650, the user first inserts the first end 642 of the flexible member 640 in the first passage 628 (arrow 680 in FIG. 23) until the serrations 648 frictionally engage the first friction tab 660. Thereafter, the second end 644 of the flexible member 640 is inserted into the second passage 662 in the mounting member 620 (arrow 682 in FIG. 23). As the second end 644 of the flexible member 640 is pushed through the second passage 662 of the mounting member 620, the second friction tab 670 flexes to permit the flexible member 620 to pass therethrough sufficiently far enough to enable the apparatus to be cinched to the tree portion. The user orients the mounting member 620 such that the first wall portion 622 and, more particularly, the first friction tab 660 abuts the tree portion. The user continues to pull the flexible member 640 (in direction 682) to cinch or secure the apparatus to the tree portion. Because the first friction tab 660 is abutted against the tree portion, the first friction tab 660 is prevented from otherwise releasing the corresponding first serration 648. As the tree grows, the portion of the flexible member 640 that has the second segment 650 of second serrations 652 thereon will be pulled out of the mounting member 620 in direction 684 (FIG. 22) to accommodate the growth while still remaining cinched to the tree portion without the need for human intervention. This process will automatically continue until the tree portion has expanded to a point wherein the flexible member 640 disengages the mounting member 620 and the apparatus is permitted to fall from the tree.

The flexible member 640 may be fabricated from metal, polymer, rubber, etc. material. The mounting member 620 may be used in connection with a hanger member 130 in the manner described above. In still other embodiments, the mounting member 620 is integrally formed into the object itself. Thus, for those embodiments, no hanger member or separate support member is otherwise required.

In an alternative embodiment wherein the first segment 646 of serrations 648 is substantially as long as the second segment 650 of serrations 652, the first end 642 of the flexible member 640 and the second end 644 of the flexible member are inserted through passages 628, 662, respectively and are pulled through the mounting member 620 in opposite directions such that when the apparatus is cinched to the tree portion, the distance that the portion of the flexible member 640 having the first segment 646 thereon protrudes out from the mounting member 620 is substantially equal to the distance that the portion of the flexible member 640 that has the second segment 650 of serrations thereon protrudes out from the mounting member 620. In this case however, the mounting member 620 can be oriented such that when cinched around the tree, neither of the friction arms 660, 670 abut the tree portion. As the diameter of the tree portion increases, the flexible member 640 is permitted to slip in opposite directions relative to the mounting member 620 to accommodate the growth while still remaining cinched to the tree portion without the need for human intervention. This process will automatically continue until the tree portion has expanded to a point wherein the flexible member 640 disengages the mounting member 620 and the apparatus is permitted to fall from the tree.

Figure 24:
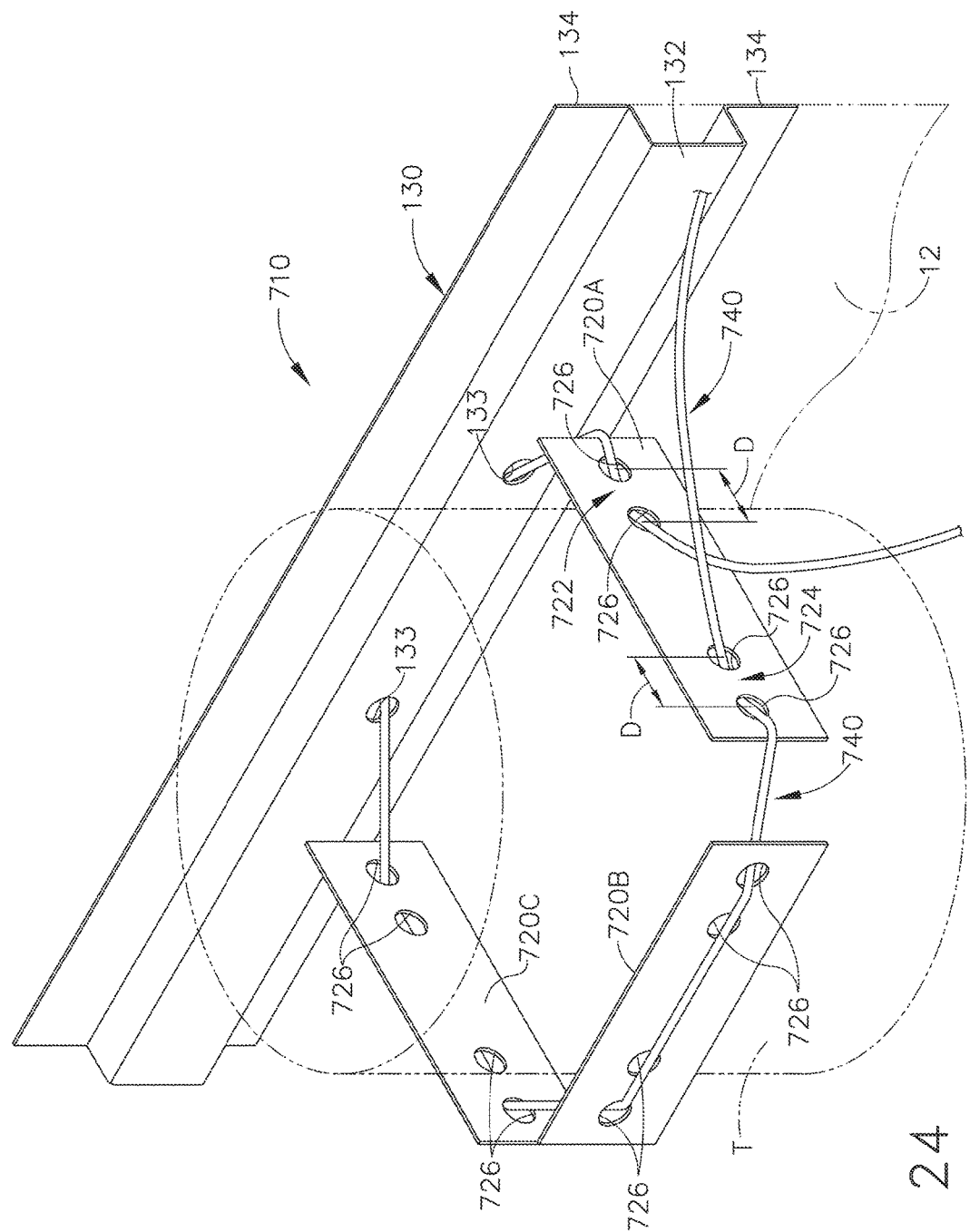
FIG. 24 is a perspective view of another embodiment of the present invention attached to a tree.
Figure 25:
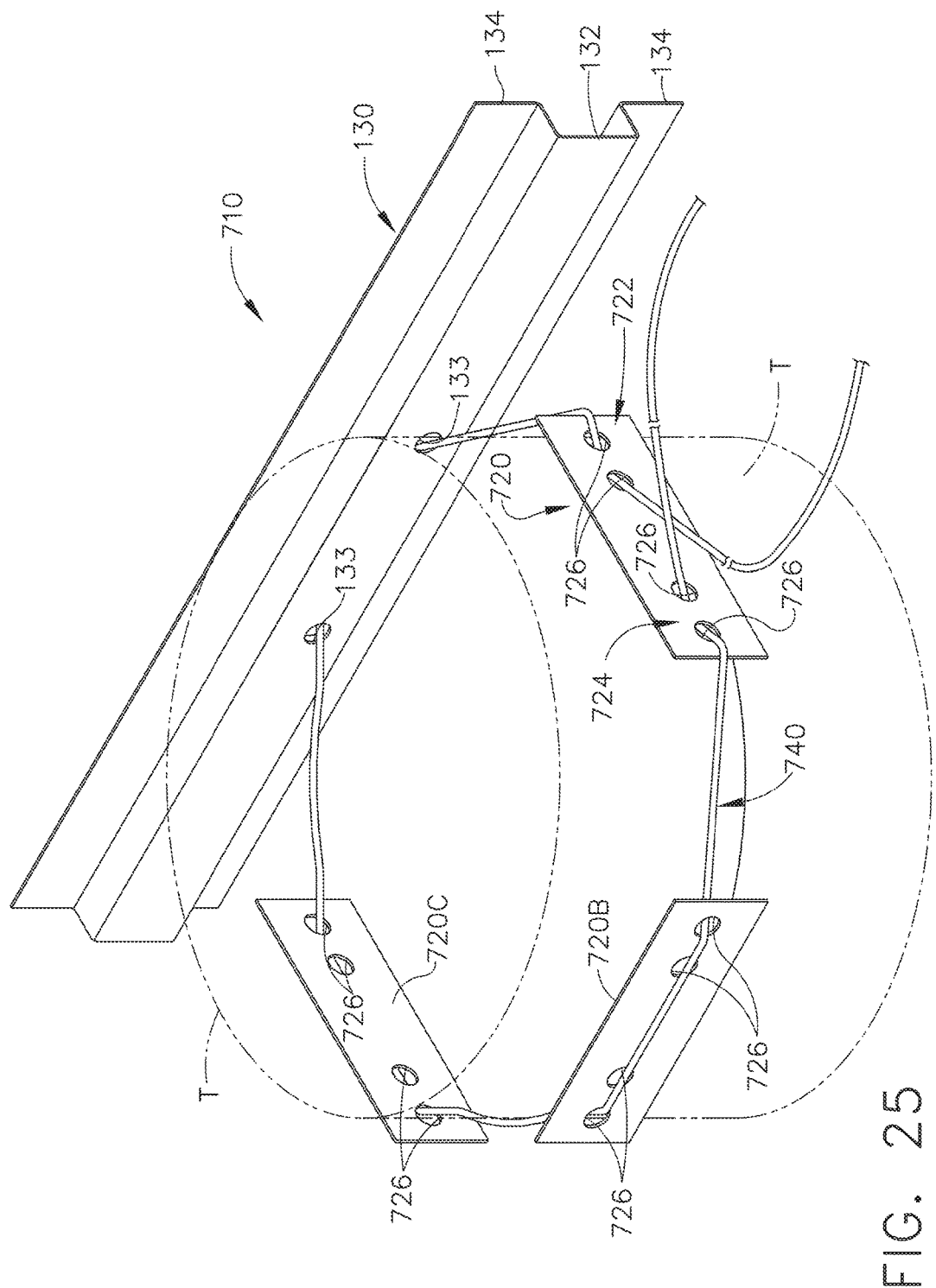
FIG. 25 is another perspective view of the embodiment of FIG. 24 after the diameter of the tree has increased.

FIGS. 24 and 25 illustrate another apparatus 710 that may employ a hanger member 130 of the type and construction described above to suspend a sign 12 from a tree portion T. This embodiment employs at least one, and preferably at least three, mounting members 720 and a flexible member 740. In various embodiments, the flexible member 740 may comprise a braided metal cable, a solid cable or wire, etc. In at least one form, each of the mounting members 720 comprises a metal plate that has two sets 722, 724 of spaced holes 726 therein. The holes 726 are sized to facilitate passage of the flexible member 740 therethrough. In at least one embodiment, the flexible member 740 is woven through the holes 726 in the mounting members 720 as shown in FIGS. 24 and 25. In particular, the flexible member 740 is woven through the first set 722 of holes 726 and also through the second set 724 of holes 726 in one of the mounting members 720 (designated as 720A in FIGS. 24 and 25). The flexible member 740 is only passed through the outermost two holes 726 in the other two mounting members 720 (designated as 720B and 720C). It will be understood that the mounting members 720B and 720C serve to prevent the flexible member 740 from contacting the tree at those locations and that the retainer 720A serves to facilitate frictional engagement with the flexible member 740. In particular, the amount of sliding frictional engagement attained between the flexible member 740 and the mounting member 720A may be dependent upon the distance between the holes 726 in each pair of holes 722, 724 (designated as distance "D" in FIG. 24). The mounting members 720B, 720C may be replaced with the bumper members 80 and/or 90 as was described above. As the diameter of the tree portion increases, the flexible member 740 is permitted to slip in opposite directions relative to the mounting member 720A to accommodate the growth while still remaining cinched to the tree portion without the need for human intervention. This process will automatically continue until the tree portion has expanded to a point wherein the flexible member 740 disengages the mounting member 720 and the apparatus is permitted to fall from the tree.

Figure 26:
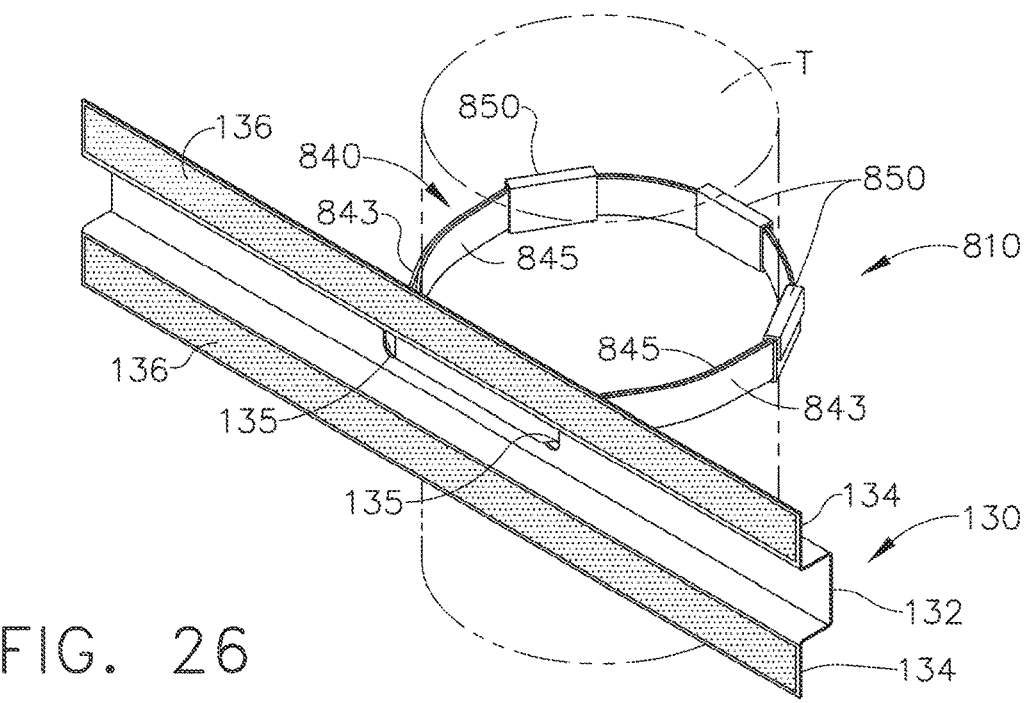
FIG. 26 is a perspective view of another embodiment of the present invention attached to a tree.
Figure 27:
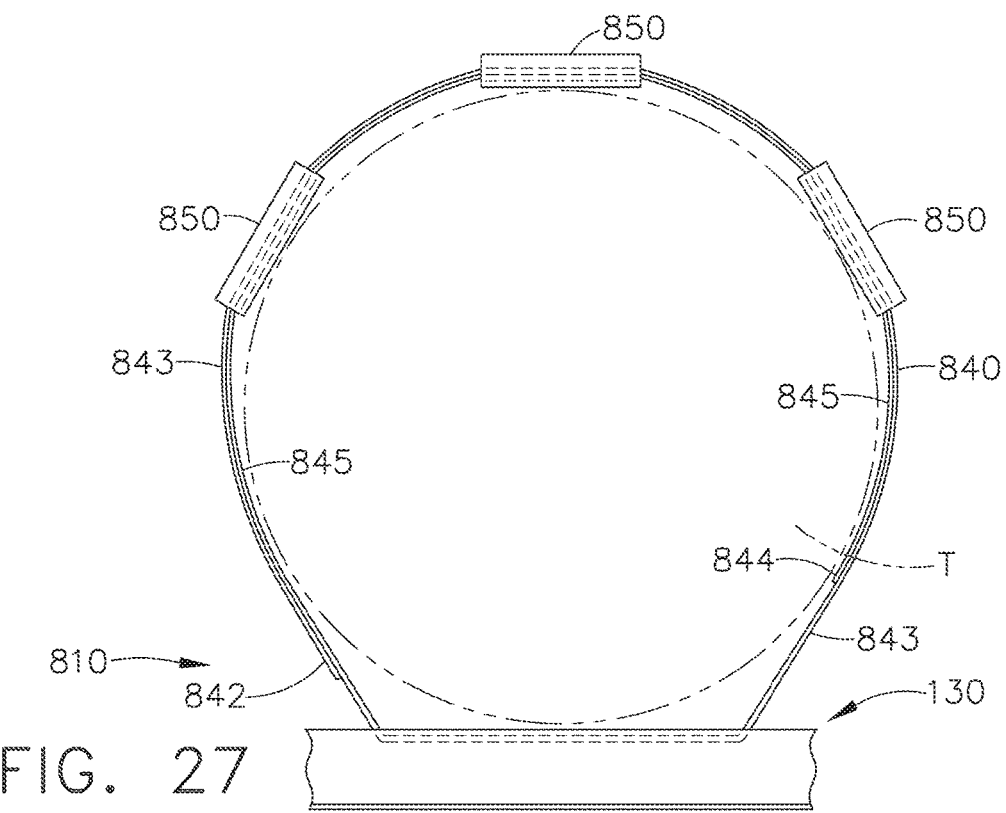
FIG. 27 is a top view of the embodiment of FIG. 26.

FIGS. 26 and 27 illustrate another apparatus 810 that may employ a hanger member 130 of the type and construction described above to suspend a sign from a tree portion T. This embodiment employs a flexible member 840 that comprises a strap that may be fabricated from, for example, metal, polymer, fiberglass, etc. that has a first end 842 and a second end 844. The strap 840 is substantially centered on the hanger member 130 such that a first portion 843 of the strap 840 that extends around one portion of the tree is essentially the same length as the second portion 845 that extends around another portion of the tree portion T. The strap extends through strap openings 135 in the hanger member 130. The strap 840 is wrapped around the backside of the tree portion as shown in FIG. 27 and at least one, and preferably three, retainer clips 850 are applied to the strap 840. Each clip 850 essentially wraps around the overlapping strap portions 843, 845, but is not tightly crimped thereto. However, in at least one embodiment, at least one and, preferably all, of the clips 850 apply an amount of friction to the flexible member 840 to retain the flexible member 840 cinched around the tree portion as the tree portion continues to expand. Thus, the clips 850 serve to slidably support the overlapping portions 843, 845 therein. As the diameter of the tree portion increases, the strap portions 843, 845 move in opposite directions within the clips 850 to accommodate the growth while still remaining cinched to the tree portion without the need for human intervention. This process will automatically continue until the tree has expanded to a point wherein the flexible member 840 disengages the clips 850 and the apparatus is permitted to fall from the tree.

In alternative embodiments, the flexible member 840 may be integrally formed with the object an otherwise function in the manner described above. Thus, for those embodiments, no hanger member is otherwise required.

Figure 28:
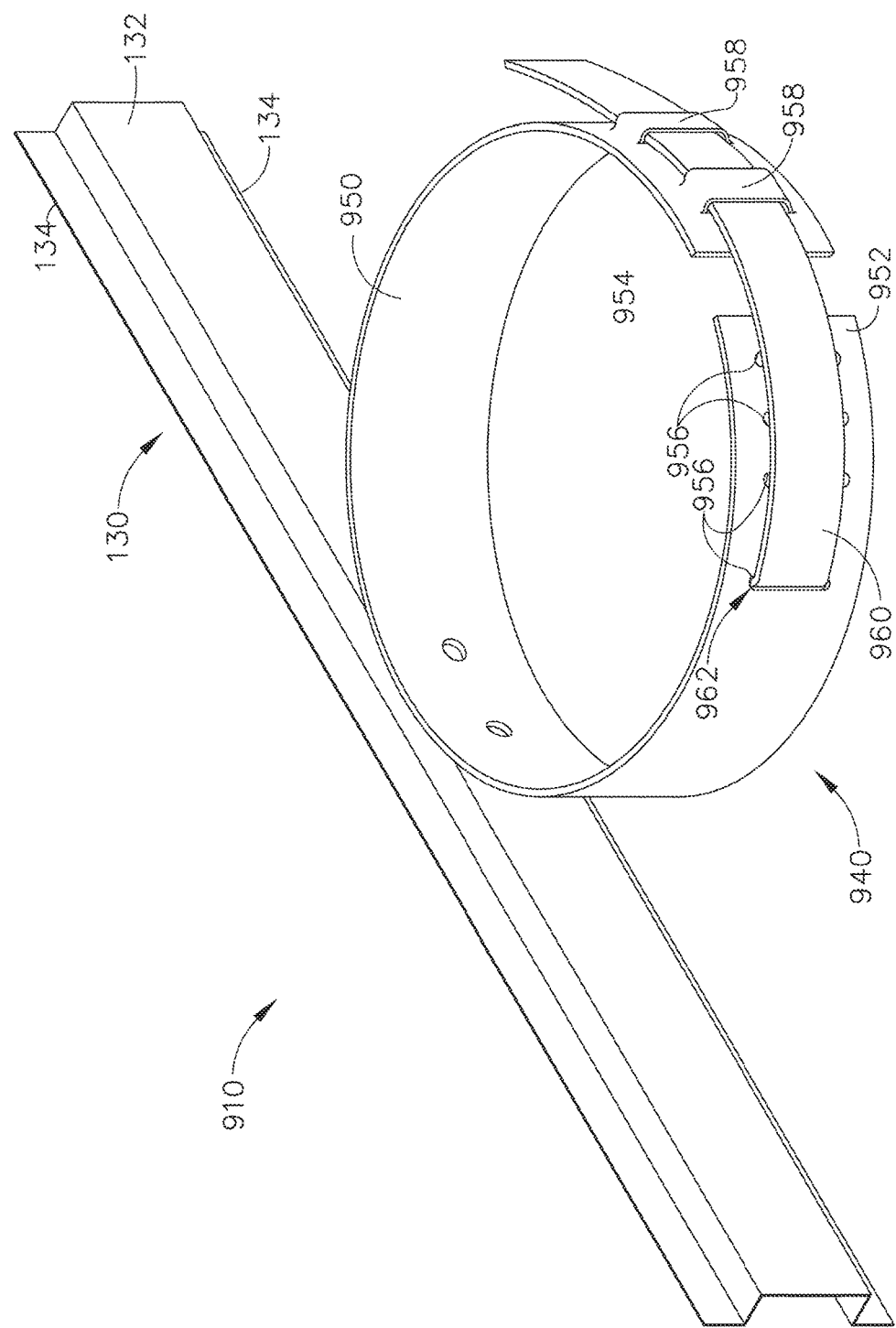
FIG. 28 is a perspective view of another embodiment of the present invention.
Figure 29:
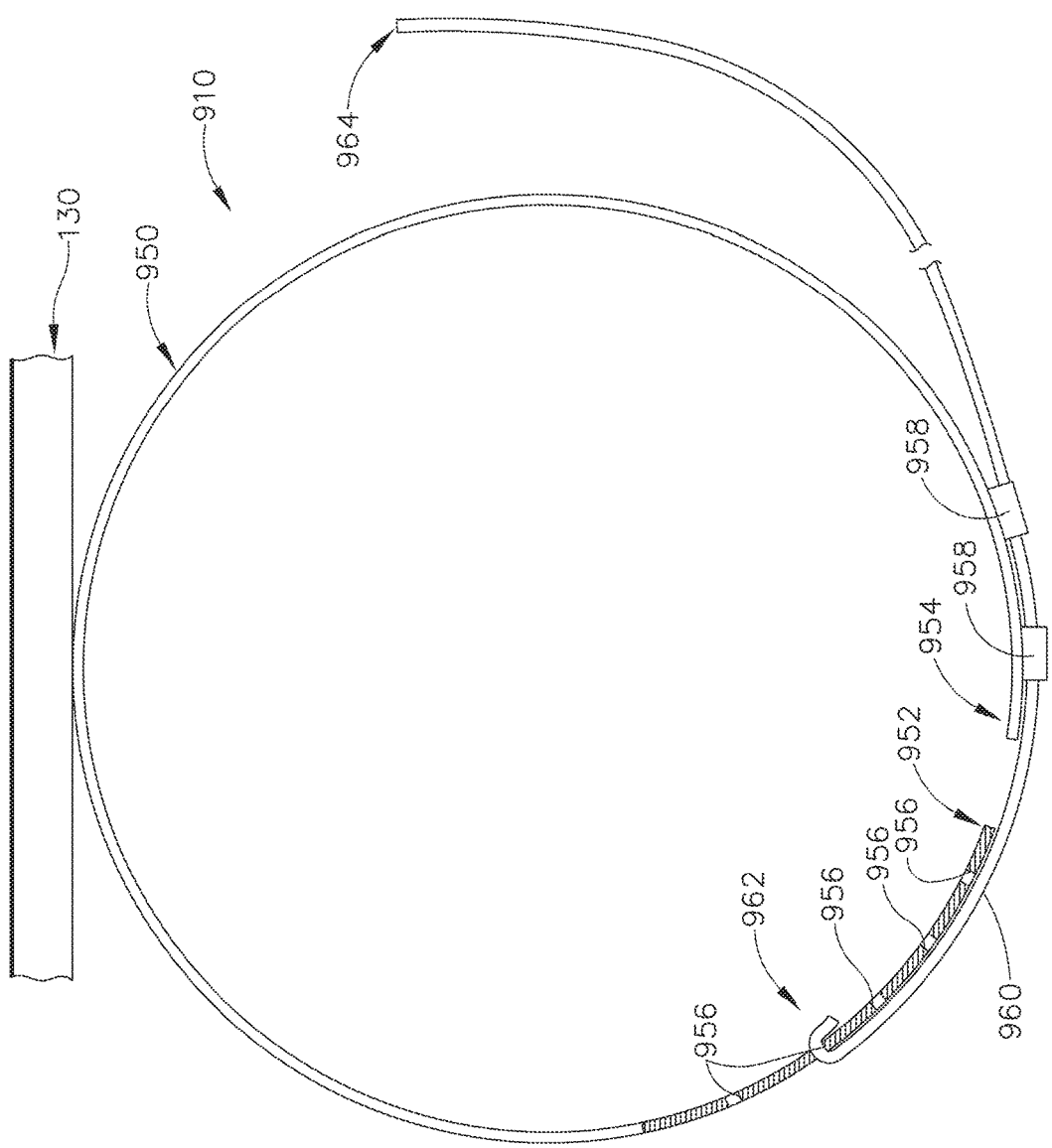
FIG. 29 is a top view of the embodiment of FIG. 28.

FIGS. 28 and 29 illustrate another apparatus 910 that may employ a hanger member 130 of the type and construction described above to suspend a sign from a tree portion. This embodiment employs a multi-segment flexible member 940 that comprises a first strap portion 950 that is fabricated from metal material and that has a first end 952 and a second end 954. The first strap portion 950 is substantially centered on the hanger member 130 and may be attached thereto by screws, bolts, rivets, adhesive, etc. A second strap portion 960 is configured to be attached to the first end 952 of the first strap portion 950 and slidably attached to the second end 954 of the first strap portion 950 to span therebetween. In one embodiment, the second strap portion 960 may be configured to be attached to the first strap portion 950 at a plurality of predetermined positions. For example, as can be most particularly seen in FIG. 29, a first end 962 of the second strap portion 960 may have a hook formed therein that is adapted to engage anyone of a plurality of latch slots 956 formed in the first strap 950. A second end 964 of the second strap portion 960 is sized to slidably extend through at least one and preferably at least two retainer clips 958 formed in the first strap portion 950 as shown. The clips 958 are sized relative to the second end 964 of the second strap 960 to permit it to slide relative thereto.

The apparatus 910 is affixed to the tree by wrapping the first strap 950 around the backside of the tree. The user then hooks the second strap 960 to the first strap 950 by hooking the first end 962 of the second strap portion 960 into the appropriate slot 956 in the first strap portion 950. The user then slides the second end 964 of the second strap portion 960 through the clips 958 in the first strap portion. In one embodiment, the clips 958 are sized to permit the second end 964 of the second strap portion 960 to slide therethrough while applying an amount of friction thereto to enable the flexible member assembly 950 to remain cinched around the tree portion at the desired height above the ground as the tree portion continues to expand. As the diameter of the tree portion increases, the second strap portion 960 slides through the clips 958 to accommodate the growth while still remaining cinched to the tree portion without the need for human intervention. In an alternative embodiment, the second strap portion may be movably attached to the first end of the first strap portion by a set screw or other arrangement. In yet another alternative embodiment, the second strap portion is integrally formed with the first strap portion and protrudes out from a first end therefrom to be slidably received within the clip(s) in the second end thereof.

In alternative embodiments, portions of the flexible member assembly 950 may be integrally formed with the object an otherwise function in the manner described above. Thus, for those embodiments, no hanger member is otherwise required.

Figure 30:
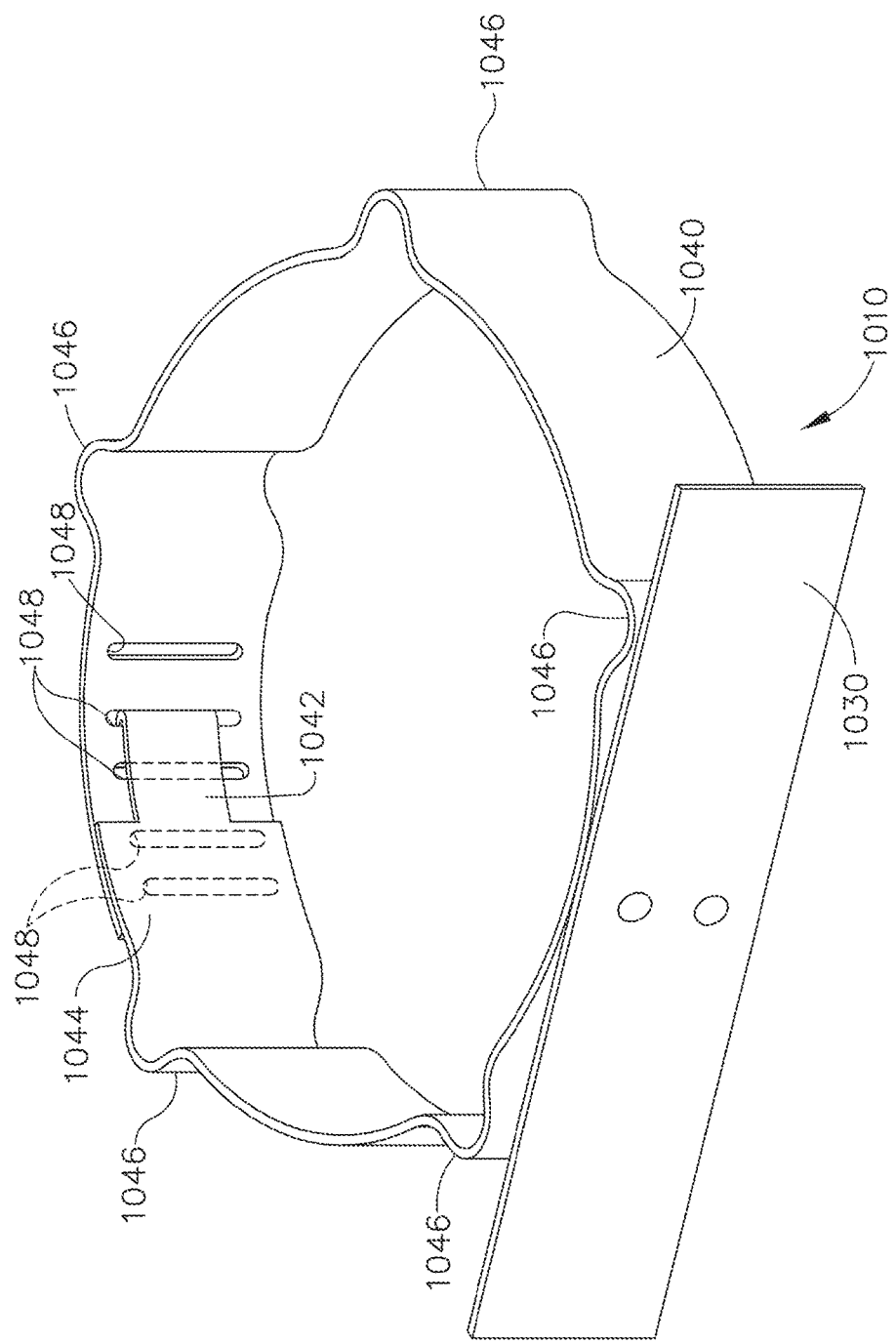
FIG. 30 is a perspective view of another embodiment of the present invention.
Figure 31:
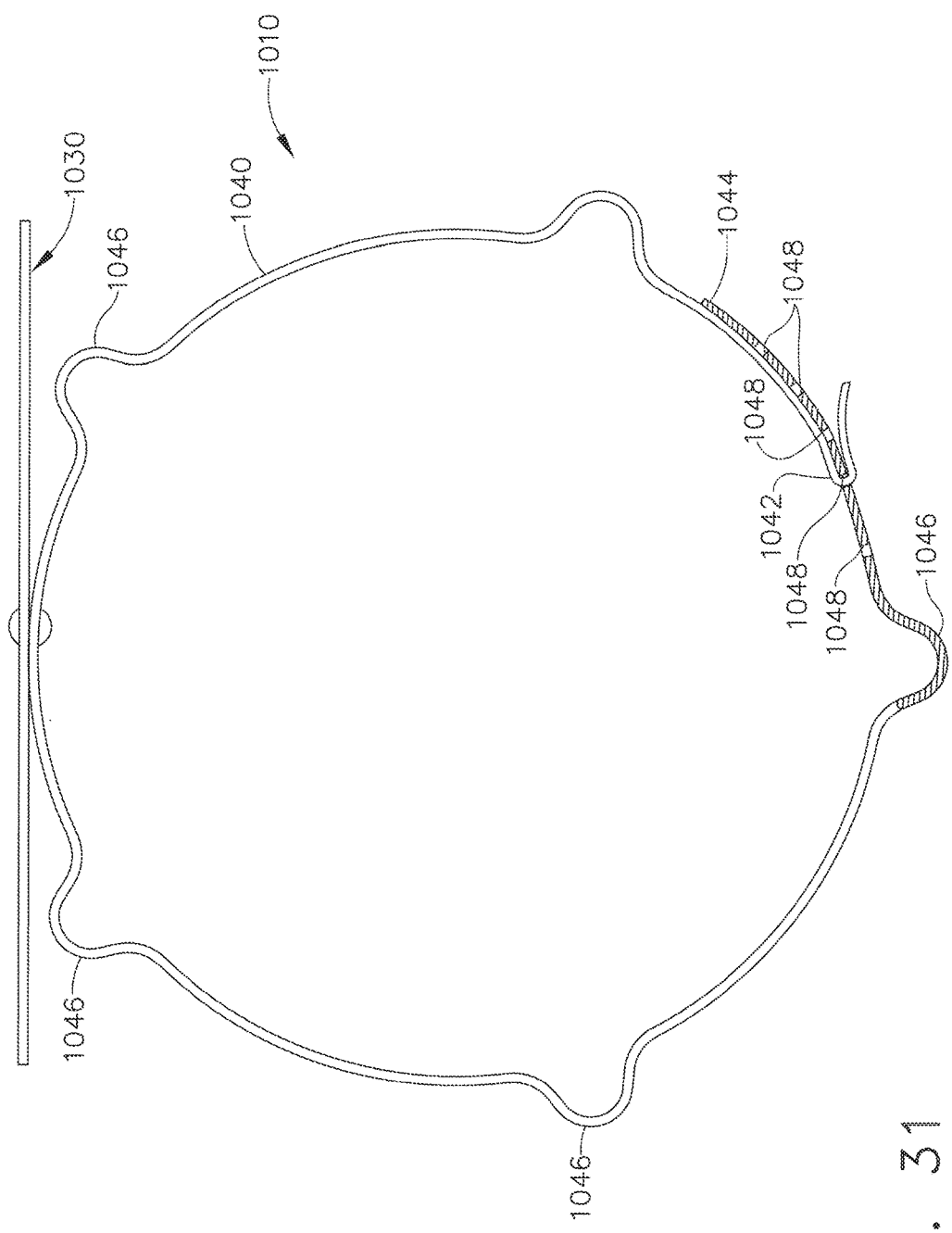
FIG. 31 is a top view of the embodiment of FIG. 30.

FIGS. 30 and 31 illustrate another apparatus 1010 that includes a hanger plate 1030 to which a sign or other object may be attached by screws, bolts, rivets, clamps, adhesive, double-sided tape, paper fastener brads, etc. Other embodiments may employ a hanger member 130 of the type and construction described above. This embodiment employs a flexible member 1040 that comprises a metal strap that has at least one, and preferably a plurality of, crimps 1046 therein. The strap 1040 has a first end 1042 that has a hook formed therein that is adapted to engage any one of a plurality of latch slots 1049 formed in a second end 1044 of the strap 1040. The apparatus 1010 is affixed to the tree portion by wrapping the first strap 1040 around the backside of the tree. The user then hooks the first end 1042 into an appropriate slot 1048 to cinch the strap 1040 around the tree portion. As the diameter of the tree portion increases, the crimps 1046 in the strap 1040 permit the flexible member 1040 to expand, or straighten, to, essentially relieve tension and accommodate a certain amount of tree growth without the need for human intervention. However, once the tree portion has attained a diameter that has resulted in the maximum expansion of the flexible member 1040, the user may release the apparatus from the tree portion and reconnect the first end 1042 in another slot 1048 to lengthen the flexible member 1040 to accommodate additional growth.

In alternative embodiments, the flexible member assembly 1040 may be integrally formed with the object an otherwise function in the manner described above. Thus, for those embodiments, no hanger plates or hanger members are otherwise required.

Figure 32:
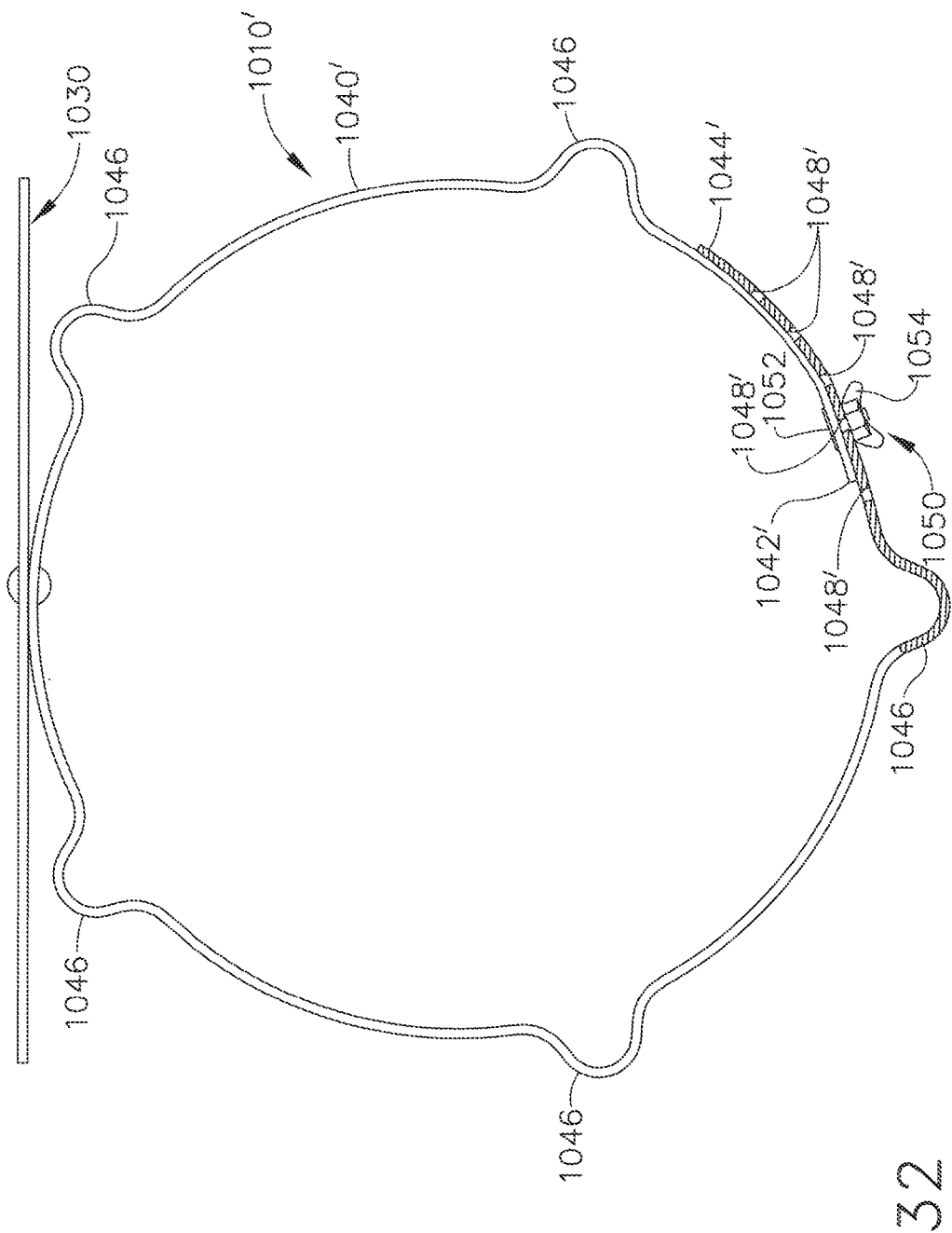
FIG. 32 is a top view of another embodiment of the present invention.

FIG. 32 illustrates an alternative apparatus 1010' wherein a first end 1042' of a flexible strap 1040' is attached to a second end portion 1044' of the flexible strap 1040' by a screw arrangement 1050. In one embodiment, the screw arrangement 1050 may comprise a threaded stud 1052 that is affixed to the first end 1042' of the strap 1040' and a wing stop 1054. A series of holes 1048' or a slot are provided in the second end portion 1044' of the strap 1040' to provide the user with the ability to select the appropriate hole required to cinch the strap 1040' to the tree. As with the above-described embodiment, the crimps 1046 enable the flexible member 1040' to accommodate a certain amount of tree growth without human intervention. Once the tree has attained a diameter that has resulted in the maximum expansion of the flexible member 1040', the user may release the apparatus from the tree and insert the threaded stud 1052 into another hole 1048' to lengthen the flexible member 1040' to accommodate additional tree growth.

In alternative embodiments, the flexible member assembly 1040' may be integrally formed with the object an otherwise function in the manner described above. Thus, for those embodiments, no hanger plates or hanger members are otherwise required.

Figure 33:
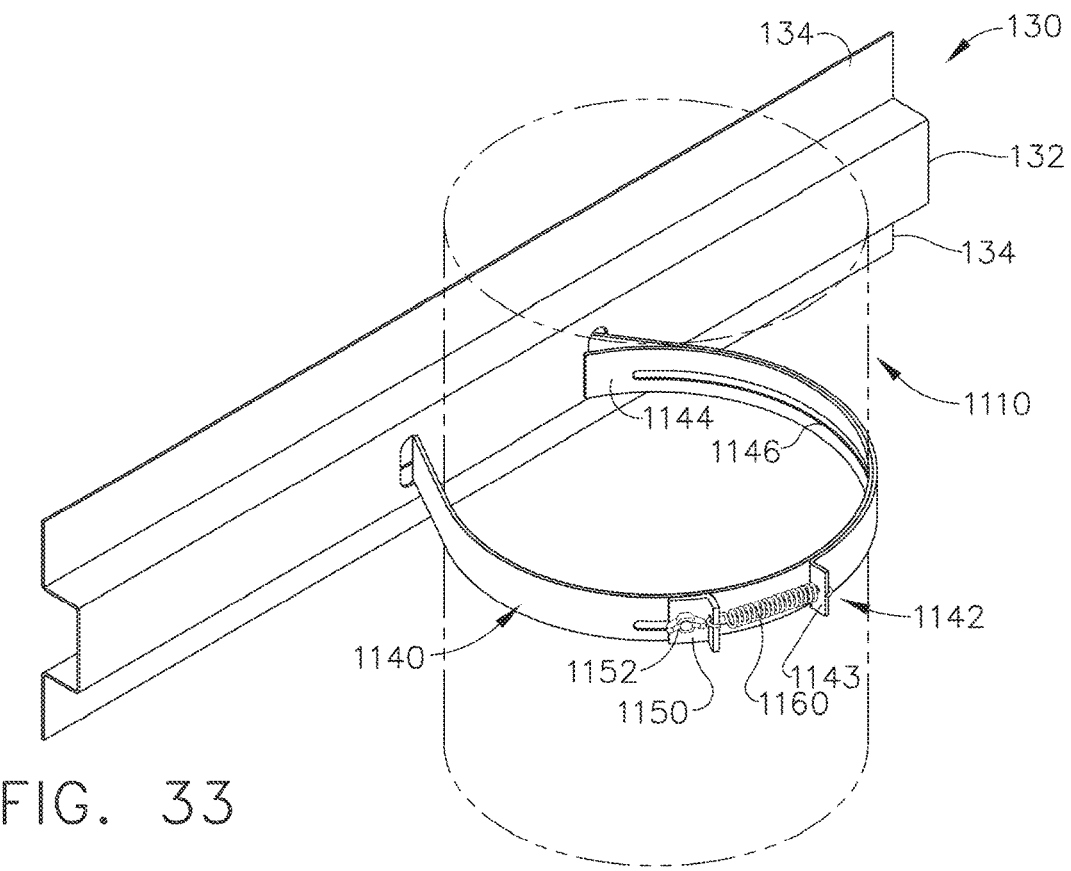
FIG. 33 is a perspective view of another embodiment of the present invention attached to a tree.
Figure 34:
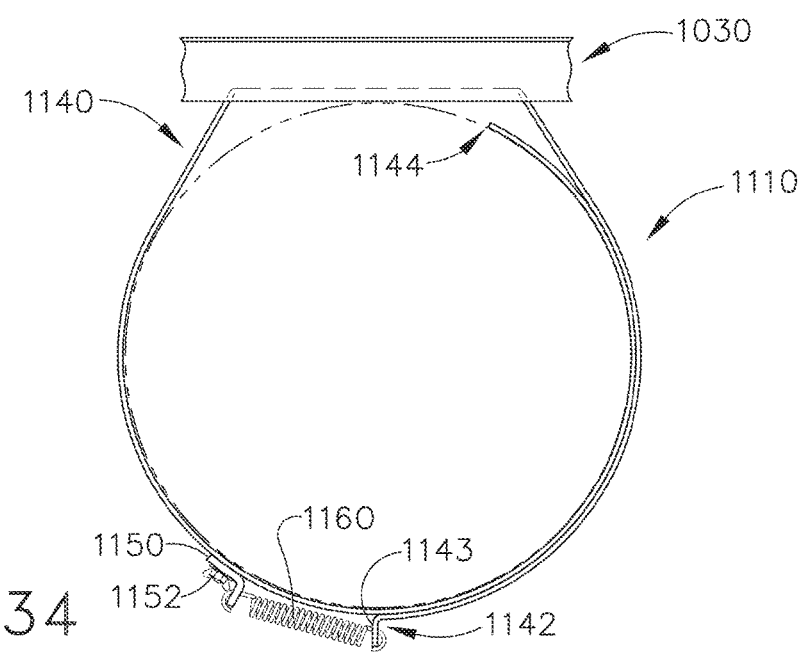
FIG. 34 is a top view of the embodiment of FIG. 33.

FIGS. 33 and 34 illustrate another apparatus 1110 that, in at least one form, includes a hanger member 130 of the type and construction described above. This embodiment employs a flexible member 1140 that comprises a strap that has a first end 1142 and a second end 1144. A first spring tab 1143 is formed on the first end of the flexible member 1142. The flexible member 1140 also has a longitudinal slot 1146 therein to facilitate movable attachment of a second spring tab 1150 thereto by, for example, a wing nut and set screw assembly 1152. To install the apparatus 1110 on a tree, the user wraps the flexible member 1140 around the backside of the tree portion T as shown in FIG. 34. A coil spring 1160 is attached between the first and second spring tabs 1143, 1150. The user then tightens the set screw assembly 1152 in position within the slot 1146. It will be understood that the spring 1160 serves to retain the strap 1140 in cinching engagement around the tree and will stretch to accommodate a certain amount of tree growth. However, in this embodiment, the user will have to periodically monitor the tree growth and adjust the position of the second spring tab 1150 accordingly to prevent the spring 1160 from becoming overstretched.

In alternative embodiments, the flexible member assembly 1140 may be integrally formed with the object an otherwise function in the manner described above. Thus, for those embodiments, no hanger plates or hanger members are otherwise required.

Figure 35:
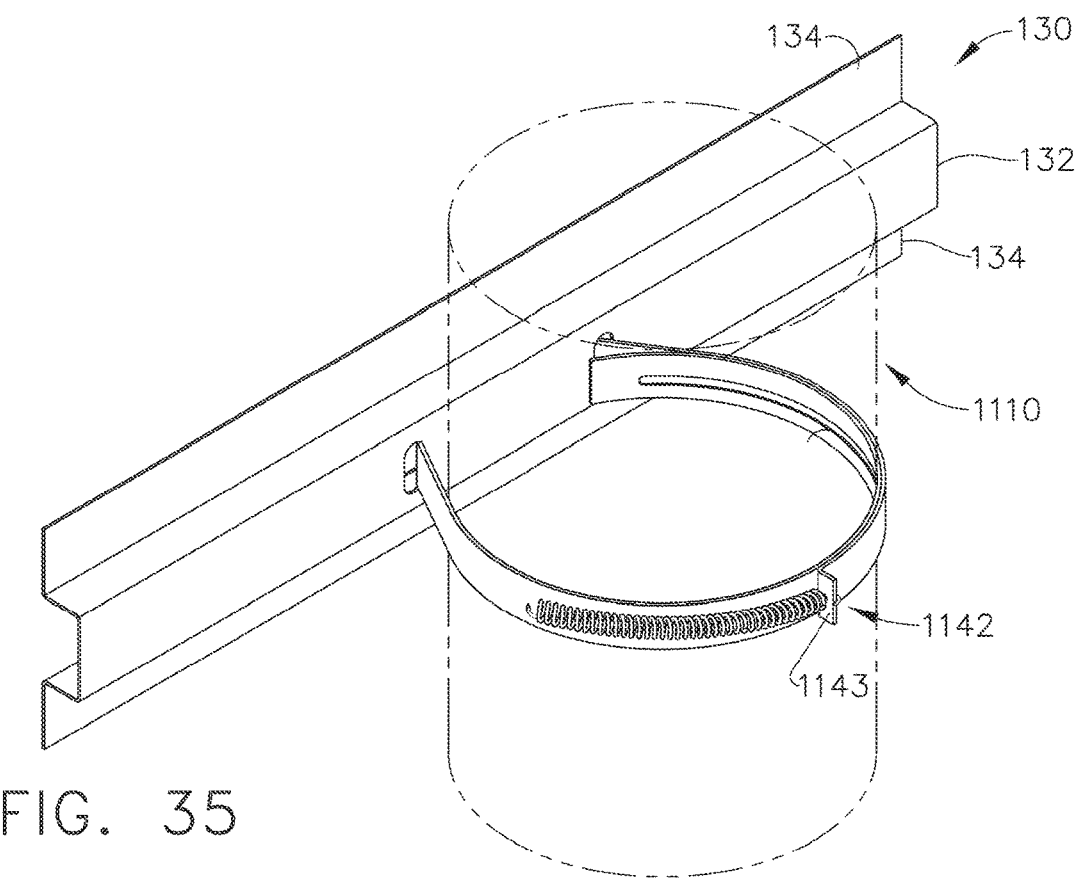
FIG. 35 is a perspective view of another embodiment of the present invention attached to a tree.
Figure 36:
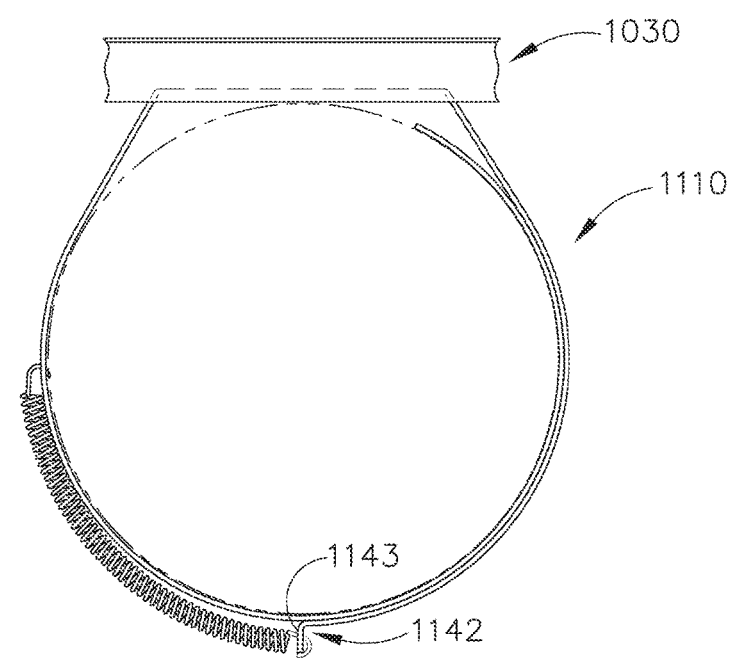
FIG. 36 is a top view of the embodiment of FIG. 35.

FIGS. 35 and 36 illustrate another apparatus 1110' that, in at least one form, includes a hanger member 130 of the type and construction described above. This embodiment employs a flexible member 1140' that comprises a strap that has a first end 1142' and a second end 1144'. A spring tab 1143' is provided on the first end 1142' of the flexible member 1140'. To install the apparatus 1110' on a tree, the user wraps the flexible member 1140' around the backside of the tree portion T as shown in FIG. 36. A coil spring 1160' is attached between a portion of the flexible member 1140' and the spring tab 1143' as shown to cinch the flexible member 1140' to the tree portion. As the tree grows, the spring 1160' will stretch. The spring will accommodate tree growth until the spring 1160' is essentially completely elongated.

In alternative embodiments, the flexible member assembly 1140' may be integrally formed with the object an otherwise function in the manner described above. Thus, for those embodiments, no hanger plates or hanger members are otherwise required.

Figure 37:
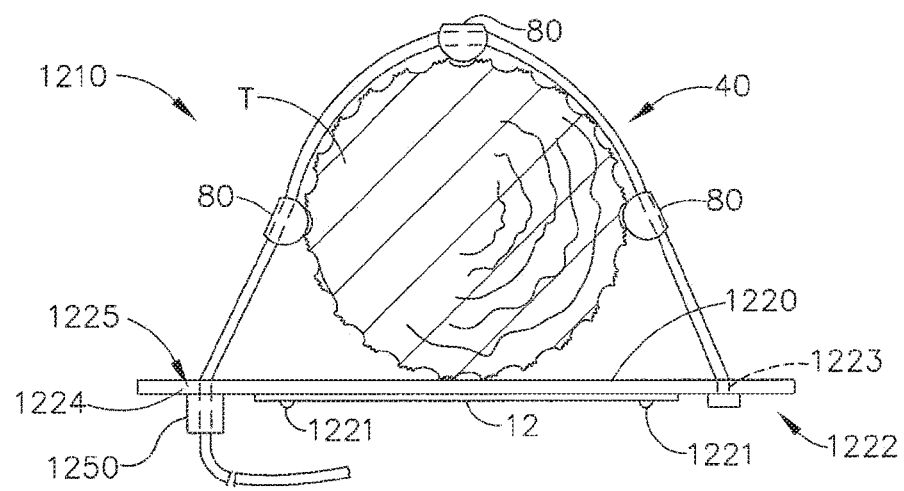
FIG. 37 is a top view of another embodiment of the present invention attached to a tree portion with the tree portion shown in cross-section.

FIG. 37 illustrates an apparatus 1210 configured to hang or secure an object 12 to a tree portion T at a desired height or elevation above the ground. In this embodiment, the apparatus 1210 includes an elongated mounting member 1220 that has a first end or portion 1222 and a second end or portion 1224. The elongated mounting member 1220 may be fabricated from, for example, aluminum, steel or other metals or from polymer materials. The object (in the illustrated case, a sign 12) may be attached to the mounting member 1220 by, for example, self tapping screws 1221. However, the sign may be attached to the mounting member 1220 by double-sided tape, adhesive, bolts, clips, clamps, paper fastener brads, etc.

In various embodiments, the apparatus 1210 further includes a flexible member 40 that has a first end 42 and a second end 44. In at least one embodiment, the flexible member 40 comprises a relatively braided metal cable. It is conceivable, however, that the flexible member 40 may comprise other forms of cable or wire fabricated from a variety of materials. The flexible member 40 may also comprise a solid wire or similar arrangement fabricated from metal or polymer material. In various arrangements, the flexible member 40 has a length that is greater than an expected circumference of the tree portion to which it is to be attached at the end of a predetermined or expected period of time.

In the illustrated embodiment, the first end 42 of the flexible member 40 is attached or affixed to a first end or portion 1222 of the mounting member 1220. In at least one embodiment, wherein the flexible member 40 comprises braided cable, the first end 42 of the flexible member 40 may extend through a hole 1223 in the first end 1222 of the mounting member 1220 and have a lug or stop 46 attached thereto to prevent the flexible member 40 from pulling through the hole 1223. The lug 46 may be fabricated from, for example, aluminum or other metal material and be configured to be non-movably crimped onto or otherwise affixed to the first end of the cable 40 in the field by the user or by the manufacturer. It will be understood that other methods of securing or fastening the first end 42 of the flexible member 40 to the first end 1222 of the mounting member 1220 may be employed. For example, the first end 42 of the flexible member 40 may be permanently attached to the first end 1222 of the mounting member 1220 by welding or other suitable fastener arrangements. In still other embodiments, the flexible member 40 may be clamped or glued to the first end 1222 of the mounting member 1220. In still other embodiments, the first end 42 of the flexible member 40 may be attached or secured to the first end or portion 1222 of the mounting member 1220 by the slot arrangement described above. In yet another embodiment wherein the mounting member comprises the object itself (or stated another way, no mounting member is employed), the first end of the flexible member 40 may be attached to a first portion of the object using any of the arrangements disclosed herein.

As can be seen in FIG. 37, the flexible member 40 is extended around the backside of the tree portion T, and a second end 44 of the flexible member 40 is passed through the hole or opening 25 in the second end or portion 1224 of the mounting member 1220 which may be positioned adjacent the front side of the tree portion T. The hole 1225 may be sized relative to the flexible member 40 such that it may freely pass therethrough. Thereafter, the user installs a friction generating ferrule or slug 1250 on the second portion of the flexible cable 40 that protrudes out through the hole 25. In at least one embodiment, the ferrule 1250 may be fabricated from aluminum or other metal material and have a bore 1252 therethrough that is sized to receive the flexible member 40 (in the illustrated embodiment, a cable) therethrough. The user may then slide the ferrule 1250 into abutting relationship with the mounting member 1220 as shown in FIG. 37 to cinch the flexible member 40 to the tree portion. The ferrule 1250 is sized and shaped (i.e., "configured") relative to the hole 1225 in the mounting member 1220 such that the ferrule 1250 is prevented from passing therethrough. The user may crimp or otherwise fasten the ferrule 1250 to the cable 40 such that the apparatus 1210 is cinched to the tree portion at the desired height, yet is movable thereon to accommodate tree growth (expansion of the tree portion).

Figure 38:
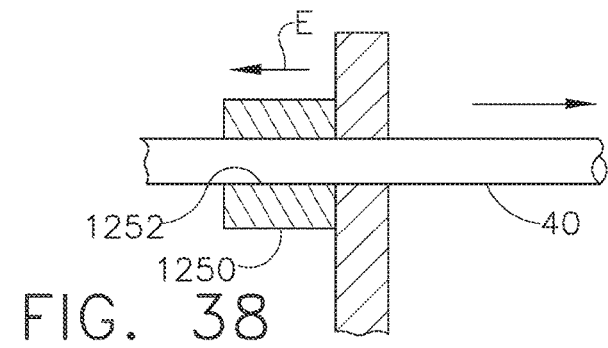
FIG. 38 is a partial cross-sectional view of a portion of the support member and flexible member of the embodiment of FIG. 37 showing a ferrule on the flexible member.

The ferrule 1250 may be crimped using crimping or a swaging tool such that when the ferrule has been crimped onto the cable 40, a desired amount of sliding frictional fit is established between the ferrule 1250 and the cable 40. Such sliding frictional fit is sufficient to retain the apparatus 1210 cinched to the tree portion T at the desired height above the ground, yet will permit the ferrule to slide down the cable 40 in the "E" direction as the tree portion T grows and expands. See FIG. 38. Such sliding frictional fit may for example, also have a magnitude that enables the user to slide the ferrule 1250 along the cable 40 manually without the aide of tools. The swaging tool may be configured with a stop feature, for example, such that when the user fully compresses or squeezes the tool around the ferrule, the ferrule 1250 is compressed onto the cable sufficiently to establish the desired sliding frictional fit and any overcompression of the ferrule 1250 is prevented.

Other ferrule or friction generating configurations are contemplated. As indicated above, the ferrule 1250 may be fabricated from aluminum or metal. In other embodiments, the ferrule is manufactured from a polymer or rubber material. In still other embodiments, the ferrule is equipped with a set screw that may be screwed into contact with the cable to establish the desired amount of sliding frictional fit therebetween. Other ferrule embodiments may include a knockout or detent portion that may be squeezed or compressed into frictional contact with the cable. Other forms of ferrule constructions may comprise a metal body portion that contains a polymer sleeve that can be compressed into the cable to establish the desired sliding frictional fit. Ferrules may also be referred to herein as "friction generating members".

In various embodiments, the ferrule(s) are sized and configured relative to the cable such that when the ferrule is secured to the cable, at east a minimal amount of sliding frictional fit will still occur. As used herein, the term "minimal amount of sliding frictional fit" refers to the minimal amount of fit established between the ferrule and cable that is required to cinch or otherwise secure the apparatus to the tree portion at the desired elevation above the ground as the tree continues to grow. Thus, the minimal amount of sliding frictional fit required to secure an apparatus and object having a first total weight may be larger than the sliding frictional fit required to secure another apparatus and object that has a second total weight that is less than the first total weight.

In those applications wherein significant swings in temperature may occur which could result in expansion and contraction of the various components, it may be desirable for the ferrules or latch mechanism components to be fabricated from material that has the same coefficient of thermal expansion as the material comprising the flexible member. In such embodiments, the ferrule(s) or latch(es) will expand and contract at substantially the same rate as the flexible member such that a desired amount of sliding frictional contact is maintained therebetween during such fluctuations in temperature. In other embodiments wherein the ferrule(s) or latch(es) and cable are manufactured from dissimilar materials, the ferrule(s) may be sized and configured relative to the cable such that when the ferrule (or latch(es)) is secured to the cable, at east the minimal amount of sliding frictional fit will still occur and yet the ferrule(s) will remain frictionally slidable on the cable (or the cable will remain frictionally slidable through the latch(es)) in response to the radial forces applied thereto as the tree portion expands regardless of the temperature.

After the apparatus 1210 has been attached to the tree portion T, as the tree portion T continues to grow, the ferrule 1250 will frictionally move or slide on the cable 40 away from the support member 1220 to accommodate such growth without any need for human intervention. When the circumference of the tree portion T exceeds the aggregate length of the flexible member 40 and the support member 1220, the apparatus 1210 will fall from the tree portion To prevent any inadvertent damage thereto as the tree continues to grow. The apparatus may be reused on a smaller tree or the user may replace the original flexible member with a longer flexible member and reattach it to the tree in the above-described manner.

As described above, the aforementioned arrangement may also be used to attach an object 12 to a tree portion T without the use of a mounting member. In such arrangement, the first end 42 of the flexible member 40 is secured or attached to a first portion of the object 12. With the object 12 adjacent the front side of the tree portion T, the flexible member 40 is passed around the backside of the tree portion T and inserted through a hole in another portion of the object 12. The user may then slide the ferrule or ferrules 1250 onto the portion of the flexible member protruding through the opening to cinch the object to the tree portion T in the above-described manner.

In an alternative embodiment, the first end 42 is not non-movably attached to the first end 1222 of the mounting member 1220. In at least one embodiment, for example, the first end 42 of the flexible member 40 movably extends through the hole 1223 in the support member 1220. The first end 42 extends through the hole 1223 a distance that is substantially equal to a distance that the second end 44 extends through the hole 1225. A second ferrule 1250 is slid onto and attached to the portion of the flexible member 40 extending through hole 1223 and brought into abutting engagement with the support member 1220 and is crimped or otherwise attached to the flexible member as described above. As the tree expands, both of the ferrules 1250 may frictionally move on the flexible member 40 to accommodate the expansion as was described above. In still other arrangements, the holes 1223, 1225 may be provided through portions of the object 12 such that no additional mounting member is employed. For those embodiments wherein a separate mounting member is employed, the sign or object 12 may be directly attached to the mounting member by means of any of the attachment arrangements described herein. In alternative embodiments, any of the various hanger members disclosed herein may also be employed. However, in other embodiments, the mounting member may comprise at least a portion of the object itself.

Figure 39:
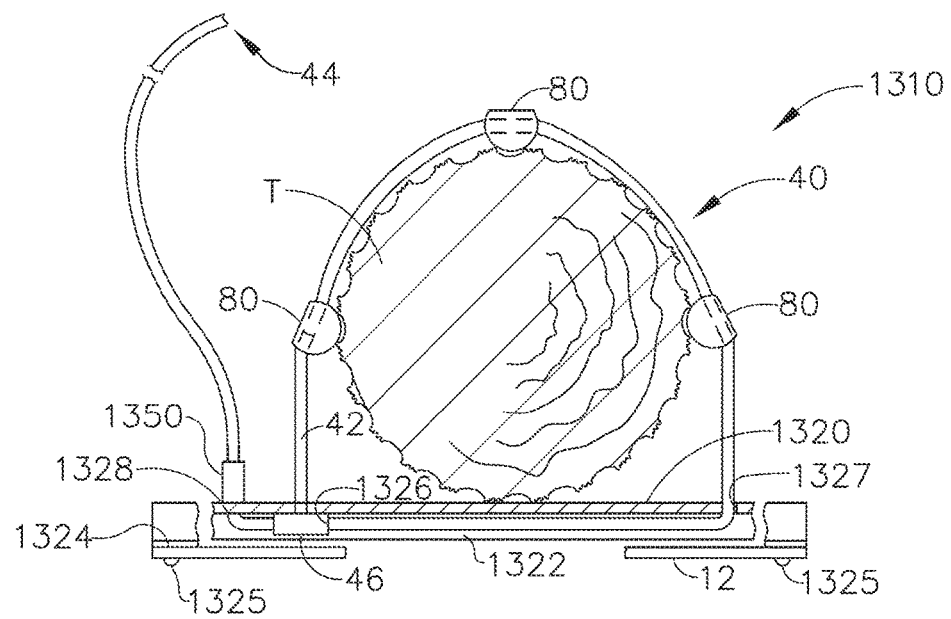
FIG. 39 is a top view of another embodiment of the present invention attached to a tree portion with the tree portion shown in cross-section.

FIG. 39 illustrates another apparatus 1310 configured to hang or suspend an object 12 on a tree portion T at a desired height above the ground. In this embodiment, the apparatus 1310 includes an elongated mounting member 1320 that may be similar in shape to the hanger 130 described above. For example, in one embodiment, the support member 1320 may comprise a hat channel that is fabricated from steel or other metal or polymer material. The support member 1320 has a channel 1322 and two raised planar attachment faces 1324. Double-sided tape may be applied to each attachment face 1324 to facilitate easy attachment of a sign 12 or other object thereto. In other embodiments, the sign may be attached to the support member 1320 by self tapping screws 1325 or clamps, rivets, screws, bolts, clips, adhesive, paper fastener brads, etc.

In various embodiments, the apparatus 1310 further includes a flexible member 40 that has a first end 42 and a second end 44. In at least one embodiment, the flexible member 40 comprises a relatively braided metal cable. It is conceivable, however, that the flexible member 40 may comprise other forms of cable or wire fabricated from a variety of materials. It is further anticipated that, for at least some embodiments, the flexible member 40 may comprise a strap fabricated from cloth or fiber or metal or polymer or various combinations of such materials. The flexible member 40 may also comprise a solid wire or similar arrangement fabricated from metal or polymer. The flexible member may have a length that is greater than an expected circumference of the tree portion to which it is to be attached at the end of an expected or predetermined time period.

In the illustrated embodiment, the first end 42 of the flexible member 40 is attached or affixed to the mounting member 1320. In at least one embodiment, wherein the flexible member 40 comprises cable, the first end of the flexible member 40 extends through a hole or opening 1326 in the mounting member 1220 and has a lug or stop 46 attached thereto to prevent the flexible member 40 from pulling through the hole 1326. The lug 46 may be fabricated from, for example, aluminum or other metal material and be configured to be non-movably crimped onto or otherwise affixed to the first end 42 of the cable 40 in the field or by the manufacturer. It will be understood that other methods of fastening the first end 42 of the flexible member 40 to the mounting member 1320 may be employed. For example, the first end 42 of the flexible member 40 may be permanently attached to the mounting member 1320 by welding or other suitable fastener arrangements. In still other embodiments, the flexible member 40 may be clamped or glued to the mounting member 1320.

As can be seen in FIG. 39, a second end 44 of the flexible member 40 is passed around the backside of the tree portion T and inserted through a second hole 1327 in the mounting member 1320. The hole 1327 is sized relative to the flexible member 40 such that it may freely pass therethrough. The second end 44 of the flexible member 40 is passed through a third hole 1328 in the mounting member 1320. Thereafter, the user installs a ferrule or slug 1250 thereon in the manner described above. The ferrule 1250 is sized and shaped relative to the hole 1328 in the mounting member 1320 such that the ferrule 1250 is prevent from passing therethrough. The user may then crimp or otherwise fasten the ferrule 1250 to the cable 40 (as described above to attain a desired amount of sliding frictional fit) such that the apparatus 1310 is cinched to the tree portion at the desired height.

After the apparatus 1310 has been attached to the tree portion, as the tree portion continues to grow, the ferrule 1250 will frictionally slide on the cable 40 away from the support member 1320 to accommodate such growth (expansion) without any need for human intervention or adjustment. When the circumference of the tree portion T exceeds the length of the flexible member 40 and the support member 1320, the apparatus 1310 may fall from the tree portion T to prevent any inadvertent damage thereto as the tree continues to grow. The apparatus may be reused on a smaller tree or the user may replace the original flexible member with a longer flexible member and reattach it to the tree portion T to accommodate further growth.

FIGS. 40-46 and 52 illustrate another apparatus 1410 for supporting an object such as a sign from a tree portion T at a desired height above the ground. In at least one form, this embodiment includes a mounting member 1420 that may be fabricated from metal such as, for example, steel, stainless steel, etc. using conventional sheet metal drawing and stamping techniques. In other embodiments, the mounting member 1420 may be cast or machined from metal, such as aluminum, steel or the like. In still other embodiments, the mounting member 1420 may be molded from a polymer material. The flexible member 40 may comprise, for example, braided metal cable and have a length that is greater than an expected circumference of the tree portion T to which it is to be attached at the end of an expected or predetermined time period.

Figure 40:
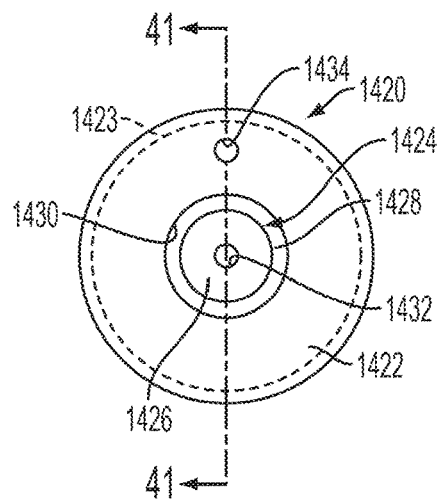
FIG. 40 is a top view of another mounting member embodiment of the present invention.
Figure 41:
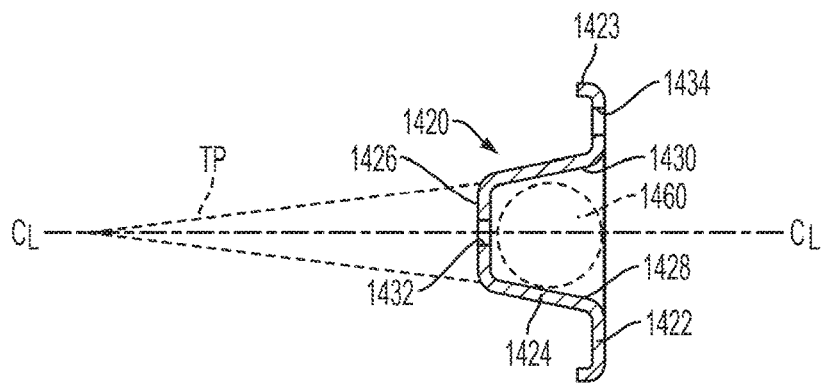
FIG. 41 is a cross-sectional view of the mounting member of FIG. 40 taken along line 41-41 in FIG. 40 and with a friction-generating member of the present invention shown in phantom lines to illustrate the relationship between the outer diameter of the friction-generating member and the mounting member.

Referring first to FIGS. 40 and 41, a mounting member 1420 may be formed with a mounting flange 1422 that has cup-like body portion 1424 extending therefrom. The body portion 1424 includes a bottom 1426 and an annular wall 1428 that defines a receptacle area 1430 for receiving a friction-generating member 1460 therein. The friction generating member 1460 may also be referred to herein as a ferrule. The bottom 1426 includes a hole or opening 1432 that is sized to permit a flexible member 40 to pass therethrough as will be discussed in further detail below. A mounting hole 1434 is provided through the mounting flange 1422 for attaching a first end 42 of the flexible member thereto. In at least one embodiment, the mounting flange 1422 has a downturned strengthening lip 1423 formed around its outer circumference to add strength to the mounting flange 1422 in an effort to prevent the flexible member 40 from tearing through the mounting flange 1422 during use. Other embodiments may employ a separate metal or polymer bushing (not shown) that is pressed into or otherwise mounted within the mounting hole 1434 to prevent the mounting flange 1422 from tearing or failing. As can be most particularly seen in FIGS. 44-46, in at least one embodiment, the first end 42 of the flexible member 40 is passed through the mounting hole 1434 and then reattached to a corresponding portion of the flexible member 40 by, for example, a conventional attachment ferrule 1435 that is crimped using conventional methods. However, other methods of attaching the first end of the flexible member 40 to the mounting flange 1422 may be employed without departing from the spirit and scope of the present invention. The mounting flange 1422 may also be referred to herein as a "first portion" of the mounting member 1420 and the bottom 1426 may also be referred to as a "second portion" of the mounting member 1420.

Figure 42:
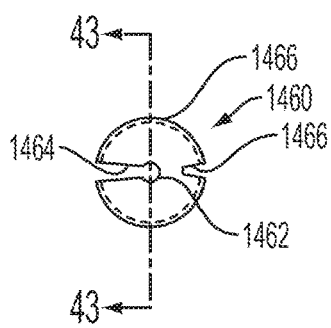
FIG. 42 is a front view of a friction-generating member or ferrule embodiment of the present invention.
Figure 43:
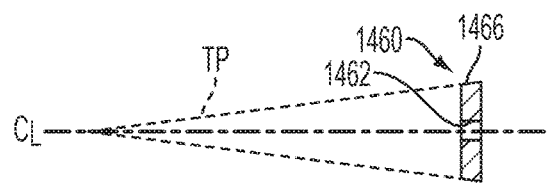
FIG. 43 is a cross-sectional side view of the friction-generating member embodiment of FIG. 42 taken along lines 43-43 in FIG. 42.

FIGS. 42 and 43 illustrate one form of a friction generating member 1460 that may be used in connection with the mounting member 1420. In various embodiments, the friction generating member 1460 may comprise a disc-like member that is fabricated from a polymer or rubber or other friction-generating material. The friction-generating disc or nut 1460 may have a circular shape with a centrally disposed friction hole 1462 therethrough. The friction hole 1462 may be sized and shaped relative to the size and shape of the flexible member 40 so that when a portion of the flexible member 40 is forced or otherwise entered into the hole 1462, an amount of friction is generated therebetween. In at least one embodiment, the friction generating member 1460 is provided with an installation slot or opening 1464 to facilitate insertion of a portion of the flexible member 40 into the friction hole 1462 during installation. As can be most particularly seen in FIG. 41, in at least one embodiment, the wall 1428 of the mounting member 1420 is slightly tapered in a frusto-conical fashion with a taper designated as "TP". In various embodiments, the outer edge 1466 of the friction-generating member 1460 may be formed with a similar taper TP. See FIG. 43. In other embodiments, the wall 1428 is not tapered. In still other embodiments, one or more dimples, formations rings, and/or slots may be formed in the wall 1428 to retain the friction generating member in sliding or slidable frictional engagement with the flexible member 40. In such arrangements, for example, the friction generating member may be provided in multiple segments. The mounting member 1420 and the friction generating member or ferrule 1460 may also be referred to herein as a "mounting assembly".

Figure 44:
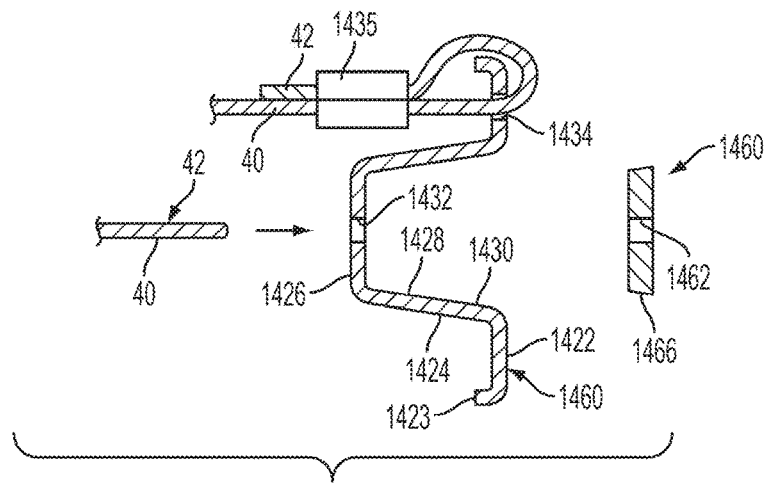
FIG. 44 is an exploded cross-sectional assembly view of a flexible member embodiment, a mounting member embodiment and a friction generating member embodiment prior to assembly.
Figure 45:
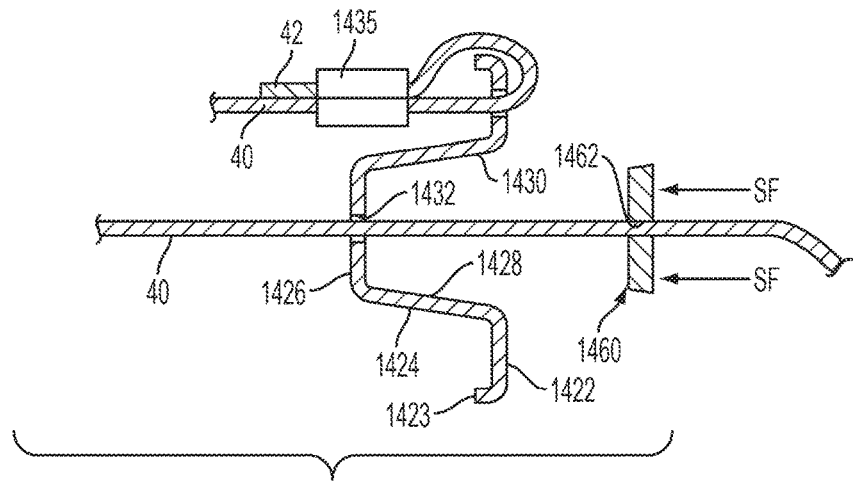
FIG. 45 is another exploded cross-sectional assembly view of the components of FIG. 44 with the second end of the flexible member extending through an opening in the bottom of the mounting member and with the friction-generating member attached to a portion of the flexible member.
Figure 46:
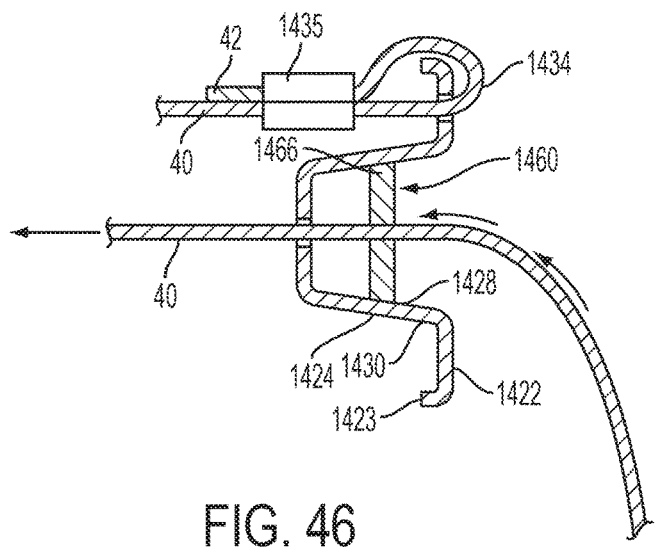
FIG. 46 is another exploded cross-sectional view of the components of FIGS. 44 and 45 with the friction-generating member seated within the receiving area in the mounting member.

FIGS. 44-46 illustrate the assembly of the mounting member 1420 and friction generating member 1460. FIG. 44 illustrates a second end 44 of the flexible member 40 prior to insertion through the hole 1432 in the bottom 1426 of the mounting member 1420. In at least one embodiment, the hole 1432 is sized and shaped relative to the size and shape of the flexible member 40 to permit the second end 44 thereof to be freely inserted therethrough for ease of installation. In other embodiments, however, the hole 1432 may be sized and shaped relative to the size and shape of the flexible member 40 so as to create a sliding or slidable frictional engagement between the flexible member 40 and the mounting member 1420. FIG. 45 illustrates the mounting member 40 after the second end 44 of the flexible mounting member 40 has been inserted through the hole 1432 in the mounting member 1420 and a portion of the flexible member 40 has been seated into the friction hole 1462 in the friction generating member 1460. Once the flexible member 40 has been seated in the friction hole 1462, the friction generating member 1460 is seated into the receptacle area 1430 in the mounting member 1420 by forcibly sliding the friction generating member 1460 on the flexible member 40 (represented by arrows "SF" in FIG. 45). FIG. 46 illustrates the friction generating member 1460 seated within the receptacle area 1430 in the mounting member 1420.

The apparatus 1410 may be employed to attach a variety of objects as discussed above to a tree using the various hanger member embodiments disclosed above. FIGS. 47-50 illustrate another hanger member 1500 that may be employed with the apparatus 1410 or other embodiments described above. As can be seen in those Figures, in at least one embodiment, the hanger member 1500 includes a planar body portion 1502 that defines a front face 1504 and a rear or ("tree-facing" face 1506). The body portion 1502 may have a length "L" and a width "W" that are greater than, equal to or less than the length and width, respectively, of the object to be suspended from the tree. In the illustrated embodiment, the hanger member 1500 is provided with a centrally-disposed mounting lug 1510 that protrudes outwardly from the rear-facing face 1506. The mounting lug 1510 has a passage 1512 therethrough for receiving a flexible mounting member therethrough. The passage 1512 may be sized and shaped relative to the size and shape of the flexible mounting member employed to permit the flexible member to pass freely therethrough for ease of installation. Other embodiments may include more than one mounting lug 1510. In still other embodiments, the mounting lug 1510 may be replaced with one or more hooks that simply permit the hanger member to be hooked over the flexible member. In at least one embodiment, for example, the hanger member

1500 may be molded or otherwise formed from a polymer material with the mounting lug(s) and/or hooks integrally formed with the body portion 1502. In still other embodiments, the mounting lugs and/or hooks may be fabricated from material that is the same as or dissimilar to the material from which the body portion is fabricated from and be attached thereto by adhesive, welding, fasteners, screws, rivets, brads, snap arrangements, etc. In other embodiments, the hanger member 1500 is machined or cast from metal material. In still other embodiments, the hanger member may be fabricated from a block of material (e.g., polymer, metal, wood, etc.) and have a longitudinal passage extending therethrough to enable the flexible member to pass therethrough.

As illustrated in FIG. 50, the object (a sign 12 is illustrated) may be attached to the hanger member 1500 by one or more fasteners 1520. To facilitate ease of installation, dimples 1503 or pilot holes may be preformed in the body portion 1502 of the hanger member 1500 to facilitate attachment of the object thereto. Where other forms of fasteners are employed (e.g., rivets, brads, bolts, etc.) the holes 1503 may be predrilled through the body portion 1502. FIG. 51 illustrates use of a piece of double sided tape 1530 on the front face 1504 of the hanger member 1500 for attaching the object thereto. Such double sided tape 1530 may be used alone or in connection with any of the other fastener forms discussed above for attaching the object to the hanger member 1500.

In other arrangements, the hanger member 1500 may be omitted. In such arrangements, for example, the flexible member 40 may be woven through holes or slots provided in the object itself. In still other arrangements, the object may be formed with or have attached thereto, one or more hangers that can be used to support the object off of the flexible member.

Figure 52:
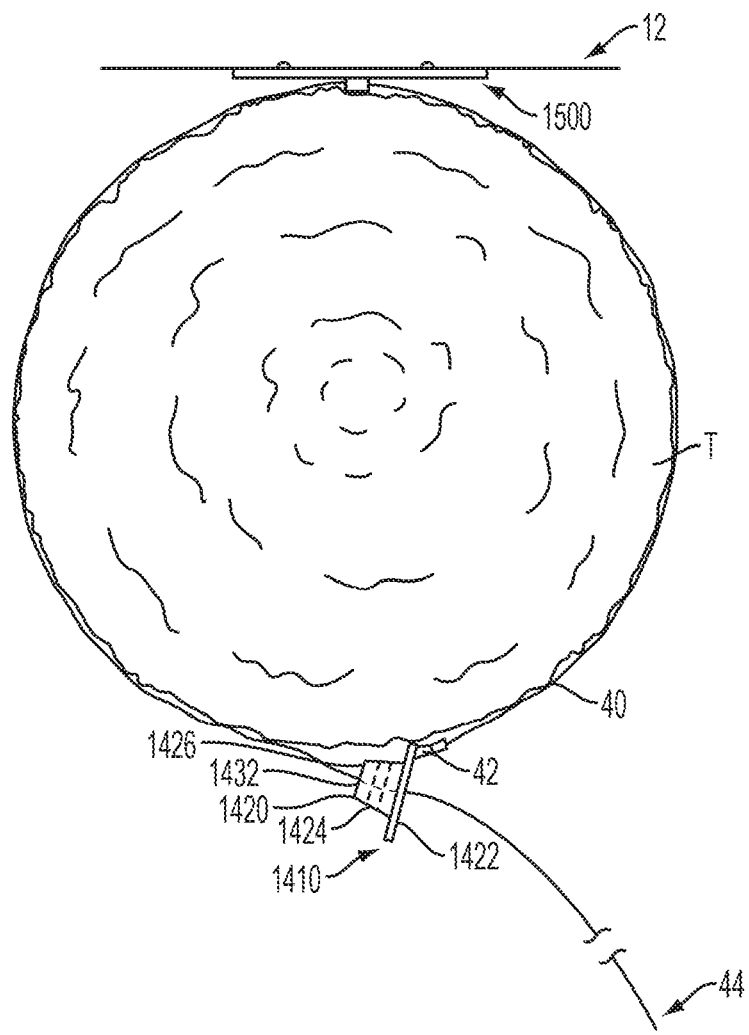
FIG. 52 is a cross-sectional view of a portion of a tree with the apparatus of FIGS. 44-46 attached thereto.
Figure 53:
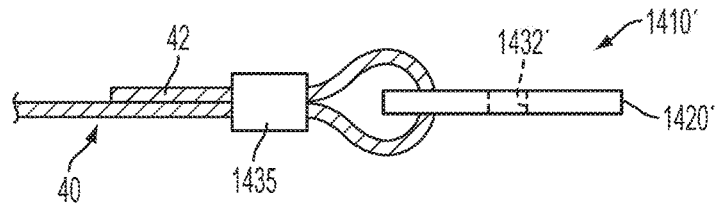
FIG. 53 is a top view of another embodiment of the present invention for attaching an object to a tree.
Figure 54:
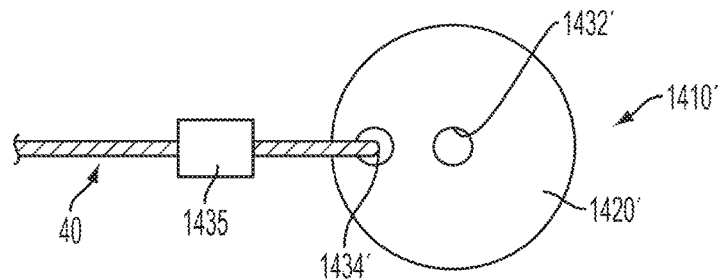
FIG. 54 is a front view of the apparatus of FIG. 53.

The apparatus 1410 may be attached to a tree portion T in the manner illustrated in FIG. 52. If the hanger member 1500 is to be used, prior to mounting the apparatus to the tree portion T, the user may insert the second end 42 of the flexible member 40 through the passage 1512 in the mounting lug 1510 so that the hanger member 1500 is slidably received on the flexible member 40. The user may then locate the apparatus 1410 at a desired height on the tree portion T by positioning the mounting member 1420 on the backside of the tree portion T while positioning the hanger member 1500 adjacent the front side of the tree portion T. As used herein, the term "backside of the tree" generally refers to the side of the tree portion T that is opposite to the side of the tree from which the hanger member and object will be suspended from (i.e., the "front side"). The user then inserts the second end 44 of the flexible member 40 through the hole 1432 in the bottom 1426 in the body portion 1424 of the mounting member 1420. While supporting the body portion 1424 adjacent the backside of the tree, the user seats a portion of the flexible member 40 into the friction hole 1462 in a friction generating member 1460 and then slidably moves the friction generating member 1460 on the flexible member 40 to seat it firmly into the receiving area 1430 in the mounting member 1420 and thereby cinch the apparatus to the tree portion T at the desired height above the ground. Prior to cinching the flexible member 40, the user may slidably adjust the position of the hanger member 1500 on the flexible member. The object 12 may then be attached to the front face 1504 of the hanger member 1500 using fasteners 1520 or any of the other attachment arrangements disclosed herein. In other methods, the object may have been pre-attached to the hanger member 1500 prior to installing the apparatus 1410 on the tree portion T.

As the tree portion T expands, the flexible member 40 will frictionally slide through the friction hole 1462 in the friction-generating member 1460. In various embodiments, the friction-generating member is fabricated from a polymer or rubber material that will serve to generate a sufficient amount of sliding or slidable friction with the flexible member as it extends therethrough. The amount of sliding or slidable friction needed will depend upon the weight of the object to be suspended on the tree portion T. Such magnitude of sliding or slidable friction should not be so great, however, as to ever prevent frictional slippage between the flexible member 40 and the friction generating member 1460 as the tree portion T expands. As can be seen in FIG. 42, at least one relief cut 1466 may be provided in the friction generating member 1460 to enable the friction generating member 1460 to be seated in the mounting member 1420 thereby compressing the material defining the friction hole 1462 into sliding or slidable frictional engagement with the flexible member 40. The number, size, configuration and location of such relief cut(s) may vary and such variations are intended to be within the scope of the appended claims. In still other embodiments, the friction generating member may be provided in multiple pieces that, when seated within the mounting member, generate a desired amount of sliding or slidable frictional engagement with the flexible member. As the tree portion continues to grow, the flexible member 40 continues to frictionally slip through the friction generating member 1460 to accommodate such growth until eventually all of the flexible member 40 pulls through the friction hole 1462 (without any human intervention), at which point the apparatus may fall from the tree. Such arrangement enables the object 12 to be suspended from the tree portion at a desired height above the ground for at least a desired period of time without the need for human intervention during that time period and without the flexible member failing (e.g., breaking) or cutting through the outer bark of the tree and catastrophically damaging the tree.

As indicated above, in at least one embodiment, the outer edge 1466 of the friction-generating member 1460 may be formed with a taper TP that is similar to the taper TP of the wall 1428 of the mounting member 1420. When employing this arrangement, as the tree expands, the outer circumference of the tree portion T will apply additional tension to the flexible member 40. Such additional tension will initially tend to draw the friction generating member 1460 toward the bottom 1426 of the mounting member 1420. Because the wall 1428 of the mounting member 1420 tapers toward the bottom 1426 and the outer edge 1466 of the friction-generating member 1460 is similarly tapered, the wall 1428 will tend to compress the friction generating member 1460 inwardly around the flexible member 40. Such arrangement therefore increases or at least maintains the frictional engagement with the portion of flexible member 40 extending through the friction generating member until the amount of additional tension applied by the tree portion T exceeds the generated friction and the flexible member is then permitted to slide relative thereto to accommodate the growth of the tree portion T. For those embodiments that employ friction generating members that are fabricated from a polymer or similar material that may tend to degrade over time as the flexible member frictionally slides relative thereto, such tapered compression configuration may serve to accommodate such degradation. That is, as the friction generating member continues to be drawn into the receiving area toward the bottom of the mounting member, the wall 1428 of the mounting member will further compress the friction generating member into frictional engagement with the flexible member. Thus, such unique and novel arrangement comprises a mounting assembly that "self-adjusts" or "self compensates" for degradation of the friction generating member as the tree portion continues to grow.

Depending upon the weight of the object to be supported, the user may install additional friction generating members or ferrules 1460 on the flexible member 40 to generate additional sliding frictional engagement with the flexible member 40. The additional friction generating members 1460 would be installed on the flexible member in back-to-back or "stacked" fashion. Depending upon the number of friction generating members employed, some of the friction generating members 1460 may not be received within the receptacle area 1430 in the mounting member 1420. Such unique and novel arrangement conveniently enables the user to attain a desired amount of sliding frictional engagement between the mounting assembly and the flexible member that will be of sufficient magnitude so as to support or suspend the object on the tree portion, yet enable a portion of the flexible member to slide therethrough as the tree portion expands without the need for human intervention.

In alternative arrangements wherein, for example, the object is fabricated from a metal or other material, the mounting member may be integrally or otherwise formed or attached directly to the object. In such arrangement, the first end of the flexible member may be attached to another portion of the object and the second end passed around the backside of the tree portion T and inserted through the opening in the mounting member portion. One or more friction generating members may then be attached to the portion of flexible member protruding out through the mounting member portion and seated in the receiving area thereof. In such arrangements, for example, the excess flexible member may be viewable from the front side of the tree portion T.

FIGS. 53-56 illustrate another apparatus 1410' for supporting an object such as a sign from a tree portion T at a desired height above the ground. This embodiment employs a mounting member 1420' that may be, for example, substantially planar and have a hole or opening 1432' that is sized to permit a flexible member 40 to pass therethrough as will be discussed in further detail below. Another mounting hole 1434' is provided through the mounting member 1420' for attaching a first end 42 of the flexible member 40 thereto. The mounting member 1420' may be fabricated from, for example, steel, stainless steel, aluminum, titanium, polymer, rubber, etc. In one embodiment, the mounting member may have a downturned strengthening lip (not shown) formed around its outer circumference in an effort to prevent the flexible member 40 from tearing through the mounting member 1420' during use. Other embodiments may employ a separate metal or polymer bushing (not shown) that is pressed into or otherwise mounted within the mounting hole 1434' to prevent the mounting member 1420' from tearing or failing.

The flexible member 40 may comprise braided metal cable and have a length that is greater than the expected circumference of the tree portion T to which it is to be attached at the end of an expected or predetermined time period. In at least one embodiment, the first end 42 of the flexible member 40 is passed through the mounting hole 1434' and then reattached to a corresponding portion of the flexible member 40 by, for example, a conventional attachment ferrule 1435 that is crimped using conventional methods. However, other methods of attaching the first end of the flexible member 40 to the mounting member 1420' may be employed without departing from the spirit and scope of the present invention.

Figure 55:
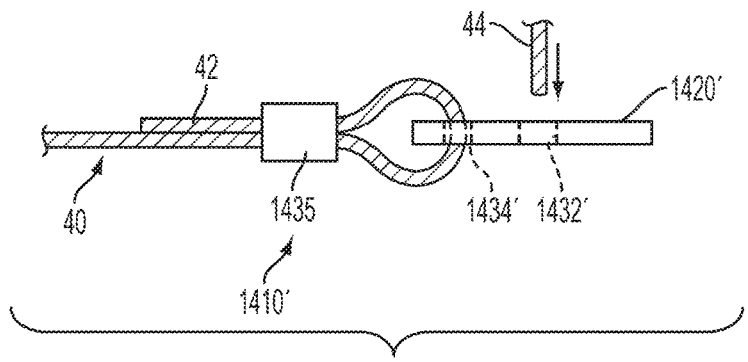
FIG. 55 is another top view of the apparatus of FIGS. 53 and 54 illustrating a second end of a flexible member prior to engagement with the mounting member of the apparatus.
Figure 56:
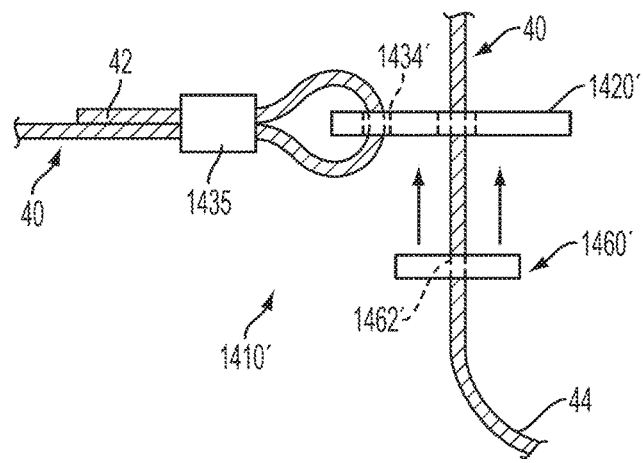
FIG. 56 is another top view of the apparatus of FIGS. 53-55 after a portion of the flexible member has been engaged with the mounting member.

FIGS. 55 and 56 illustrate the assembly of the mounting member 1420' and a friction generating member 1460'. The friction generating member 1460' may be identical to the friction generating member 1460 described above without the tapered outer edge. The mounting member 1420' and the friction generating member 1460' may be collectively referred to herein as a "mounting assembly". FIG. 55 illustrates a second end 44 of the flexible member 40 prior to insertion through the hole 1432' in the mounting member 1420'. In at least one embodiment, the hole 1432' is sized and shaped relative to the size and shape of the flexible member 40 to permit the second end 44 thereof to be freely inserted therethrough for ease of installation. In other embodiments, however, the hole 1432' may be sized and shaped relative to the size and shape of the flexible member 40 so as to create a sliding or slidable frictional engagement between the flexible member 40 and the mounting member 1420'. FIG. 56 illustrates the mounting member 40 after the second end 44 of the flexible mounting member 40 has been inserted through the hole 1432' in the mounting member 1420' and a portion of the flexible member 40 has been seated into the friction hole 1462' in the friction generating member 1460'.

The apparatus 1410' may be attached to a tree portion T as follows. If the hanger member 1500 is to be used, prior to mounting the apparatus to the tree portion T, the user may insert the second end 42 of the flexible member 40 through the passage 1512 in the mounting lug 1510 so that the hanger member is slidably received on the flexible member 40. Thereafter, the user may locate the apparatus 1410' at a desired height on the tree portion T and thereafter position the mounting member 1420' on the backside of the tree portion T while positioning the hanger member 1500 adjacent the front side of the tree portion T. The user then inserts the second end 44 of the flexible member 40 through the hole 1432' in the mounting member 1420'. While supporting the mounting member 1420 adjacent the backside of the tree portion T, the user seats a portion of the flexible member 40 protruding through the hole 1432' in the mounting member 1420' into the friction hole 1462' in the friction generating member 1460'. The user then forcibly slides the friction generating member 1460' on the flexible member 40 to cinch the apparatus 1410' to the tree portion T at the desired height above the ground. Prior to cinching the flexible member 40, the user may slidably adjust the position of the hanger member 1500 on the flexible member. The object 12 may then be attached to the front face 1504 of the hanger member 1500 using fasteners 1520 or any of the other attachment arrangements disclosed herein. In other methods, the object may have been pre-attached to the hanger member 1500 prior to installing the apparatus 1410 on the tree portion T. As the tree portion T expands, the flexible member 40 will frictionally slide through the friction hole 1462' in the friction-generating member 1460'. Additional friction generating members 1460' may be installed as described above if desired.

In other arrangements, the hanger member 1500 may be omitted. In such arrangements, for example, the flexible member 40 may be woven through holes or slots provided in the object itself. In still other arrangements, the object may be formed with or have attached thereto, one or more hangers that can be used to support the object off of the flexible member.

In alternative arrangements wherein, for example, the object is fabricated from a metal or other material, the hole 1432' formed through the object. In such arrangement, the first end of the flexible member may be attached to another portion of the object and the second end passed around the backside of the tree portion T and inserted through the opening 1432'. One or more friction generating members may then be attached to the portion of flexible member protruding out through the mounting member portion and seated in the receiving area thereof. In such arrangements, for example, the excess flexible member may be viewable from the front side of the tree portion T.

Figure 57:
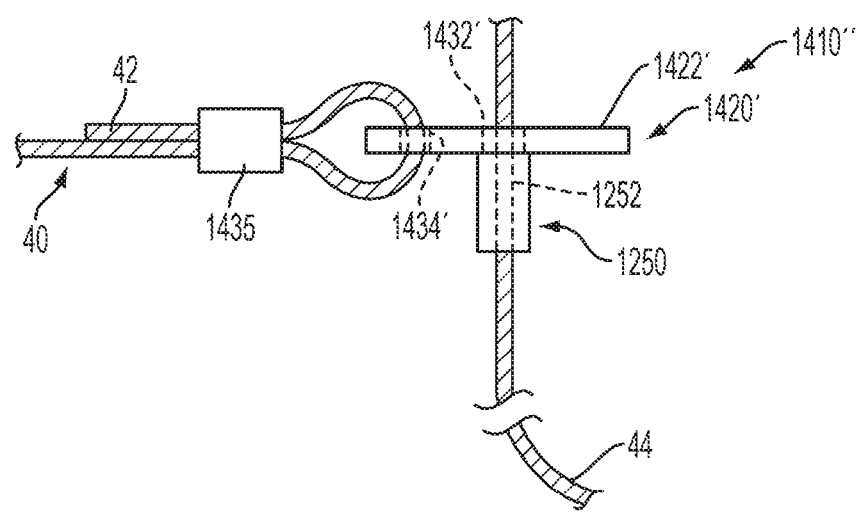
FIG. 57 is a top view of another embodiment of the present invention for attaching an object to a tree.

FIG. 57 illustrates another apparatus embodiment 1410'' of the present invention that employs a mounting member 1420' as described above with one or more friction generating ferrules or slugs 1250 as described above. The apparatus 1410'' may be installed as described above, except that one or more ferrules or slugs 1250 are used in place of the friction generating member 1460'. The mounting member 1420' and the friction generating ferrule(s) may be collectively referred to herein as a "mounting assembly". For example, after the second end of the flexible member 40 is passed through the hole 1432' in the mounting member 1420', the user installs a ferrule or slug 1250 on the second portion of the flexible cable 40 that protrudes out through the hole 1432'. In at least one embodiment, the ferrule 1250 may be fabricated from aluminum or other metal material and have a bore 1252 therethrough that is sized to receive the flexible member 40 (in the illustrated embodiment, a cable) therethrough. The user may then slide the ferrule 1250 into abutting relationship with the mounting member 1420' as shown in FIG. 57. The ferrule 1250 is sized and shaped relative to the hole 1432' in the mounting member 1420' such that the ferrule 1250 is prevent from passing therethrough. The user may crimp or otherwise fasten the ferrule 1250 to the flexible member 40 such that the apparatus 1410'' is cinched to the tree at the desired height, yet is movable thereon to accommodate tree growth. The object may be supported on the flexible member using the hanger 1500 or any of the other arrangements described herein or their equivalent structures. In still other arrangements, no hanger may be employed as was discussed above.

FIGS. 58-62 illustrate another apparatus 1610 for supporting an object such as a sign from a tree portion T at a desired height above the ground. This embodiment employs a "mounting assembly" in the form of a mounting member 1620 that may be for example substantially planar and have a hole or opening 1632 therethrough that is sized and shaped relative to the size and shape of the flexible member 40 such that when a portion of the flexible member 40 is seated therein, a desired amount of sliding frictional engagement is achieved between the mounting member 1620 and the flexible member 40. The flexible member 40 may comprise braided metal cable and have a length that is greater than the expected circumference of the tree portion T to which it is to be attached at the end of an expected or predetermined time period.

Figure 58:
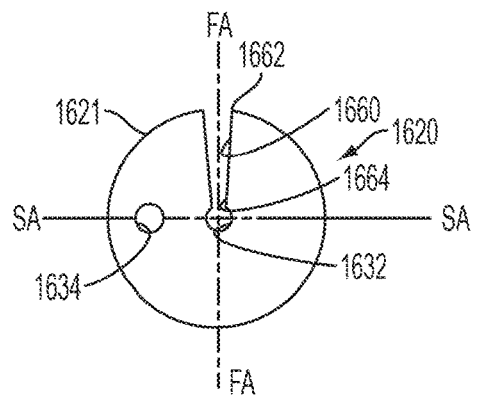
FIG. 58 is a front view of another mounting member embodiment of the present invention.

As can be most particularly seen in FIG. 58, the mounting member 1620 further has an entry slot 1660 that extends from the outer edge 1621 of the mounting member 1620 into the hole or opening 1632. In the illustrated embodiment, the entry slot 1660 is somewhat tapered. That is, the open end 1662 of the entry slot 1660 is wider than the inner end 1664 of the entry slot 1660 that extends into the hole or opening 1632. In at least one embodiment, the mounting member 1620 may be fabricated from a polymer or other material that will slightly flex to enable the flexible member 40 to be seated in frictional engagement within the hole or opening 1632 in the mounting member 1620. In at least one form, the width of the second end 1664 of the entry slot 1660 is less than the diameter of the hole 1632. Such arrangement enables the flexible member to be seated within the hole 1632. As can be seen in FIG. 58, the entry slot 1660 lies along a first axis FA-FA. The first axis FA-FA is also substantially transverse to the centerline of the hole 1632.

Figure 59:
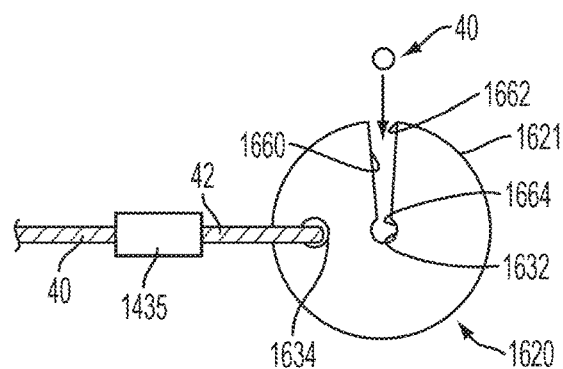
FIG. 59 is another front view of the mounting member embodiment of FIG. 58 with a second end of a flexible member prior to engagement with the mounting member.

As can also be seen in FIG. 58, another mounting hole 1634 is provided through the mounting member 1620 for attaching a first end 42 of the flexible member 40 thereto. In some embodiments (depending upon the material from which the mounting member 1620 is fabricated), a separate metal or polymer bushing (not shown) is pressed into or otherwise mounted within the mounting hole 1634 to prevent the mounting member 1620 from tearing or failing. As can also be seen in FIG. 58, in at least some embodiments, the mounting hole 1634 is located on a second axis SA-SA that is substantially transverse to the first axis FA-FA. As can be seen in FIG. 59, in at least one embodiment, the first end 42 of the flexible member 40 (which is depicted therein as a braided metal cable) is passed through the mounting hole 1634 and then reattached to a corresponding portion of the flexible member 40 by, for example, a conventional attachment ferrule 1435 that is crimped using conventional methods. However, other methods of attaching the first end of the flexible member 40 to the mounting member 1620 may be employed without departing from the spirit and scope of the present invention.

Figure 60:
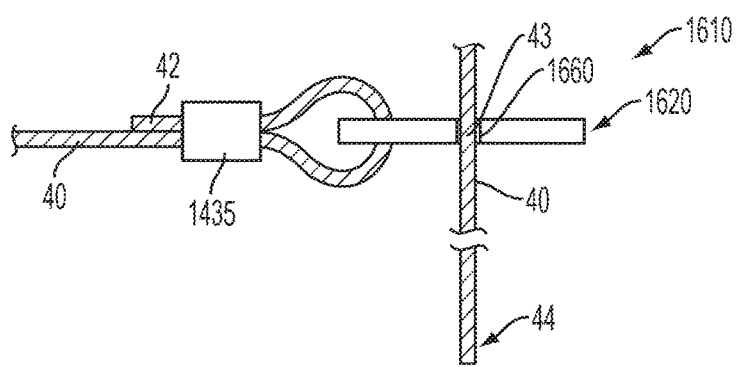
FIG. 60 is another top view of the apparatus of FIGS. 58 and 59 after a portion of the flexible member has been engaged with the mounting member.
Figure 61:
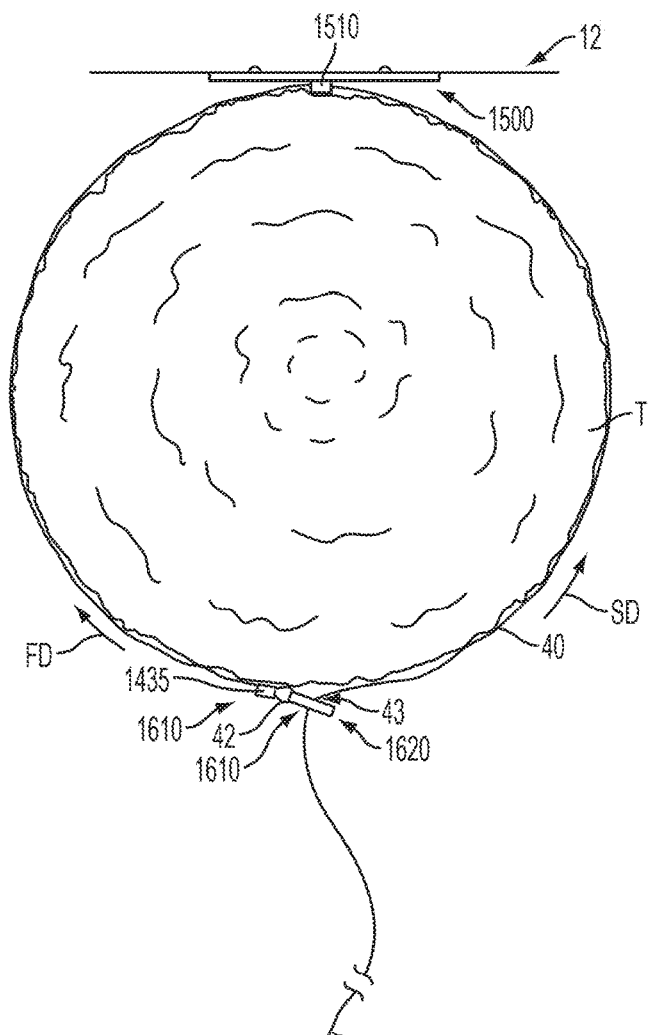
FIG. 61 is cross-sectional view of a portion of a tree with the apparatus of FIGS. 58-60 attached thereto.
Figure 62:
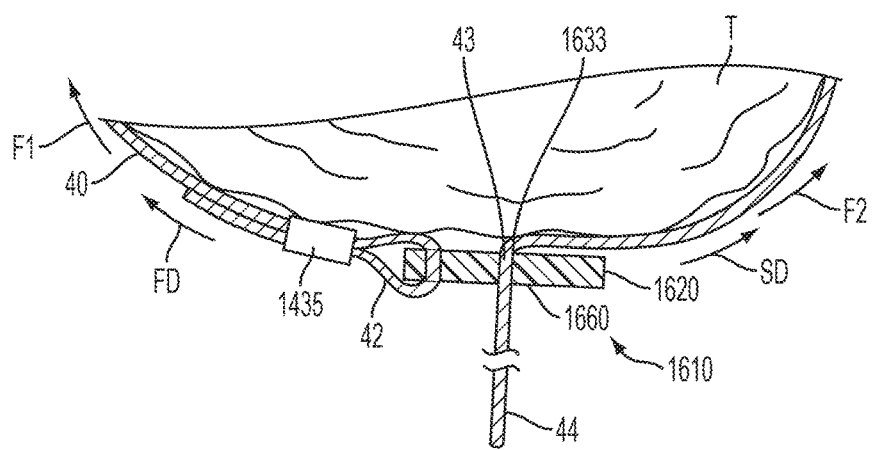
FIG. 62 is an enlarged cross-sectional view of a portion of the tree and apparatus of FIG. 61.

FIGS. 59 and 60 illustrate a method of attaching the apparatus 1610 to a tree portion T. If the hanger member 1500 is to be used, prior to mounting the apparatus to the tree "T", the user may insert the second end 44 of the flexible member 40 through the passage 1512 in the mounting lug 1510 so that the hanger member is slidably received on the flexible member 40. Thereafter, the user may locate the apparatus 1610 at a desired height on the tree portion T and thereafter position the mounting member 1620 on the backside of the tree portion T while positioning the hanger member 1500 adjacent the front side of the tree portion T. The user then inserts a portion 43 of the flexible member 40 down through the entry slot 1660 to seat it in the hole 1632 in the mounting member 1620. The user then forcibly slides the mounting member 1620 on the flexible member 40 to cinch the apparatus 1610 to the tree portion T at the desired height above the ground. Prior to cinching the flexible member 40, the user may slidably adjust the position of the hanger member 1500 on the flexible member. The object 12 may then be attached to the front face 1504 of the hanger member 1500 using fasteners 1520 or any of the other attachment arrangements disclosed herein. In other methods, the object 12 may have been pre-attached to the hanger member 1500 prior to installing the apparatus 1610 on the tree portion T. As the tree portion T expands, the first end portion 42 of the flexible member 40 will pull in a first direction "FD" and the portion 43 of the flexible member 40 that is in sliding or slidable frictional engagement with the mounting member 1620 will pull in a second direction "SD". See FIG. 61. As indicated above, in at least one embodiment, the mounting hole 1634 lies along a second axis SA-SA that is substantially transverse to the first axis FA-FA along which the entry slot 1660 lies. In such arrangement, the force F1 applied by the first end 42 of the flexible member 40 will oppose the force F2 applied by the portion 43 of the flexible member 40. Such forces will generally be applied along the second axis SA-SA in opposite directions. See FIG. 62. Because the entry slot 1660 lies along the first axis FA-FA that is transverse to the second axis SA-SA, the portion 43 of the flexible member 40 that is in frictional engagement with the friction hole 1632 will not tend to migrate back out of the entry slot 1660 and remain seated in the friction hole 1632.

Figure 63:
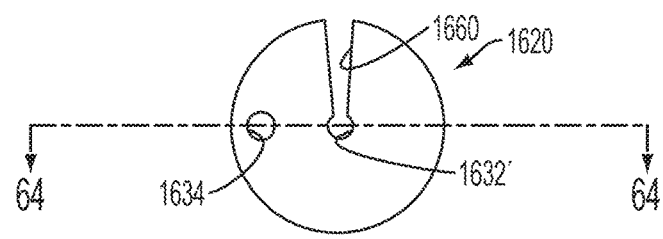
FIG. 63 is a front view of another mounting member embodiment of the present invention.
Figure 64:
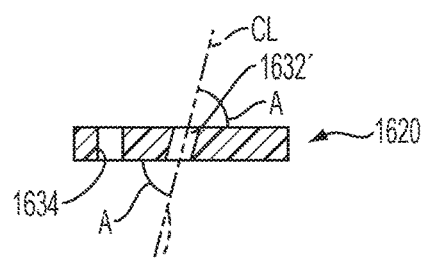
FIG. 64 is a cross-sectional view of the mounting member of FIG. 63 taken along line 64-64 in FIG. 63.

The amount of sliding or slidable friction generated between the flexible member 40 and the friction hole or opening 1632 in the mounting member 1620 may vary depending upon the size, shape, and composition of the flexible member as well as the size and shape of the friction hole or opening 1632 relative thereto. In addition, the sliding or slidable friction may also be dependent upon the type of material from which the mounting member 1620 is fabricated from and in particular, its flexibility and coefficient of friction. The amount of sliding or slidable friction generated may also tend to increase as the portion 43 of the flexible member engages the entry corner (designated as 1633 in FIG. 62) of the friction hole or opening 1632 as it enters therein. Other friction hole or opening arrangements may be employed in the mounting member 1620 as well. For example, the friction hole or opening may be drilled at a slight angle in an effort to reduce or adjust the amount of additional friction generated from contact with the entry corner 1633 in the mounting member 1620. FIGS. 63 and 64 illustrate a friction hole 1632' that has been drilled or otherwise formed through the mounting member 1620 at such an angle. As can be seen in FIG. 63, the hole axis or centerline CL-CL of the friction hole 1632' extends through the mounting member 1620 at an angle "A" such that it is not perpendicular with at least one of the outer surfaces of the mounting member 1620. As can be seen therein, the angle "A" may be an acute angle.

Figure 65:
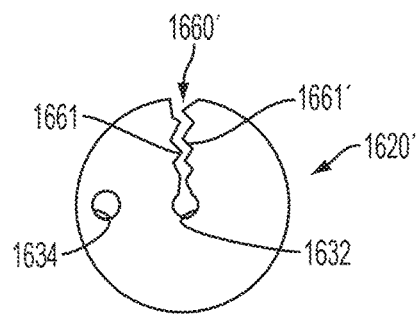
FIG. 65 is a front view of another mounting member embodiment of the present invention.
Figure 66:
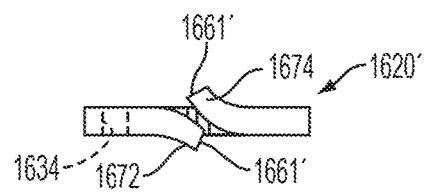
FIG. 66 is a top view of the mounting member of FIG. 65.

Various embodiments of the mounting member 1620 may employ other shapes and arrangements of entry slots. For example, FIG. 65 illustrates a mounting member 1620' that employs and entry slot 1660' that has jagged edges 1661'. In those embodiments wherein the mounting member 1620 is fabricated from a metal material or material that has some malleability, the portions 1672, 1674 of the mounting member 1620' adjacent the edges 1661' of the entry slot 1660' may be bent out of plane in an effort to retain the flexible member 40 in sliding frictional engagement with the mounting member 1620' as the tree expands. See FIG. 66.

In alternative embodiments for example, the mounting member may actually comprise a portion of the object itself. Stated another way, a first end of the flexible member may be attached to the object and the friction generating hole may be provided in another portion of the object. An entry slot may be provided through an edge of the object to enable a portion of the flexible member to be frictionally seated in the opening. To affix the object to the tree portion T, the user wraps the free portion of the flexible member around a portion of the tree portion T and then seats the free portion into the friction generating hole to thereby cinch the object to the tree portion t. The flexible member is retained in sliding frictional engagement with the friction generating hole so that, as the tree portion T expands (tree growth), the flexible member frictionally slips relative to the object to accommodate such tree growth while remaining cinched to the tree. In other embodiments, the free portion of the flexible member may freely pass through an opening in the object and have at least one friction generating member attached thereto that is sized such that it will not pass through the opening. As the tree portion grows, the friction generating member permits the free portion of the flexible member to frictionally slide relative thereto to accommodate the additional tree growth while remaining cinched to the tree portion.

Various embodiments of the present invention represent vast improvements over prior methods and arrangements for attaching signs and other objects to growing trees. While several of the embodiments have been described in connection with the use of various forms of hanger members that are particularly well-suited for attaching planar signs to trees, it will be understood that other hanger arrangements may be employed. For example, hanger members that are specifically configured to support other objects such as bird feeders, ornaments, lights, etc. may be employed in the manners described above to suspend the object from the flexible member. Clamps, hooks, etc. may also be hooked over or clipped to the various flexible members to suspend the object from the flexible member. Accordingly, the scope of protection afforded to the various embodiments of the present invention should not be limited to use solely in connection with the attachment of signs to trees.

Figure 37A:
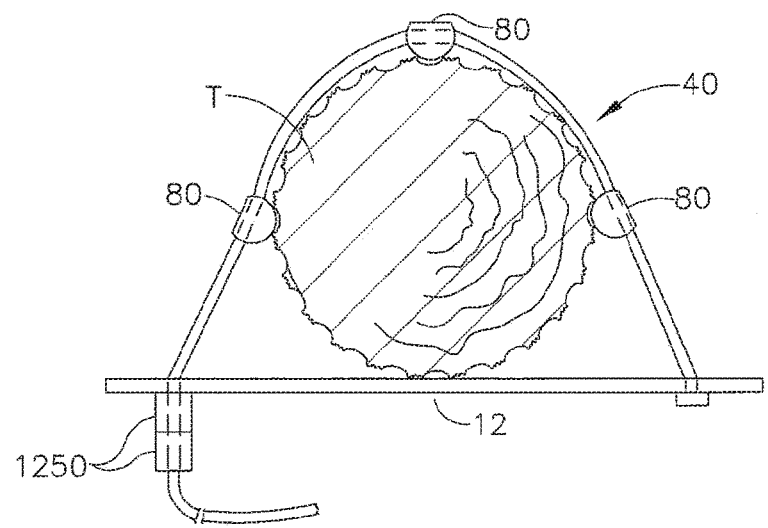
FIG. 37A is a top view of another embodiment of the present invention attached to a tree portion with the tree portion shown in cross-section.

The various apparatuses disclosed herein may also be effectively employed with substantially rigid signs or other objects that have the mounting member arrangement integrally-formed therewith. Thus, in such embodiments, no separate mounting member or hanger member is required to secure the object to the tree portion. In still other embodiments, the above-described bushing or bushings may be installed in the object itself and used in the above-described manners. Other embodiments wherein one or more friction generating members or ferrules are employed in connection with a flexible member, may include an object 12' that has two holes provided therein. See FIG. 37A. In at least some embodiments, one end of the flexible member is passed through one hole and a retainer ferrule or stop member or nut is non-movably applied thereto. The stop member may be applied in the field or the flexible member may have the stop member non-movable attached thereto by the manufacturer. The second end of the flexible member is passed through the other hole in the object 12' and one or more ferrules are slidably inserted thereon to cinch the object 12' to the tree portion. The ferrule(s) are crimped in position on the flexible member so that a desired amount of sliding frictional fit is established between the flexible member and the ferrule(s) such that the ferrule(s) will frictionally slide on the flexible member as the tree expands. In still other embodiments, a second ferrule arrangement is slidably affixed to the first end of the flexible member in place of the non-movable stop member. In such embodiment, both of the sliding ferrules serve to accommodate expansion of the tree in the above-described manners.

While the aforementioned embodiments are well-suited for use with objects such as signs that are fabricated from somewhat rigid materials (e.g., metal, polymer, etc.), these embodiments may also be used in connection with non-rigid signs and other objects or signs and objects fabricated from somewhat thinner materials. In such applications for example, a thrust washer may be inserted onto the cable between the stop member and the object and another thrust washer may be inserted onto the cable between the ferrule and the object. Such thrust washers provide a rigid bearing surface between the stop and the object and the ferrule and the object to prevent the stop and/or ferrule from pulling through the object.

Various embodiments of the present invention may comprise a flexible member that, when attached to the object or mounting member, serve to completely encircle the tree portion for at least the duration of the installation period. The flexible members, in combination with a corresponding stop member and/or ferrule(s) may be provided for use with objects that have preformed installation holes therein as was discussed above. The installation holes have a diameter that is larger than the flexible member's cross-sectional shape to facilitate slidable passage of the flexible member therethrough. When a stop member is employed, the stop member has a size and shape relative to one of the installation holes that will not permit the stop member to pass therethrough. Similarly, the ferrule(s) used on the second end portion of the flexible member are sized and shaped relative to the other installation hole in the object so as to prevent the ferrule(s) from passing therethrough.

Thus, an embodiment of the present invention comprises an attachment mechanism for attaching an object having at least two preformed holes therein to a portion of a growing tree for an expected installation period at a desired elevation above the ground. In at least one form, the mechanism comprises a cable that has a first end and a second end and a cross-sectional configuration that is sized and shaped to permit the cable to pass through at least two of the preformed holes in the object. The cable is provided with a length that may be calculated using the above-described method. The cable is provided with a length such that when the cable is coupled to the object, the cable and the object serve to completely encircle the tree portion at least through the expected installation period. A stop member is attached to the first end of the cable. The stop member may comprise a slug or ferrule that is non-movably attachable to the first end of the cable by crimping or other suitable method. The stop member may also comprise a nut that is screwed onto the first end of the cable and is otherwise non-movable thereon during use. In any case, the stop member has a configuration that is sized and shaped to prevent the stop member from passing through one of the preformed holes in the object. The mechanism further comprises a ferrule that is configured to be secured in a sliding frictional engagement onto a portion of the second end of the cable in the various manners described herein. A plurality of ferrules may be provided in serial fashion on the cable to attain a desired amount of sliding frictional fit, if desired. The ferrule(s), or at least a first ferrule has a configuration sized and shaped to prevent the ferrule from passing through another one of the preformed holes in the object.

In another embodiment, the mechanism comprises a cable that has a first end and a second end and a cross-sectional configuration that is sized and shaped to permit the cable to pass through at least two of the preformed holes in the object. The cable is provided with a length that may be calculated using the above-described method. The cable is provided with a length such that when the cable is coupled to the object, the cable and the object serve to completely encircle the tree portion at least through the expected installation period. At least one first ferrule is configured to be secured in a sliding frictional engagement onto a portion of the first end of the cable. The first ferrule is sized and shaped to prevent the ferrule from passing through a preformed hole in the object. At least one second ferrule is configured to be secured in a sliding frictional engagement onto a portion of the second end of the cable. The second ferrule is sized and shaped to prevent the second ferrule from passing through another one of the preformed holes in the object.

The minimum amount of sliding frictional fit required to secure the apparatus and object attached thereto to the tree (or in other embodiments, the sign itself) at the desired elevation above the ground may depend upon the total or aggregate weight of the attachment apparatus and object. That is, those objects that are heavier may require a larger minimum amount of sliding frictional fit between the ferrule(s) or friction generating member(s) and the cable than lighter objects. For those embodiments that employ ferrules or friction generating member(s), it is conceivable that plural ferrules or friction generating members may be serially used to attain the desirable minimum amount of sliding frictional fit between the ferrule(s) or friction generating member(s) and the cable. However, in such cases, the total sliding frictional fit(s) should not be so great as to prevent the ferrule(s) from sliding in response to the expanding tree.

In addition, the various embodiments of the present invention are well-suited to be provided in kit form that enables the end user to specifically tailor the apparatus to the particular sizes and types of trees involved. For example, an exemplary kit may include a piece of precut flexible member, a mounting member and/or at least one hanger member. Other kit embodiments include a bulk amount of uncut flexible member, a plurality of mounting members and/or a plurality of hanger members. Such kits may for example, include a spool of braided metal cable. Once the user determines how long the cable should be by employing one of the above-described methods, that length of cable may be cut from the spool of cable. Other kits may also include a chart that sets forth the expected growth rates for various tree species. The chart may, in at least one form, provide a recommended cable length for each species based on the length of an installation period. For example, the chart may provide recommended cable lengths for installation periods of 1 year, 5 years, 15 years, 20 years, etc. for selected tree species. The user may then determine the recommended cable length from the chart and cut the cable accordingly. Such arrangement enables the user to "tailor" the cable to a particular tree species for a particular installation period. Depending upon the type of object employed, the user may affix the object directly to the tree or affix it to a hanger member or a support member in the manner(s) described above. In still alternative arrangements, the user may simply elect to suspend the object (using clips, hooks, etc.) from the cable once it has been secured to the tree in the above-described manners. Still other kit embodiments may include a plurality of different hanger members and mounting members as well as a bulk amount of flexible member or a plurality of precut pieces of flexible member. The pieces of flexible member may be precut in one length or they may be precut in a plurality of different lengths. Still other kits may simply comprise a bulk amount of flexible member and a plurality of stop members and ferrules. Other kits may comprise a plurality of precut flexible members with a stop member attached to one end thereof and a plurality of ferrules. The various kits may or may not include signs and may or may not include fasteners for fastening the signs to the hanger or support member. Other kits may include one type of sign and other kits may include different types of signs (e.g., different sizes and/or compositions). Some kits may also include a crimping or swaging tool. Still other kits include a sign and a flexible member.

Some forms of the present invention do not require the use of any tools to attach the apparatus to a tree. In some applications, depending upon the type of hanger arrangement employed, a tool such as a screw driver may be required to attach the sign or other object to the hanger. Other embodiments require the use of a crimping or swaging tool.

Various embodiments of the present invention enable a sign or other object to be attached to a tree without damaging the inner bark or cambium layer for a predetermined period of time without the need to manually adjust any part of the device during that predetermined time period. While the amount of tree growth to occur during that predetermined time period may be estimated, the actual amount of tree growth to occur can depend upon the growing conditions experienced during that time period and therefore may vary from that growth estimate. Accordingly, many of the embodiments disclosed herein may automatically detach from the tree when the tree's circumference exceeds the length of the flexible member and/or the flexible member and the support or hanger member. Such unique and novel arrangements prevent inadvertent tree damage should the tree's circumference exceed the estimated circumference and is otherwise not discovered by the user.

As discussed above, when signs are installed in wooded areas that are frequented by squirrels, porcupines and similar animals, those animals can destroy wooden backing boards and other materials that are susceptible to being chewed by those animals. Many of the embodiments disclosed herein may employ metal components that will vastly reduce any likelihood of experiencing such rodent damage.

Although the various embodiments of the devices have been described herein in connection with certain disclosed embodiments, many modifications and variations to those embodiments may be implemented. Also, where materials are disclosed for certain components, other materials may be used. The foregoing description and following claims are intended to cover all such modification and variations.

What is claimed is:

1. Apparatus for securing an object to a portion of a living tree that includes an expected circumference at a predetermined period of time, said apparatus comprising:
 a cable including a first end and a second end and a length that is greater than the expected circumference of the living tree portion at an end of the predetermined period of time;
 a mounting member comprising:
  a first portion that is secured to said first end of said cable; and
  a second portion including an opening therethrough that is dimensioned to receive said second end of said cable therethrough after said cable has been wrapped around a portion of the tree portion and wherein said apparatus further comprises:
 a one-piece friction generating member sized to be removably attached to said mounting member within said opening in said mounting member and being further configured to be secured in a sliding frictional engagement onto a portion of said cable extending through said opening in said second portion of said mounting member to cinch said cable around the tree portion, said one-piece friction generating member dimensioned so as to interact with a remaining entire length of said cable portion extending between said one-piece friction generating member and said second end of said cable portion as the tree portion expands to thereby automatically permit said remaining length of said cable portion to frictionally slip relative to said one-piece friction generating member until said one piece friction generating member disengages said cable second end to cause said apparatus to disengage from said tree.

2. The apparatus of claim 1, wherein said one-piece friction generating member comprises:
 a body portion sized to be received within said opening in said portion of said mounting member;
 an axial hole extending through said body portion and being sized relative to said portion of said cable so as to generate said sliding frictional engagement therewith; and
 means for releasably affixing said body portion to said mounting member.

3. The apparatus of claim 2, wherein said one-piece friction generating member further comprises a flanged end on said body portion, said flanged end being larger than said opening in said second portion of said mounting member.

4. The apparatus of claim 2, wherein said means for releasably affixing comprises a pair of diametrically-opposed retention tabs formed on said body portion and configured to be inserted through corresponding tab openings in said second portion of said mounting member.

5. The apparatus of claim 4, wherein each said retention tab comprises a corresponding cam surface configured to cammingly draw said body portion into said opening as said body portion is rotated therein.

6. The apparatus of claim 2, further comprises a tapered surface on said body portion such that, as said body portion is retainingly engaged within said opening, said mounting member interacts with said tapered surface to establish said frictional engagement between said body portion and said portion of said cable.

7. The apparatus of claim 1, wherein said body portion comprises an outer perimeter and wherein said one-piece friction generating member further comprises a slot extending through said outer perimeter into said axial hole to permit said portion of said cable to be entered into said axial hole through said slot.

8. The apparatus of claim 1, wherein said mounting member comprises a portion of the object.

9. The apparatus of claim 1, wherein said mounting member is configured to support the object.

10. The apparatus of claim 1, further comprising a hanger member supportable on at least one of said mounting member and said cable and wherein said hanger member is configured to support the object.

11. The apparatus of claim 10, wherein the object is attachable to said hanger member with a fastener arrangement selected from the group of fastener arrangements consisting of screws, bolts, adhesive, clamps, paper fastener brads, and double-sided tape.

12. The apparatus of claim 1, further comprising:
 a second opening through said first portion of said mounting member and sized to receive another portion of said cable adjacent to said first end thereof; and
 another one-piece friction generating member sized to be removably attached to said mounting member within said second opening and being further configured to be secured in sliding frictional engagement onto said another portion of said cable extending through said second opening.

13. Apparatus for securing an object to a portion of a living tree that includes an expected circumference at a predetermined period of time, said apparatus comprising:
 a cable including a first end and a second end and a length that is greater than the expected circumference of the living tree portion at an end of the predetermined period of time;
 a mounting member comprising:
  a first portion that is secured to a first end of said cable; and
  a second portion including an opening therethrough that is dimensioned to receive said second end of said cable therethrough after said cable has been wrapped around a portion of the tree portion and wherein said apparatus further comprises:

a bushing comprising an outer perimeter sized to be received within said opening in said second portion of said mounting member and being configured to be releasably retained therein when said bushing is rotated within said opening, a friction generating hole through said bushing and being sized to receive therein a portion of said cable extending through said opening in said second portion of said mounting member, said friction generating hole defining a hole axis; and an access slot extending from said outer perimeter of said bushing to said friction generating hole along a slot axis that is substantially transverse to said hole axis to enable said cable portion to be inserted into said friction generating hole in said bushing in sliding engagement therewith to cinch said cable to the tree portion such that as the tree portion expands, said cable is configured to frictionally slide through said friction generating hole while remaining cinched to the tree portion.

14. The apparatus of claim 13, wherein said access slot has a first width at said outer perimeter of said bushing and a second width wherein said access slot meets said friction generating hole and wherein said second width is less than said first width.

15. The apparatus of claim 14, wherein said second width is less than a diameter of said friction generating hole.

16. The apparatus of claim 13, wherein said outer perimeter of said bushing comprises a tapered surface such that, as said bushing is retainingly engaged within said opening, said mounting member interacts with said tapered surface to establish said frictional engagement between said bushing and said portion of said cable.

17. The apparatus of claim 16, wherein the object is attachable to said mounting member with a fastener arrangement selected from the group of fastener arrangements consisting of screws, bolts, adhesive, clamps, paper fastener brads, and double-sided tape.

18. The apparatus of claim 13, wherein said bushing further comprises a pair of diametrically-opposed retention tabs protruding from said outer perimeter and configured to be inserted through corresponding tab openings in said second portion of said mounting member.

19. The apparatus of claim 18, wherein each said retention tab comprises a corresponding cam surface configured to cammingly draw said bushing into said opening as said bushing is rotated therein.

20. Apparatus for securing an object to a portion of a living tree at a fixed elevation that includes an expected circumference at a predetermined period of time, said apparatus comprising:

a cable including a first end and a second end and a length that is greater than the expected circumference of the living tree portion at an end of the predetermined period of time;

a mounting member comprising:
 a first portion that is secured to a first end of said cable; and
 a second portion including an opening therethrough that is dimensioned to receive said second end of said cable therethrough after said cable has been wrapped around a portion of the tree portion and wherein said apparatus further comprises:

a bushing comprising a tapered outer surface sized to be received within said opening in said mounting member and including an axial hole therethrough sized to receive said portion of said cable therethrough, said bushing further comprising a bayonet coupler arrangement configured to releasably engage said mounting member such that when said bushing is rotated within said opening, said mounting member interacts with said tapered outer surface to establish sliding frictional engagement between said bushing and said portion of said cable.

21. Apparatus for securing an object to a portion of a living tree that includes an expected circumference at a predetermined period of time, said apparatus comprising:

a cable including a first end and a second end and a length that is greater than the expected circumference of the living tree portion at an end of the predetermined period of time;

a mounting member comprising:
 a first portion that is secured to said first end of said cable; and
 a second portion including an opening therethrough that is dimensioned to receive said second end of said cable therethrough after said cable has been wrapped around a portion of the tree portion and wherein said apparatus further comprises:

a one-piece friction generating member sized to be removably attached to said mounting member within said opening in said mounting member and being further configured to be secured in a sliding frictional engagement onto a portion of said cable extending through said opening in said second portion of said mounting member to cinch said cable around the tree portion, said one-piece friction generating member dimensioned so as to interact with said cable portion as the tree portion expands to thereby permit said cable portion to frictionally slip relative to said one-piece friction generating member, said one-piece friction generating member comprising:

a body portion sized to be received within said opening in said portion of said mounting member;

an axial hole extending through said body portion and being sized relative to said portion of said cable so as to generate said sliding frictional engagement therewith; and a pair of diametrically-opposed retention tabs formed on said body portion and configured to be inserted through corresponding tab openings in said second portion of said mounting member, wherein each said retention tab comprises a corresponding cam surface configured to cammingly draw said body portion into said opening as said body portion is rotated therein.

* * * * *